United States Patent
Yang et al.

(10) Patent No.: US 11,979,413 B2
(45) Date of Patent: May 7, 2024

(54) IDENTITY VERIFICATION METHOD AND APPARATUS

(71) Applicant: Huawei Technologies Co., Ltd., Shenzhen (CN)

(72) Inventors: Yanjiang Yang, Singapore (SG); Zhuo Wei, Singapore (SG); Shuang Wu, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 17/360,360

(22) Filed: Jun. 28, 2021

(65) Prior Publication Data

US 2021/0329008 A1 Oct. 21, 2021

Related U.S. Application Data

(63) Continuation of application No. PCT/CN2020/076661, filed on Feb. 25, 2020.

(30) Foreign Application Priority Data

Aug. 31, 2019 (CN) .......................... 201910819653.5

(51) Int. Cl.
*H04L 9/40* (2022.01)
*H04L 67/12* (2022.01)

(52) U.S. Cl.
CPC ........ *H04L 63/126* (2013.01); *H04L 63/0876* (2013.01); *H04L 67/12* (2013.01)

(58) Field of Classification Search
CPC ... H04L 63/126; H04L 63/0876; H04L 67/12; H04L 2209/84; H04L 9/3247;

(Continued)

(56) References Cited

U.S. PATENT DOCUMENTS 8,918,643 B2   12/2014   Okude
2011/0047630 A1*   2/2011   Cheng ................... H04L 9/3234
                                                   726/34

(Continued)

FOREIGN PATENT DOCUMENTS

CN   107071774 A   8/2017
CN   107683583 A   2/2018

(Continued)

OTHER PUBLICATIONS

Takemori Keisuke, "Protection for Automotive Control System Using Secure Boot and Authentication," IEICE Technical Report, vol. 114, No. 225, the Institute of Electronics, Information and Communication Engineers, Japan, Sep. 12, 2014, with an English abstract, 11 pages.

*Primary Examiner* — Henry Tsang
(74) *Attorney, Agent, or Firm* — Conley Rose, P.C.

(57) ABSTRACT

A first apparatus sends a first random number to a second apparatus, where a vehicle carries the first apparatus and a first set. The second apparatus belongs to the first set. The first set further includes a third apparatus. The first apparatus communicates with the third apparatus using the second apparatus. The first apparatus receives a first message from the second apparatus. The first message includes first verification information to perform identity verification on the second apparatus. The first verification information is based on identity information of the second apparatus and the first random number. The first apparatus determines, based on the first verification information and the first random number, that the identity verification on the second apparatus has succeeded.

26 Claims, 13 Drawing Sheets

(58) Field of Classification Search
CPC .... H04L 9/3242; H04L 63/08; H04W 84/005; H04W 12/108

See application file for complete search history.

(56) References Cited

U.S. PATENT DOCUMENTS

| | | | |
|---|---|---|---|
| 2013/0111582 | A1 | 5/2013 | Forest |
| 2017/0099201 | A1* | 4/2017 | Segawa .................. H04L 12/28 |
| 2017/0111177 | A1* | 4/2017 | Oguma ................ H04L 9/3273 |
| 2017/0347266 | A1 | 11/2017 | Petel |
| 2019/0028267 | A1* | 1/2019 | Takemori .............. H04L 9/3242 |
| 2019/0028448 | A1 | 1/2019 | Farrell |
| 2019/0199524 | A1 | 6/2019 | Takemori et al. |
| 2021/0111874 | A1 | 4/2021 | Tanji et al. |

FOREIGN PATENT DOCUMENTS

| | | | |
|---|---|---|---|
| CN | 108123805 | A | 6/2018 |
| CN | 108390757 | A | 8/2018 |
| EP | 3157203 | A1 | 4/2017 |
| JP | 2017079369 | A | 4/2017 |
| JP | 2017130908 | A | 7/2017 |
| WO | 2013161371 | A1 | 10/2013 |
| WO | 2015092754 | A1 | 6/2015 |
| WO | 2018189885 | A1 | 10/2018 |

\* cited by examiner

IDENTITY VERIFICATION METHOD AND APPARATUS

CROSS-REFERENCE TO RELATED APPLICATIONS

This application is a continuation of International Patent Application No. PCT/CN2020/076661 filed on Feb. 25, 2020, which claims priority to Chinese Patent Application No. 201910819653.5 filed on Aug. 31, 2019. The disclosures of the aforementioned applications are hereby incorporated by reference in their entireties.

TECHNICAL FIELD

This application relates to the field of communications technologies, and in particular, to an identity verification method and an apparatus.

BACKGROUND

There may be a plurality of vehicle-mounted devices in a vehicle. For example, a vehicle that can perform self-driving usually makes a driving decision based on information provided by an advanced driver-assistance system (ADAS). The ADAS includes many sensors, such as a camera, a millimeter-wave radar, an ultrasonic radar, and an optical radar (e.g., light detection and ranging (LiDAR)). All these sensors are vehicle-mounted devices. Obviously, these vehicle-mounted devices are very important to a vehicle function and driving safety.

However, because some vehicle-mounted devices are relatively expensive, maintenance personnel or other malicious persons may replace regular vehicle-mounted devices with fake and shoddy vehicle-mounted devices for profits. A fake and shoddy vehicle-mounted device affects vehicle performance, and may even affect driving safety. Therefore, it is crucial to ensure authenticity and regularity of a vehicle-mounted device.

However, there is no relatively reliable manner of performing verification on a vehicle-mounted device.

SUMMARY

Embodiments of this application provide an identity verification method and an apparatus, to perform verification on a vehicle-mounted device, thereby improving security of the vehicle-mounted device.

According to a first aspect, a first identity verification method is provided. The method includes a first apparatus sends a first random number to a second apparatus. A first vehicle carries the first apparatus and a first set, the second apparatus belongs to the first set, the first set further includes a third apparatus, and the first apparatus communicates with the third apparatus by using the second apparatus. The first apparatus receives a first message from the second apparatus. The first message includes first verification information, the first verification information is used to perform identity verification on the second apparatus, and the first verification information is generated based on identity information of the second apparatus and the first random number. The first apparatus determines, based on the first verification information and the first random number, that the identity verification on the second apparatus succeeds.

The method according to the first aspect may be performed by the first apparatus. The first apparatus may be a communications device, or a communications apparatus such as a chip system that can support a communications device in implementing a function required by the method. For example, the communications device is a vehicle-mounted apparatus.

In this embodiment of this application, the first set includes the second apparatus and the third apparatus. The first apparatus only needs to perform verification on the second apparatus. For the third apparatus, for example, the second apparatus may perform verification on the third apparatus. In this way, identity verification can be performed on all levels of vehicle-mounted devices, and for each level of vehicle-mounted devices, verification needs to be performed on a relatively small quantity of devices, thereby reducing device load.

With reference to the first aspect, in a possible implementation of the first aspect, that the first apparatus determines, based on the first verification information and the first random number, that the identity verification on the second apparatus succeeds includes the following.

The first apparatus generates second verification information based on the identity information of the second apparatus and the first random number.

The first apparatus determines whether the first verification information is consistent with the second verification information.

When the first verification information is consistent with the second verification information, the first apparatus determines that the identity verification on the second apparatus succeeds.

For example, if the identity information of the second apparatus is known for the first apparatus, the first apparatus may generate verification information in the same manner in which the second apparatus generates the first verification information. For example, the verification information is referred to as the second verification information. Alternatively, the identity information of the second apparatus may be carried in the first message. In this case, the first apparatus may alternatively generate the second verification information in the same manner in which the second apparatus generates the first verification information. The first apparatus may compare whether the second verification information is consistent with the first verification information. If the second verification information is consistent with the first verification information, the identity verification performed by the first apparatus on the second apparatus succeeds, in other words, the first apparatus determines that the identity verification on the second apparatus succeeds. Alternatively, if the second verification information is inconsistent with the first verification information, the identity verification performed by the first apparatus on the second apparatus fails, in other words, the first apparatus determines that the identity verification on the second apparatus fails. The first apparatus and the second apparatus generate verification information in a same manner, and the first apparatus performs verification. If the second apparatus is maliciously replaced, the first verification information generated by the second apparatus may be inconsistent with the second verification information. Therefore, whether the identity verification on the second apparatus succeeds can be determined in this manner.

With reference to the first aspect, in a possible implementation of the first aspect, the first message further includes fourth verification information, and the fourth verification information is used to indicate whether identity verification on the third apparatus succeeds. That the first apparatus generates second verification information based on the identity information of the second apparatus and the first random number includes that the first apparatus generates the second verification information based on the identity information of the second apparatus, the fourth verification information, and the first random number.

For example, the second apparatus also generates the first verification information based on the identity information of the second apparatus, the fourth verification information, and the first random number. In this case, the first apparatus also generates the second verification information based on the identity information of the second apparatus, the fourth verification information, and the first random number. An element used to generate the first verification information is the same as an element used to generate the second verification information, so that accuracy of comparing the first verification information with the second verification information can be ensured.

With reference to the first aspect, in a possible implementation of the first aspect, the first message further includes third verification information generated by the third apparatus, and the third verification information is obtained by the third apparatus based on identity information of the third apparatus.

For example, in addition to the first verification information, the first message may further include N pieces of third verification information. The N pieces of third verification information may be generated by N third apparatuses included in the first set. The N third apparatuses may be all or some of third apparatuses included in the first set, and N is a positive integer. For example, in addition to sending the first verification information to the first apparatus, the second apparatus may further send third verification information generated by all the third apparatuses included in the first set to the first apparatus. In this case, the N third apparatuses include all the third apparatuses in the first set. In this way, the first apparatus can obtain relatively much information, and the first apparatus can perform identity verification on any third apparatus included in the first set when the first apparatus needs to perform identity verification on a third apparatus. In this case, the third apparatus is one of the N third apparatuses, and the third apparatus may be a third apparatus that succeeds in identity verification performed by the second apparatus, or may be a third apparatus that fails in identity verification performed by the second apparatus.

Alternatively, in addition to sending the first verification information to the first apparatus, the second apparatus may further send, to the first apparatus, third verification information generated by a third apparatus that fails to be verified by the second apparatus. In this case, the N third apparatuses may include all or some of the third apparatuses in the first set. The first message needs to carry only the third verification information generated by the third apparatus that fails to be verified by the second apparatus, and does not need to carry the third verification information generated by all the third apparatuses in the first set, thereby reducing signaling overheads. In addition, the first apparatus may not need to perform verification again on a third apparatus that is successfully verified by the second apparatus. Therefore, verification reliability is less affected. In this case, the third apparatus is one of the N third apparatuses, and the third apparatus is a third apparatus that fails in identity verification performed by the second apparatus.

With reference to the first aspect, in a possible implementation of the first aspect, the first message further includes the fourth verification information, and the fourth verification information is used to indicate whether the identity verification on the third apparatus succeeds. After the first apparatus determines that the identity verification on the second apparatus succeeds, the method further includes when the fourth verification information indicates that the identity verification on the third apparatus fails, the first apparatus performs verification based on the third verification information, to determine whether the identity verification on the third apparatus succeeds.

If the first apparatus determines that the identity verification on the second apparatus succeeds, the fourth verification information indicates that the identity verification on the third apparatus fails, and the first message includes the third verification information corresponding to the third apparatus. In this case, the first apparatus may perform verification based on the third verification information, to determine whether the identity verification on the third apparatus succeeds. In this embodiment of this application, in addition to hierarchical verification, the first apparatus may further implement overall verification. To be specific, in addition to verifying whether the identity verification on the second apparatus succeeds, the first apparatus may further verify whether the identity verification on the third apparatus succeeds, so that the verification on the third apparatus is more reliable.

With reference to the first aspect, in a possible implementation of the first aspect, the first message further includes the fourth verification information, and the fourth verification information is used to indicate that the identity verification on the third apparatus fails. The method further includes the following.

The first apparatus sends a second message to the second apparatus. The second message is used to request to obtain verification information corresponding to the third apparatus.

The first apparatus receives a third message from the second apparatus. The third message includes third verification information corresponding to the third apparatus.

The first apparatus performs verification based on the third verification information, to determine whether the identity verification on the third apparatus succeeds.

Alternatively, the first message may not include the N pieces of third verification information. If the fourth verification information indicates that the identity verification on the third apparatus included in the first set fails, the first apparatus may send the second message to the second apparatus. The second message is used to request to obtain verification information corresponding to at least one third apparatus. After receiving the second message from the first apparatus, the second apparatus may send the N pieces of third verification information to a primary authentication node. For example, the second apparatus may send the third message to the first apparatus, and the third message includes the N pieces of third verification information. The N pieces of third verification information may include third verification information generated by all of the third apparatuses in the first set, or the N pieces of third verification information may include third verification information generated by some of the third apparatuses in the first set. In this manner, the first apparatus may request to obtain the third verification information when the first apparatus needs to perform verification on the third apparatus, and the first message does not need to include the third verification information. In this way, if the identity verification performed by the first apparatus on the second apparatus succeeds, and the fourth verification information indicates that the identity verification on the third apparatus included in the first set succeeds, the first apparatus does not need to request to obtain the third verification information, thereby reducing signaling overheads.

With reference to the first aspect, in a possible implementation of the first aspect, when the first apparatus determines that the identity verification on the second apparatus fails, the method further includes the following.

The first apparatus sends a second message to the second apparatus. The second message is used to request to obtain verification information corresponding to the third apparatus.

The first apparatus receives a third message from the second apparatus. The third message includes third verification information corresponding to the third apparatus.

The first apparatus performs verification based on the third verification information, to determine whether the identity verification on the third apparatus succeeds.

Alternatively, the first message may not include the N pieces of third verification information. If the first apparatus determines that the identity verification on the second apparatus fails, the first apparatus may not trust a verification result of the second apparatus. Therefore, the first apparatus may send the second message to the second apparatus. The second message is used to request to obtain verification information corresponding to at least one third apparatus. After receiving the second message from the first apparatus, the second apparatus may send the N pieces of third verification information to a primary authentication node. For example, the second apparatus may send the third message to the first apparatus, and the third message includes the N pieces of third verification information. The N pieces of third verification information may include third verification information generated by all of the third apparatuses in the first set, or the N pieces of third verification information may include third verification information generated by some of the third apparatuses in the first set. In this manner, the first apparatus may request to obtain the third verification information when the first apparatus needs to perform verification on the third apparatus, and the first message does not need to include the third verification information. In this way, if the identity verification performed by the first apparatus on the second apparatus succeeds, and the fourth verification information indicates that the identity verification on the third apparatus included in the first set succeeds, the first apparatus does not need to request to obtain the third verification information, thereby reducing signaling overheads.

With reference to the first aspect, in a possible implementation of the first aspect, there are a plurality of third apparatuses, the first message further includes fourth verification information, and the fourth verification information is obtained by aggregating a plurality of pieces of third verification information from the plurality of third apparatuses. The method further includes the first apparatus performs verification based on the fourth verification information, to determine whether identity verification on the plurality of third apparatuses succeeds.

The second apparatus may aggregate the plurality of pieces of third verification information from the plurality of third apparatuses to obtain the fourth verification information, and send the fourth verification information to the first apparatus. For example, one aggregation manner is to perform exclusive OR on the plurality of pieces of third verification information to obtain the fourth verification information. Certainly, there may be another aggregation manner. The fourth verification information obtained in this manner has a smaller amount of information than the plurality of pieces of third verification information. The second apparatus only needs to send the fourth verification information, and does not need to send the plurality of pieces of third verification information, thereby reducing signaling overheads.

With reference to the first aspect, in a possible implementation of the first aspect, the method further includes the following.

When determining, based on the fourth verification information, that the identity verification on the plurality of third apparatuses fails, the first apparatus sends a second message to the second apparatus. The second message is used to request to obtain verification information corresponding to the plurality of third apparatuses.

The first apparatus receives a third message from the second apparatus. The third message includes the plurality of pieces of third verification information.

The first apparatus performs verification based on the plurality of pieces of third verification information, to determine whether identity verification on each of the plurality of third apparatuses succeeds.

The fourth verification information is obtained by aggregating the plurality of pieces of third verification information. Therefore, if the first apparatus determines, based on the fourth verification information, that the identity verification on the plurality of third apparatuses fails, it is only generally considered that there is a third apparatus that fails in identity verification in the plurality of third apparatuses. However, the first apparatus cannot determine a specific third apparatus that fails in identity verification in the plurality of third apparatuses. Therefore, the first apparatus may request to obtain the plurality of pieces of third verification information generated by the plurality of third apparatuses. In this way, the first apparatus may successively perform verification based on the plurality of pieces of third verification information, so as to determine a specific third apparatus that fails in identity verification. In this manner, a third apparatus that fails in identity verification can be located more accurately.

According to a second aspect, a second identity verification method is provided. The method includes a second apparatus sends a second random number to a third apparatus. A first vehicle carries a first apparatus and a first set, the second apparatus and the third apparatus belong to the first set, and the first apparatus communicates with the third apparatus by using the second apparatus. The second apparatus receives third verification information from the third apparatus. The third verification information is generated based on identity information of the third apparatus and the second random number. The second apparatus determines, based on the second random number and the third verification information, that identity verification on the third apparatus succeeds.

The method according to the second aspect may be performed by the second apparatus. The second apparatus may be a communications device, or a communications apparatus such as a chip system that can support a communications device in implementing a function required by the method. For example, the communications device is a vehicle-mounted apparatus.

In this embodiment of this application, the first set includes the second apparatus and the third apparatus. The first apparatus may perform identity verification on the second apparatus, and the second apparatus may perform identity verification on the third apparatus. In other words, this embodiment of this application provides a hierarchical verification mechanism. One level of apparatus only needs to perform verification on a next level of apparatus, so that an identity verification result is more reliable through level-by-level verification. In addition, in this manner, identity verification can be performed on all levels of vehicle-mounted devices, and for each level of vehicle-mounted devices, verification needs to be performed on a relatively small quantity of devices, thereby reducing device load.

With reference to the second aspect, in a possible implementation of the second aspect, that the second apparatus determines, based on the second random number and the third verification information, that identity verification on the third apparatus succeeds includes that the second apparatus generates fifth verification information based on the second random number and the identity information of the third apparatus. The second apparatus determines, based on the fifth verification information and the third verification information, that the identity verification on the third apparatus succeeds.

For example, if the identity information of the third apparatus is known for the second apparatus, the second apparatus may generate verification information in the same manner in which the third apparatus generates the third verification information. For example, the verification information is referred to as the fifth verification information. Alternatively, the third apparatus may send the identity information of the third apparatus to the second apparatus in advance. In this case, the second apparatus may alternatively generate the fifth verification information in the same manner in which the third apparatus generates the third verification information. By using the third verification information and the fifth verification information, it may be determined whether the identity verification on the third apparatus succeeds. The second apparatus and the third apparatus generate verification information in a same manner, and the second apparatus performs verification. If the third apparatus is an apparatus that succeeds in identity verification, the third verification information generated by the third apparatus needs to be consistent with the fifth verification information generated by the second apparatus. If the third apparatus is maliciously replaced, the third verification information generated by the third apparatus may be inconsistent with the fifth verification information. Therefore, whether the identity verification on the third apparatus succeeds can be determined in this manner.

With reference to the second aspect, in a possible implementation of the second aspect, that the second apparatus determines, based on the fifth verification information and the third verification information, that the identity verification on the third apparatus succeeds includes The second apparatus determines whether the fifth verification information is consistent with the third verification information. When the fifth verification information is consistent with the third verification information, the first apparatus determines that the identity verification on the third apparatus succeeds.

The second apparatus may compare whether the third verification information is consistent with the fifth verification information. If the third verification information is consistent with the fifth verification information, the identity verification performed by the second apparatus on the third apparatus succeeds, in other words, the second apparatus determines that the identity verification on the third apparatus succeeds. Alternatively, if the third verification information is inconsistent with the fifth verification information, the identity verification performed by the second apparatus on the third apparatus fails, in other words, the second apparatus determines that the identity verification on the third apparatus fails. The second apparatus and the third apparatus generate verification information in a same manner, and the second apparatus performs verification. If the third apparatus is maliciously replaced, the third verification information generated by the third apparatus may be inconsistent with the fifth verification information. Therefore, whether the identity verification on the third apparatus succeeds can be determined in this manner With reference to the second aspect, in a possible implementation of the second aspect, if there are a plurality of third apparatuses, there are a plurality of pieces of fifth verification information and a plurality of pieces of third verification information. That the second apparatus determines, based on the fifth verification information and the third verification information, that the identity verification on the third apparatus succeeds includes the following.

The second apparatus aggregates the plurality of pieces of fifth verification information to obtain sixth verification information, and aggregates the plurality of pieces of third verification information to obtain seventh verification information.

The second apparatus determines whether the sixth verification information is consistent with the seventh verification information.

When the sixth verification information is consistent with the seventh verification information, the second apparatus determines that identity verification on the plurality of third apparatuses succeeds.

If there are the plurality of third apparatuses, the second apparatus may aggregate the plurality of pieces of fifth verification information to obtain the sixth verification information, and aggregate the plurality of pieces of third verification information to obtain the seventh verification information. By comparing the sixth verification information with the seventh verification information, the second apparatus may determine whether the identity verification on the plurality of third apparatuses succeeds. In this manner, the second apparatus does not need to compare the fifth verification information with the third verification information one by one, and only needs to perform one comparison to generally determine whether the identity verification on the plurality of third apparatuses succeeds, thereby reducing comparison processes, reducing a load of the second apparatus, and improving execution efficiency of the second apparatus.

With reference to the second aspect, in a possible implementation of the second aspect, the method further includes the second apparatus generates first verification information based on identity information of the second apparatus and a first random number from the first apparatus. The second apparatus sends a first message to the first apparatus. The first message includes the first verification information, and the first verification information is used to perform identity verification on the second apparatus.

In addition to that the second apparatus performs verification on the third apparatus, the first apparatus further needs to perform identity verification on the second apparatus. Therefore, the second apparatus may generate the first verification information based on the identity information of the second apparatus and the first random number. After obtaining the first verification information, the first apparatus may verify, based on the first verification information, whether the identity verification on the second apparatus succeeds. This is equivalent to that the first apparatus performs identity verification on the second apparatus, and the second apparatus performs identity verification on the third apparatus, to form a hierarchical verification mechanism.

With reference to the second aspect, in a possible implementation of the second aspect, the first message further includes the third verification information, and the third verification information is third verification information indicating that the verification performed by the second apparatus fails, or the third verification information is third verification information indicating that the verification performed by the second apparatus succeeds.

For example, in addition to the first verification information, the first message may further include N pieces of third verification information. The N pieces of third verification information may be generated by N third apparatuses included in the first set. The N third apparatuses may be all or some of third apparatuses included in the first set, and N is a positive integer. For example, in addition to sending the first verification information to the first apparatus, the second apparatus may further send third verification information generated by all the third apparatuses included in the first set to the first apparatus. In this case, the N third apparatuses include all the third apparatuses in the first set. In this way, the first apparatus can obtain relatively much information, and the first apparatus can perform identity verification on any third apparatus included in the first set when the first apparatus needs to perform identity verification on a third apparatus. In this case, the third apparatus is one of the N third apparatuses, and the third apparatus may be a third apparatus that succeeds in identity verification performed by the second apparatus, or may be a third apparatus that fails in identity verification performed by the second apparatus.

Alternatively, in addition to sending the first verification information to the first apparatus, the second apparatus may further send, to the first apparatus, third verification information generated by a third apparatus that fails to be verified by the second apparatus. In this case, the N third apparatuses may include all or some of the third apparatuses in the first set. The first message needs to carry only the third verification information generated by the third apparatus that fails to be verified by the second apparatus, and does not need to carry the third verification information generated by all the third apparatuses in the first set, thereby reducing signaling overheads. In addition, the first apparatus may not need to perform verification again on a third apparatus that is successfully verified by the second apparatus. Therefore, verification reliability is less affected. In this case, the third apparatus is one of the N third apparatuses, and the third apparatus is a third apparatus that fails in identity verification performed by the second apparatus.

With reference to the second aspect, in a possible implementation of the second aspect, the second random number and the first random number have a same length but different content, or the second random number is obtained by splicing the first random number and a third random number, or the second random number is the same as the first random number.

For example, the second random number may be determined based on the first random number. A possible implementation of determining the second random number based on the first random number is determining a length of the second random number based on the first random number. For example, the length of the second random number may be the same as that of the first random number. In this case, the second random number and the first random number may have the same content, in other words, the first random number and the second random number are a same random number. Alternatively, the second random number and the first random number may have different content, in other words, the second random number and the first random number are two random numbers that have a same length but different content.

Another possible implementation of determining the second random number based on the first random number is some or all of content of the second random number may be determined based on the first random number. For example, a secondary authentication node selects the third random number. The second random number may be a random number obtained by concatenating (or splicing) the first random number and the third random number. The length of the second random number is a sum of the length of the first random number and a length of the third random number. The second random number is obtained by concatenating the first random number and the third random number, for example, placing the third random number after the end of the first random number, or placing the first random number after the end of the third random number.

Alternatively, the second random number may be obtained in another manner. For example, the length of the second random number is different from the length of the first random number, and the second random number is not obtained by splicing the first random number and the third random number.

According to a third aspect, a third identity verification method is provided. The method includes a second apparatus sends a first random number to a third apparatus. A first vehicle carries a first set, the first set includes the second apparatus and the third apparatus, the first vehicle further carries a first apparatus, and the first apparatus communicates with the third apparatus by using the second apparatus. The second apparatus receives third verification information from the third apparatus. The third verification information is generated based on the first random number and identity information of the third apparatus. The second apparatus obtains fourth verification information based on the third verification information. The fourth verification information is used to verify whether identity verification on the third apparatus succeeds. The second apparatus sends the fourth verification information to the first apparatus.

The method according to the third aspect may be performed by the third apparatus. The third apparatus may be a communications device, or a communications apparatus such as a chip system that can support a communications device in implementing a function required by the method. For example, the communications device is a vehicle-mounted apparatus.

In this embodiment of this application, the first set includes the second apparatus and the third apparatus. The second apparatus may process the third verification information generated by the third apparatus, to obtain the fourth verification information. The first apparatus verifies, based on the fourth verification information, whether the identity verification on the third apparatus succeeds. Compared with a case in which the third apparatus directly sends the third verification information to the first apparatus, for example, if there are a plurality of pieces of third verification information, the second apparatus obtains the fourth verification information based on the third verification information, which is equivalent to that the second apparatus obtains one piece of fourth verification information based on the plurality of pieces of the third verification information, thereby reducing a quantity of pieces of verification information, and reducing signaling overheads. In addition, the second apparatus does not need to perform verification on the third apparatus, and only the first apparatus needs to perform verification, thereby reducing a load of the second apparatus.

With reference to the third aspect, in a possible implementation of the third aspect, the method further includes the second apparatus generates first verification information based on identity information of the second apparatus and the first random number. The first verification information is used to verify whether identity verification on the second apparatus succeeds. The second apparatus sends the first verification information to the first apparatus.

In addition to sending the fourth verification information used to perform identity verification on the third apparatus to the first apparatus, the second apparatus may further send the first verification information used to perform identity verification on the second apparatus to the first apparatus. In this case, in addition to performing identity verification on the third apparatus, the first apparatus may further perform identity verification on the second apparatus. In this way, verification can be performed on each apparatus carried by the first vehicle, thereby improving security of the apparatus carried by the first vehicle.

With reference to the third aspect, in a possible implementation of the third aspect, there are a plurality of third apparatuses, and correspondingly there are a plurality of pieces of third verification information. That the second apparatus obtains fourth verification information based on the third verification information includes the second apparatus aggregates the plurality of pieces of third verification information to obtain the fourth verification information.

The second apparatus may aggregate the plurality of pieces of third verification information from the plurality of third apparatuses to obtain the fourth verification information, and send the fourth verification information to the first apparatus. For example, one aggregation manner is to perform exclusive OR on the plurality of pieces of third verification information to obtain the fourth verification information. Certainly, there may be another aggregation manner. The fourth verification information obtained in this manner has a smaller amount of information than the plurality of pieces of third verification information. The second apparatus only needs to send the fourth verification information, and does not need to send the plurality of pieces of third verification information, thereby reducing signaling overheads.

With reference to the third aspect, in a possible implementation of the third aspect, the method further includes the second apparatus receives a second message from the first apparatus. The second message is used to request to obtain verification information corresponding to the plurality of third apparatuses. The second apparatus sends a third message to the first apparatus. The third message includes the plurality of pieces of third verification information.

The fourth verification information is obtained by aggregating the plurality of pieces of third verification information. Therefore, if the first apparatus determines, based on the fourth verification information, that identity verification on the plurality of third apparatuses fails, it is only generally considered that there is a third apparatus that fails in identity verification in the plurality of third apparatuses. However, the first apparatus cannot determine a specific third apparatus that fails in identity verification in the plurality of third apparatuses. Therefore, the first apparatus may request to obtain the plurality of pieces of third verification information generated by the plurality of third apparatuses. In this way, the first apparatus may successively perform verification based on the plurality of pieces of third verification information, so as to determine a specific third apparatus that fails in identity verification. In this manner, the third apparatus that fails in identity verification can be located more accurately.

According to a fourth aspect, a communications apparatus is provided. For example, the communications apparatus is the first apparatus described above. The communications apparatus is configured to perform the method according to the first aspect and any possible implementation of the first aspect. Further, the communications apparatus may include modules configured to perform the method according to the first aspect and any possible implementation of the first aspect. For example, the communications apparatus includes a processing module and a transceiver module. The transceiver module may be a function module, and the function module can complete both an information receiving function and an information sending function. Alternatively, the transceiver module may be a collective name of a sending module and a receiving module. The sending module is configured to complete the information sending function, and the receiving module is configured to complete the information receiving function. For example, the communications apparatus is a vehicle-mounted apparatus.

The transceiver module is configured to send a first random number to a second apparatus. A first vehicle carries the first apparatus and a first set, the second apparatus belongs to the first set, the first set further includes a third apparatus, and the first apparatus communicates with the third apparatus by using the second apparatus.

The transceiver module is further configured to receive a first message from the second apparatus. The first message includes first verification information, the first verification information is used to perform identity verification on the second apparatus, and the first verification information is generated based on identity information of the second apparatus and the first random number.

The processing module is configured to determine, based on the first verification information and the first random number, that the identity verification on the second apparatus succeeds.

With reference to the fourth aspect, in a possible implementation of the fourth aspect, the processing module is configured to determine, in the following manner based on the first verification information and the first random number, that the identity verification on the second apparatus succeeds generating second verification information based on the identity information of the second apparatus and the first random number, determining whether the first verification information is consistent with the second verification information, and when the first verification information is consistent with the second verification information, determining that the identity verification on the second apparatus succeeds.

With reference to the fourth aspect, in a possible implementation of the fourth aspect, the first message further includes fourth verification information, and the fourth verification information is used to indicate whether identity verification on the third apparatus succeeds. The processing module is configured to generate the second verification information based on the identity information of the second apparatus and the first random number in the following manner: generating the second verification information based on the identity information of the second apparatus, the fourth verification information, and the first random number.

With reference to the fourth aspect, in a possible implementation of the fourth aspect, the first message further includes third verification information generated by the third apparatus, and the third verification information is obtained by the third apparatus based on identity information of the third apparatus.

With reference to the fourth aspect, in a possible implementation of the fourth aspect, the first message further includes the fourth verification information, and the fourth verification information is used to indicate whether the identity verification on the third apparatus succeeds. The processing module is further configured to, after determining that the identity verification on the second apparatus succeeds, when the fourth verification information indicates that the identity verification on the third apparatus fails, perform verification based on the third verification information, to determine whether the identity verification on the third apparatus succeeds.

With reference to the fourth aspect, in a possible implementation of the fourth aspect, the first message further includes the fourth verification information.

The transceiver module is further configured to, when the fourth verification information is used to indicate that the identity verification on the third apparatus fails, send a second message to the second apparatus. The second message is used to request to obtain verification information corresponding to the third apparatus.

The transceiver module is further configured to receive a third message from the second apparatus. The third message includes third verification information corresponding to the third apparatus.

The processing module is further configured to perform verification based on the third verification information, to determine whether the identity verification on the third apparatus succeeds.

With reference to the fourth aspect, in a possible implementation of the fourth aspect, the transceiver module is further configured to, when the processing module determines that the identity verification on the second apparatus fails, send a second message to the second apparatus, where the second message is used to request to obtain verification information corresponding to the third apparatus.

The transceiver module is further configured to receive a third message from the second apparatus. The third message includes third verification information corresponding to the third apparatus.

The processing module is further configured to perform verification based on the third verification information, to determine whether the identity verification on the third apparatus succeeds.

With reference to the fourth aspect, in a possible implementation of the fourth aspect, there are a plurality of third apparatuses, the first message further includes fourth verification information, and the fourth verification information is obtained by aggregating a plurality of pieces of third verification information from the plurality of third apparatuses. The processing module is further configured to perform verification based on the fourth verification information, to determine whether identity verification on the plurality of third apparatuses succeeds.

With reference to the fourth aspect, in a possible implementation of the fourth aspect, the transceiver module is further configured to, when the processing module determines, based on the fourth verification information, that the identity verification on the plurality of third apparatuses fails, send a second message to the second apparatus, where the second message is used to request to obtain verification information corresponding to the plurality of third apparatuses.

The transceiver module is further configured to receive a third message from the second apparatus. The third message includes the plurality of pieces of third verification information.

The processing module is further configured to perform verification based on the plurality of pieces of third verification information, to determine whether identity verification on each of the plurality of third apparatuses succeeds.

For technical effects brought by the fourth aspect or the possible implementations of the fourth aspect, refer to the descriptions of the technical effects brought by the first aspect or the possible implementations of the first aspect.

According to a fifth aspect, a communications apparatus is provided. For example, the communications apparatus is the second apparatus described above. The communications apparatus is configured to perform the method according to the second aspect and any possible implementation of the second aspect. Further, the communications apparatus may include modules configured to perform the method according to the second aspect and any possible implementation of the second aspect. For example, the communications apparatus includes a processing module and a transceiver module. The transceiver module may be a function module, and the function module can complete both an information receiving function and an information sending function. Alternatively, the transceiver module may be a collective name of a sending module and a receiving module. The sending module is configured to complete the information sending function, and the receiving module is configured to complete the information receiving function. For example, the communications apparatus is a vehicle-mounted apparatus.

The transceiver module is configured to send a second random number to a third apparatus. A first vehicle carries a first apparatus and a first set, the second apparatus and the third apparatus belong to the first set, and the first apparatus communicates with the third apparatus by using the second apparatus.

The transceiver module is further configured to receive third verification information from the third apparatus. The third verification information is generated based on identity information of the third apparatus and the second random number.

The processing module is configured to determine, based on the second random number and the third verification information, that identity verification on the third apparatus succeeds.

With reference to the fifth aspect, in a possible implementation of the fifth aspect, the processing module is configured to determine, in the following manner based on the second random number and the third verification information, that the identity verification on the third apparatus succeeds generating fifth verification information based on the second random number and the identity information of the third apparatus, and determining, based on the fifth verification information and the third verification information, that the identity verification on the third apparatus succeeds.

With reference to the fifth aspect, in a possible implementation of the fifth aspect, the processing module is configured to determine, in the following manner based on the fifth verification information and the third verification information, that the identity verification on the third apparatus succeeds determining whether the fifth verification information is consistent with the third verification information, and when the fifth verification information is consistent with the third verification information, determining that the identity verification on the third apparatus succeeds.

With reference to the fifth aspect, in a possible implementation of the fifth aspect, if there are a plurality of third apparatuses, there are a plurality of pieces of fifth verification information and a plurality of pieces of third verification information. The processing module is configured to determine, in the following manner based on the fifth verification information and the third verification information, that the identity verification on the third apparatus succeeds, which includes aggregating the plurality of pieces of fifth verification information to obtain sixth verification information, and aggregating the plurality of pieces of third verification information to obtain seventh verification information, determining whether the sixth verification information is consistent with the seventh verification information, and when the sixth verification information is consistent with the seventh verification information, determining that identity verification on the plurality of third apparatuses succeeds.

With reference to the fifth aspect, in a possible implementation of the fifth aspect, the processing module is further configured to generate first verification information based on identity information of the second apparatus and a first random number from the first apparatus.

The transceiver module is further configured to send a first message to the first apparatus. The first message includes the first verification information, and the first verification information is used to perform identity verification on the second apparatus.

With reference to the fifth aspect, in a possible implementation of the fifth aspect, the first message further includes the third verification information, and the third verification information is third verification information indicating that the verification performed by the second apparatus fails, or the third verification information is third verification information indicating that the verification performed by the second apparatus succeeds.

With reference to the fifth aspect, in a possible implementation of the fifth aspect, the second random number and the first random number have a same length but different content, or the second random number is obtained by splicing the first random number and a third random number, or the second random number is the same as the first random number.

For technical effects brought by the fifth aspect or the possible implementations of the fifth aspect, refer to the descriptions of the technical effects brought by the second aspect or the possible implementations of the second aspect.

According to a sixth aspect, a communications apparatus is provided. For example, the communications apparatus is the second apparatus described above. The communications apparatus is configured to perform the method according to the third aspect and any possible implementation of the third aspect. Further, the communications apparatus may include modules configured to perform the method according to the third aspect and any possible implementation of the third aspect. For example, the communications apparatus includes a processing module and a transceiver module. The transceiver module may be a function module, and the function module can complete both an information receiving function and an information sending function. Alternatively, the transceiver module may be a collective name of a sending module and a receiving module. The sending module is configured to complete the information sending function, and the receiving module is configured to complete the information receiving function. For example, the communications apparatus is a vehicle-mounted apparatus.

The transceiver module is configured to send a first random number to a third apparatus. A first vehicle carries a first set, the first set includes the second apparatus and the third apparatus, the first vehicle further carries a first apparatus, and the first apparatus communicates with the third apparatus by using the second apparatus.

The transceiver module is further configured to receive third verification information from the third apparatus. The third verification information is generated based on the first random number and identity information of the third apparatus.

The processing module is configured to obtain fourth verification information based on the third verification information. The fourth verification information is used to verify whether identity verification on the third apparatus succeeds.

The transceiver module is further configured to send the fourth verification information to the first apparatus.

With reference to the sixth aspect, in a possible implementation of the sixth aspect, the processing module is further configured to generate first verification information based on identity information of the second apparatus and the first random number, where the first verification information is used to verify whether identity verification on the second apparatus succeeds.

The transceiver module is further configured to send the first verification information to the first apparatus.

With reference to the sixth aspect, in a possible implementation of the sixth aspect, there are a plurality of third apparatuses, and correspondingly there are a plurality of pieces of third verification information. The processing module is configured to obtain the fourth verification information based on the third verification information in the following manner aggregating the plurality of pieces of third verification information to obtain the fourth verification information.

With reference to the sixth aspect, in a possible implementation of the sixth aspect, the transceiver module is further configured to receive a second message from the first apparatus, where the second message is used to request to obtain verification information corresponding to the plurality of third apparatuses, and send a third message to the first apparatus, where the third message includes the plurality of pieces of third verification information.

For technical effects brought by the sixth aspect or the possible implementations of the sixth aspect, refer to the descriptions of the technical effects brought by the third aspect or the possible implementations of the third aspect.

According to a seventh aspect, a communications apparatus is provided. The communications apparatus is, for example, the first apparatus described above. The communications apparatus includes a processor and a transceiver. The processor and the transceiver are configured to implement the method described in the first aspect or the possible designs of the first aspect. For example, the communications apparatus is a chip disposed in a communications device, and the transceiver is, for example, implemented by using an antenna, a feeder, or a codec in the communications device. Alternatively, if the communications apparatus is the chip disposed in the communications device, the transceiver is, for example, a communications interface in the chip, and the communications interface is connected to a radio frequency transceiver component in the communications device, to send and receive information by using the radio frequency transceiver component. For example, the communications device is a vehicle-mounted apparatus.

The transceiver is configured to send a first random number to a second apparatus. A first vehicle carries the first apparatus and a first set, the second apparatus belongs to the first set, the first set further includes a third apparatus, and the first apparatus communicates with the third apparatus by using the second apparatus.

The transceiver is further configured to receive a first message from the second apparatus. The first message includes first verification information, the first verification information is used to perform identity verification on the second apparatus, and the first verification information is generated based on identity information of the second apparatus and the first random number.

The processor is configured to determine, based on the first verification information and the first random number, that the identity verification on the second apparatus succeeds.

With reference to the seventh aspect, in a possible implementation of the seventh aspect, the processor is configured to determine, in the following manner based on the first verification information and the first random number, that the identity verification on the second apparatus succeeds generating second verification information based on the identity information of the second apparatus and the first random number, determining whether the first verification information is consistent with the second verification information, and when the first verification information is consistent with the second verification information, determining that the identity verification on the second apparatus succeeds.

With reference to the seventh aspect, in a possible implementation of the seventh aspect, the first message further includes fourth verification information, and the fourth verification information is used to indicate whether identity verification on the third apparatus succeeds. The processor is configured to generate the second verification information based on the identity information of the second apparatus and the first random number by generating the second verification information based on the identity information of the second apparatus, the fourth verification information, and the first random number.

With reference to the seventh aspect, in a possible implementation of the seventh aspect, the first message further includes third verification information generated by the third apparatus, and the third verification information is obtained by the third apparatus based on identity information of the third apparatus.

With reference to the seventh aspect, in a possible implementation of the seventh aspect, the first message further includes the fourth verification information, and the fourth verification information is used to indicate whether the identity verification on the third apparatus succeeds. The processor is further configured to after determining that the identity verification on the second apparatus succeeds, when the fourth verification information indicates that the identity verification on the third apparatus fails, perform verification based on the third verification information, to determine whether the identity verification on the third apparatus succeeds.

With reference to the seventh aspect, in a possible implementation of the seventh aspect, the first message further includes the fourth verification information.

The transceiver is further configured to, when the fourth verification information is used to indicate that the identity verification on the third apparatus fails, send a second message to the second apparatus. The second message is used to request to obtain verification information corresponding to the third apparatus.

The transceiver is further configured to receive a third message from the second apparatus. The third message includes third verification information corresponding to the third apparatus.

The processor is further configured to perform verification based on the third verification information, to determine whether the identity verification on the third apparatus succeeds.

With reference to the seventh aspect, in a possible implementation of the seventh aspect, the transceiver is further configured to when the processor determines that the identity verification on the second apparatus fails, send a second message to the second apparatus, where the second message is used to request to obtain verification information corresponding to the third apparatus.

The transceiver is further configured to receive a third message from the second apparatus. The third message includes third verification information corresponding to the third apparatus.

The processor is further configured to perform verification based on the third verification information, to determine whether the identity verification on the third apparatus succeeds.

With reference to the seventh aspect, in a possible implementation of the seventh aspect, there are a plurality of third apparatuses, the first message further includes fourth verification information, and the fourth verification information is obtained by aggregating a plurality of pieces of third verification information from the plurality of third apparatuses. The processor is further configured to perform verification based on the fourth verification information, to determine whether identity verification on the plurality of third apparatuses succeeds.

With reference to the seventh aspect, in a possible implementation of the seventh aspect, the transceiver is further configured to, when the processor determines, based on the fourth verification information, that the identity verification on the plurality of third apparatuses fails, send a second message to the second apparatus, where the second message is used to request to obtain verification information corresponding to the plurality of third apparatuses.

The transceiver is further configured to receive a third message from the second apparatus. The third message includes the plurality of pieces of third verification information.

The processor is further configured to perform verification based on the plurality of pieces of third verification information, to determine whether identity verification on each of the plurality of third apparatuses succeeds.

For technical effects brought by the seventh aspect or the possible implementations of the seventh aspect, refer to the descriptions of the technical effects brought by the first aspect or the possible implementations of the first aspect.

According to an eighth aspect, a communications apparatus is provided. The communications apparatus is, for example, the second apparatus described above. The communications apparatus includes a processor and a transceiver. The processor and the transceiver are configured to implement the method described in the second aspect or the possible designs of the second aspect. For example, the communications apparatus is a chip disposed in a communications device, and the transceiver is, for example, implemented by using an antenna, a feeder, or a codec in the communications device. Alternatively, if the communications apparatus is the chip disposed in the communications device, the transceiver is, for example, a communications interface in the chip, and the communications interface is connected to a radio frequency transceiver component in the communications device, to send and receive information by using the radio frequency transceiver component. For example, the communications device is a vehicle-mounted apparatus.

The transceiver is configured to send a second random number to a third apparatus. A first vehicle carries a first apparatus and a first set, the second apparatus and the third apparatus belong to the first set, and the first apparatus communicates with the third apparatus by using the second apparatus.

The transceiver is further configured to receive third verification information from the third apparatus. The third verification information is generated based on identity information of the third apparatus and the second random number.

The processor is configured to determine, based on the second random number and the third verification information, that identity verification on the third apparatus succeeds.

With reference to the eighth aspect, in a possible implementation of the eighth aspect, the processor is configured to determine, in the following manner based on the second random number and the third verification information, that the identity verification on the third apparatus succeeds, which includes generating fifth verification information based on the second random number and the identity information of the third apparatus, and determining, based on the fifth verification information and the third verification information, that the identity verification on the third apparatus succeeds.

With reference to the eighth aspect, in a possible implementation of the eighth aspect, the processor is configured to determine, in the following manner based on the fifth verification information and the third verification information, that the identity verification on the third apparatus succeeds, which includes determining whether the fifth verification information is consistent with the third verification information, and when the fifth verification information is consistent with the third verification information, determining that the identity verification on the third apparatus succeeds.

With reference to the eighth aspect, in a possible implementation of the eighth aspect, if there are a plurality of third apparatuses, there are a plurality of pieces of fifth verification information and a plurality of pieces of third verification information. The processor is configured to determine, in the following manner based on the fifth verification information and the third verification information, that the identity verification on the third apparatus succeeds, which includes aggregating the plurality of pieces of fifth verification information to obtain sixth verification information, and aggregating the plurality of pieces of third verification information to obtain seventh verification information, determining whether the sixth verification information is consistent with the seventh verification information, and when the sixth verification information is consistent with the seventh verification information, determining that identity verification on the plurality of third apparatuses succeeds.

With reference to the eighth aspect, in a possible implementation of the eighth aspect, the processor is further configured to generate first verification information based on identity information of the second apparatus and a first random number from the first apparatus.

The transceiver is further configured to send a first message to the first apparatus. The first message includes the first verification information, and the first verification information is used to perform identity verification on the second apparatus.

With reference to the eighth aspect, in a possible implementation of the eighth aspect, the first message further includes the third verification information, and the third verification information is third verification information indicating that the verification performed by the second apparatus fails, or the third verification information is third verification information indicating that the verification performed by the second apparatus succeeds.

With reference to the eighth aspect, in a possible implementation of the eighth aspect, the second random number and the first random number have a same length but different content, or the second random number is obtained by splicing the first random number and a third random number, or the second random number is the same as the first random number.

For technical effects brought by the eighth aspect or the possible implementations of the eighth aspect, refer to the descriptions of the technical effects brought by the second aspect or the possible implementations of the second aspect.

According to a ninth aspect, a communications apparatus is provided. The communications apparatus is, for example, the second apparatus described above. The communications apparatus includes a processor and a transceiver. The processor and the transceiver are configured to implement the method described in the third aspect or the possible designs of the third aspect. For example, the communications apparatus is a chip disposed in a communications device, and the transceiver is, for example, implemented by using an antenna, a feeder, or a codec in the communications device. Alternatively, if the communications apparatus is the chip disposed in the communications device, the transceiver is, for example, a communications interface in the chip, and the communications interface is connected to a radio frequency transceiver component in the communications device, to send and receive information by using the radio frequency transceiver component. For example, the communications device is a vehicle-mounted apparatus.

The transceiver is configured to send a first random number to a third apparatus. A first vehicle carries a first set, the first set includes the second apparatus and the third apparatus, the first vehicle further carries a first apparatus, and the first apparatus communicates with the third apparatus by using the second apparatus.

The transceiver is further configured to receive third verification information from the third apparatus. The third verification information is generated based on the first random number and identity information of the third apparatus.

The processor is configured to obtain fourth verification information based on the third verification information. The fourth verification information is used to verify whether identity verification on the third apparatus succeeds.

The transceiver is further configured to send the fourth verification information to the first apparatus.

With reference to the ninth aspect, in a possible implementation of the ninth aspect, the processor is further configured to generate first verification information based on identity information of the second apparatus and the first random number, where the first verification information is used to verify whether identity verification on the second apparatus succeeds.

The transceiver is further configured to send the first verification information to the first apparatus.

With reference to the ninth aspect, in a possible implementation of the ninth aspect, there are a plurality of third apparatuses, and correspondingly there are a plurality of pieces of third verification information. The processor is configured to obtain the fourth verification information based on the third verification information in the following manner, which includes aggregating the plurality of pieces of third verification information to obtain the fourth verification information.

With reference to the ninth aspect, in a possible implementation of the ninth aspect, the transceiver is further configured to receive a second message from the first apparatus, where the second message is used to request to obtain verification information corresponding to the plurality of third apparatuses, and send a third message to the first apparatus, where the third message includes the plurality of pieces of third verification information.

For technical effects brought by the ninth aspect or the possible implementations of the ninth aspect, refer to the descriptions of the technical effects brought by the third aspect or the possible implementations of the third aspect.

According to a tenth aspect, a communications apparatus is provided. The communications apparatus may be the first apparatus in the foregoing method designs. For example, the communications apparatus is a chip disposed in a communications device. For example, the communications device is a vehicle-mounted apparatus. The communications apparatus includes a memory configured to store computer-executable program code, and a processor. The processor is coupled to the memory. The program code stored in the memory includes an instruction. When the processor executes the instruction, the communications apparatus is enabled to perform the method according to the first aspect and any possible implementation of the first aspect.

The communications apparatus may further include a communications interface. The communications interface may be a transceiver in the communications apparatus. For example, the communications interface is implemented by using an antenna, a feeder, or a codec in the communications apparatus. Alternatively, if the communications apparatus is the chip disposed in the communications device, the communications interface may be an input/output interface in the chip, for example, an input/output pin.

According to an eleventh aspect, a communications apparatus is provided. The communications apparatus may be the second apparatus in the foregoing method designs. For example, the communications apparatus is a chip disposed in a communications device. For example, the communications device is a vehicle-mounted apparatus. The communications apparatus includes a memory configured to store computer-executable program code, and a processor. The processor is coupled to the memory. The program code stored in the memory includes an instruction. When the processor executes the instruction, the communications apparatus is enabled to perform the method according to the second aspect and any possible implementation of the second aspect.

The communications apparatus may further include a communications interface. The communications interface may be a transceiver in the communications apparatus. For example, the communications interface is implemented by using an antenna, a feeder, or a codec in the communications apparatus. Alternatively, if the communications apparatus is the chip disposed in the communications device, the communications interface may be an input/output interface in the chip, for example, an input/output pin.

According to a twelfth aspect, a communications apparatus is provided. The communications apparatus may be the third apparatus in the foregoing method designs. For example, the communications apparatus is a chip disposed in a communications device. For example, the communications device is a vehicle-mounted apparatus. The communications apparatus includes a memory configured to store computer-executable program code, and a processor. The processor is coupled to the memory. The program code stored in the memory includes an instruction. When the processor executes the instruction, the communications apparatus is enabled to perform the method according to the third aspect and any possible implementation of the third aspect.

The communications apparatus may further include a communications interface. The communications interface may be a transceiver in the communications apparatus. For example, the communications interface is implemented by using an antenna, a feeder, or a codec in the communications apparatus. Alternatively, if the communications apparatus is the chip disposed in the communications device, the communications interface may be an input/output interface in the chip, for example, an input/output pin.

According to a thirteenth aspect, a first communications system is provided. The communications system includes the communications apparatus according to the fourth aspect, the communications apparatus according to the seventh aspect, or the communications apparatus according to the tenth aspect, and includes the communications apparatus according to the fifth aspect, the communications apparatus according to the eighth aspect, or the communications apparatus according to the eleventh aspect.

According to a fourteenth aspect, a second communications system is provided. The communications system includes the communications apparatus according to the fourth aspect, the communications apparatus according to the seventh aspect, or the communications apparatus according to the tenth aspect, and includes the communications apparatus according to the sixth aspect, the communications apparatus according to the ninth aspect, or the communications apparatus according to the twelfth aspect.

The first communications system and the second communications system may be a same communications system, or may be different communications systems.

According to a fifteenth aspect, a computer storage medium is provided. The computer-readable storage medium is configured to store a computer program, and when the computer program is run on a computer, the computer is enabled to perform the method according to the first aspect and any possible implementation of the first aspect.

According to a sixteenth aspect, a computer storage medium is provided. The computer-readable storage medium is configured to store a computer program, and when the computer program is run on a computer, the computer is enabled to perform the method according to the second aspect and any possible implementation of the second aspect.

According to a seventeenth aspect, a computer storage medium is provided. The computer-readable storage medium is configured to store a computer program, and when the computer program is run on a computer, the computer is enabled to perform the method according to the third aspect and any possible implementation of the third aspect.

According to an eighteenth aspect, a computer program product including an instruction is provided. The computer program product is configured to store a computer program, and when the computer program is run on a computer, the computer is enabled to perform the method according to the first aspect and any possible implementation of the first aspect.

According to a nineteenth aspect, a computer program product including an instruction is provided. The computer program product is configured to store a computer program, and when the computer program is run on a computer, the computer is enabled to perform the method according to the second aspect and any possible implementation of the second aspect.

According to a twentieth aspect, a computer program product including an instruction is provided. The computer program product is configured to store a computer program, and when the computer program is run on a computer, the computer is enabled to perform the method according to the third aspect and any possible implementation of the third aspect.

In the aspects provided above, for example, if identity verification performed by a device 1 on a device 2 succeeds, the device 1 may consider that the device 2 is authorized. However, if identity verification performed by the device 1 on the device 2 fails (or the identity verification fails), the device 1 may consider that the device 2 is unauthorized. For example, if the identity verification performed by the first apparatus on the second apparatus succeeds, the first apparatus may consider that the second apparatus is authorized. However, if the identity verification performed by the first apparatus on the second apparatus fails (or the identity verification fails), the first apparatus may consider that the second apparatus is unauthorized.

The embodiments of this application provide a hierarchical verification mechanism, so that verification can be performed on each apparatus carried by a vehicle, and hierarchical verification can ensure relatively high verification reliability as much as possible. In addition, for each level of apparatuses, verification needs to be performed on a relatively small quantity of apparatuses, thereby reducing device load.

DESCRIPTION OF EMBODIMENTS

Figure 1:
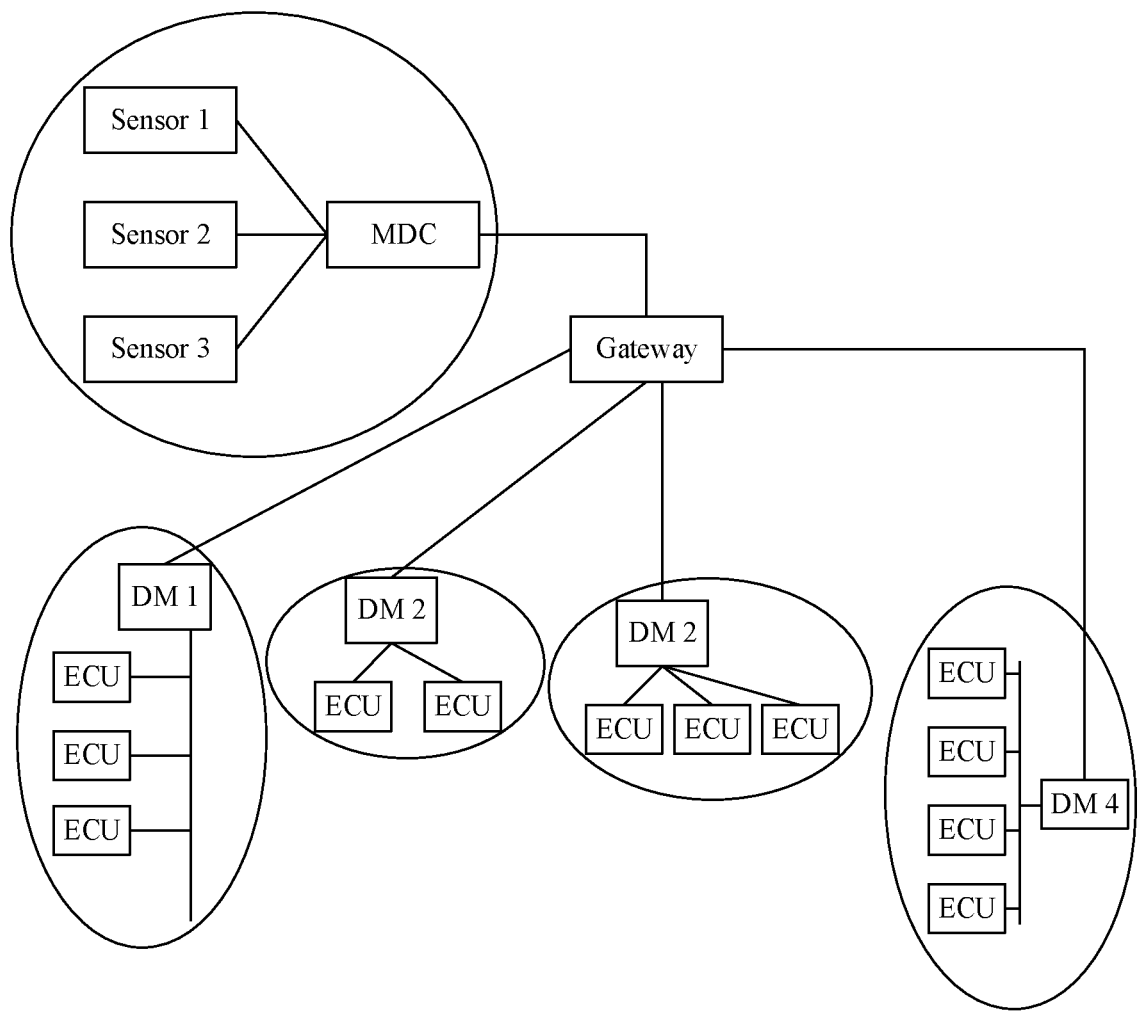
FIG. 1 is a schematic diagram of a network architecture to which an embodiment of this application is applied.

To make objectives, technical solutions, and advantages of the embodiments of this application clearer, the following further describes the embodiments of this application in detail with reference to the accompanying drawings.

(1) A vehicle-mounted device may be considered as a device placed or installed on a vehicle. For example, a vehicle that can perform a self-driving function usually makes a driving decision based on information provided by an ADAS system. The ADAS includes many sensors, such as a camera, a millimeter-wave radar, an ultrasonic radar, and LiDAR. All these sensors may be considered as vehicle-mounted devices. For example, an intra-vehicle network of a vehicle may include a plurality of electronic control units (ECUs), and all these ECUs may be considered as vehicle-mounted devices.

For example, one type of vehicle-mounted device is an on-board unit (OBU), and is usually installed on a vehicle. In an electronic toll collection (ETC) system, a road side unit (RSU) is disposed on a road side, and the OBU may communicate with the RSU, for example, may communicate with the RSU through microwaves. When the vehicle passes through the RSU, the OBU and the RSU may communicate with each other through microwaves. In the ETC system, the OBU establishes a microwave communication link with the RSU by using a dedicated short-range communications (DSRC) technology, so that a process such as vehicle identification or electronic fee deduction can be implemented when the vehicle is moving without stopping.

Alternatively, if various terminal devices described below are located on a vehicle (for example, placed in the vehicle or installed in the vehicle), all the terminal devices may be considered as vehicle-mounted terminal devices or referred to as vehicle-mounted devices.

A terminal device includes a device that provides a user with voice and/or data connectivity, for example, may include a handheld device having a wireless connection function or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) terminal device, a vehicle-to-everything (V2X) terminal device, a machine-to-machine (M2M)/machine type communication (MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or a cellular phone), a computer with a mobile terminal device, or a portable, pocket-sized, handheld, or computer built-in mobile apparatus, for example, a Personal Communications Services (PCS) phone, a cordless telephone set, a Session Initiation Protocol (SIP) phone, a wireless local loop (WLL) station, or a personal digital assistant (PDA). The terminal device further includes a limited device, for example, a device with relatively low power consumption, a device having a limited storage capability, or a device having a limited calculation capability. For example, the terminal device includes an information sensing device such as a bar code device, a radio frequency identification (RFID) device, a sensor, a Global Positioning System (GPS), or a laser scanner.

By way of example and not limitation, in the embodiments of this application, the vehicle-mounted device placed or installed on the vehicle may further include a wearable device. The wearable device may also be referred to as a wearable intelligent device, an intelligent wearable device, or the like. The wearable device is a collective term for devices that are developed by applying a wearable technology to perform intelligent design on daily wear, for example, glasses, gloves, a watch, clothes, and shoes. The wearable device is a portable device that can be directly worn on a human body or integrated into clothes or an accessory of the user. The wearable device is not merely a hardware device, but is configured to implement a powerful function through software support, data exchange, and cloud interaction. In a broad sense, wearable intelligent devices include full-featured and large-sized devices that can implement all or some functions without depending on smartphones, for example, smartwatches or smart glasses, and devices that focus on only one type of application function and need to work with another device such as a smartphone, for example, various smart bands, smart helmets, or smart jewelry for vital sign monitoring.

(2) The terms "system" and "network" may be used interchangeably in the embodiments of this application. The term "at least one" means one or more, and "a plurality of" means two or more. The term "and/or" describes an association relationship between associated objects and may indicate three relationships. For example, A and/or B may indicate the following cases Only A exists, both A and B exist, and only B exists, where A and B may be singular or plural. The character "/" generally indicates an "or" relationship between the associated objects, and "at least one of the following items (pieces)" or a similar expression means any combination of the items, including any combination of singular items (pieces) or plural items (pieces). For example, at least one (piece) of a, b, or c may represent a, b, c, a-b, a-c, b-c, or a-b-c, where a, b, and c may be singular or plural.

In addition, unless otherwise specified, ordinal numbers such as "first" and "second" in the embodiments of this application are used to distinguish between a plurality of objects, but are not intended to limit a sequence, a time sequence, priorities, or importance of the plurality of objects. For example, a first message and a second message are merely intended to distinguish between different messages, but do not indicate that the two messages are different in a priority, a sending sequence, importance, or the like.

The foregoing describes some concepts in the embodiments of this application, and the following describes technical features in the embodiments of this application.

There may be a plurality of vehicle-mounted devices in a vehicle. For example, a vehicle that can perform self-driving usually makes a driving decision based on information provided by an ADAS. The ADAS includes many sensors, such as a camera, a millimeter-wave radar, an ultrasonic radar, and an optical radar (e.g., LiDAR). All these sensors are vehicle-mounted devices. Obviously, these vehicle-mounted devices are very important to a vehicle function and driving safety.

However, because regular vehicle-mounted devices such as an ADAS sensor and an ECU are expensive due to good quality, maintenance personnel are motivated to use fake low-quality devices to replace these vehicle-mounted devices for profits, or illegal merchants are motivated to sell fake and shoddy vehicle-mounted devices for profits. For example, the ADAS sensor is usually located outside a vehicle, and is relatively easy to be stolen or replaced. Even a vehicle-mounted device located inside a vehicle may be replaced during maintenance or repair.

A fake and shoddy vehicle-mounted device may affect vehicle performance, and may even affect driving safety. From the perspective of information security, fake and shoddy vehicle-mounted devices are more likely to introduce system vulnerabilities and risks. Therefore, it is crucial to ensure authenticity and regularity of a vehicle-mounted device. However, there is no relatively reliable manner of performing verification on a vehicle-mounted device.

In view of this, the technical solutions in the embodiments of this application are provided. In the embodiments of this application, a first set includes a second apparatus and a third apparatus. A first apparatus only needs to perform verification on the second apparatus, and verification on the third apparatus may be performed, for example, by the second apparatus. In this way, identity verification can be performed on all levels of vehicle-mounted devices. For each level of vehicle-mounted devices, verification needs to be performed on a relatively small quantity of devices, thereby helping reduce device load.

The following describes a network architecture to which the embodiments of this application are applied. FIG. 1 shows a network architecture to which an embodiment of this application is applied.

FIG. 1 shows all or some of vehicle-mounted devices included in a vehicle. These vehicle-mounted devices may be classified into several domains (domain). Each domain includes one or more vehicle-mounted devices, and each domain has a domain manager (DM). For example, ADAS sensors constitute one domain, and a domain manager of the domain is a mobile data center (MDC). In addition, FIG. 1 further includes four domain managers: a DM 1, a DM 2, a DM 3, and a DM 4. The four domain managers correspond to four domains. For example, all vehicle-mounted devices in the four domains are ECUs. An intra-domain device communicates with a gateway through a DM. In this embodiment of this application, a domain manager may be considered as a secondary node, all the domain managers are connected to the gateway, and the gateway may be considered as a primary node. For example, a secondary node may be referred to as a secondary authentication node, and a primary node may be referred to as a primary authentication node. Alternatively, a domain may be referred to as a set. A vehicle may generally include one primary authentication node and one or more secondary authentication nodes, and one set (or one domain) may further include one or more vehicle-mounted devices in addition to a secondary authentication node.

A device type of a domain manager may be the same as an intra-domain device type, or a device type of a domain manager is different from an intra-domain device type. In addition, an example in which the gateway serves as a primary node is used in FIG. 1. Actually, the primary node is not limited to the gateway, and may be another vehicle-mounted device.

Vehicle-mounted devices may be classified into a plurality of domains based on a plurality of classification factors. For example, classification may be performed based on functions completed by the vehicle-mounted devices. For example, if some vehicle-mounted devices are configured to cooperatively complete a specific function (for example, a power function), some vehicle-mounted devices may be grouped into one domain. Alternatively, different domains may be classified based on other factors. For a domain manager, for example, an intra-domain vehicle-mounted device is randomly selected as a domain manager, or an intra-domain vehicle-mounted device having a coordinated management function may be selected as a domain manager.

The following describes the technical solutions in the embodiments of this application with reference to the accompanying drawings.

Figure 2:
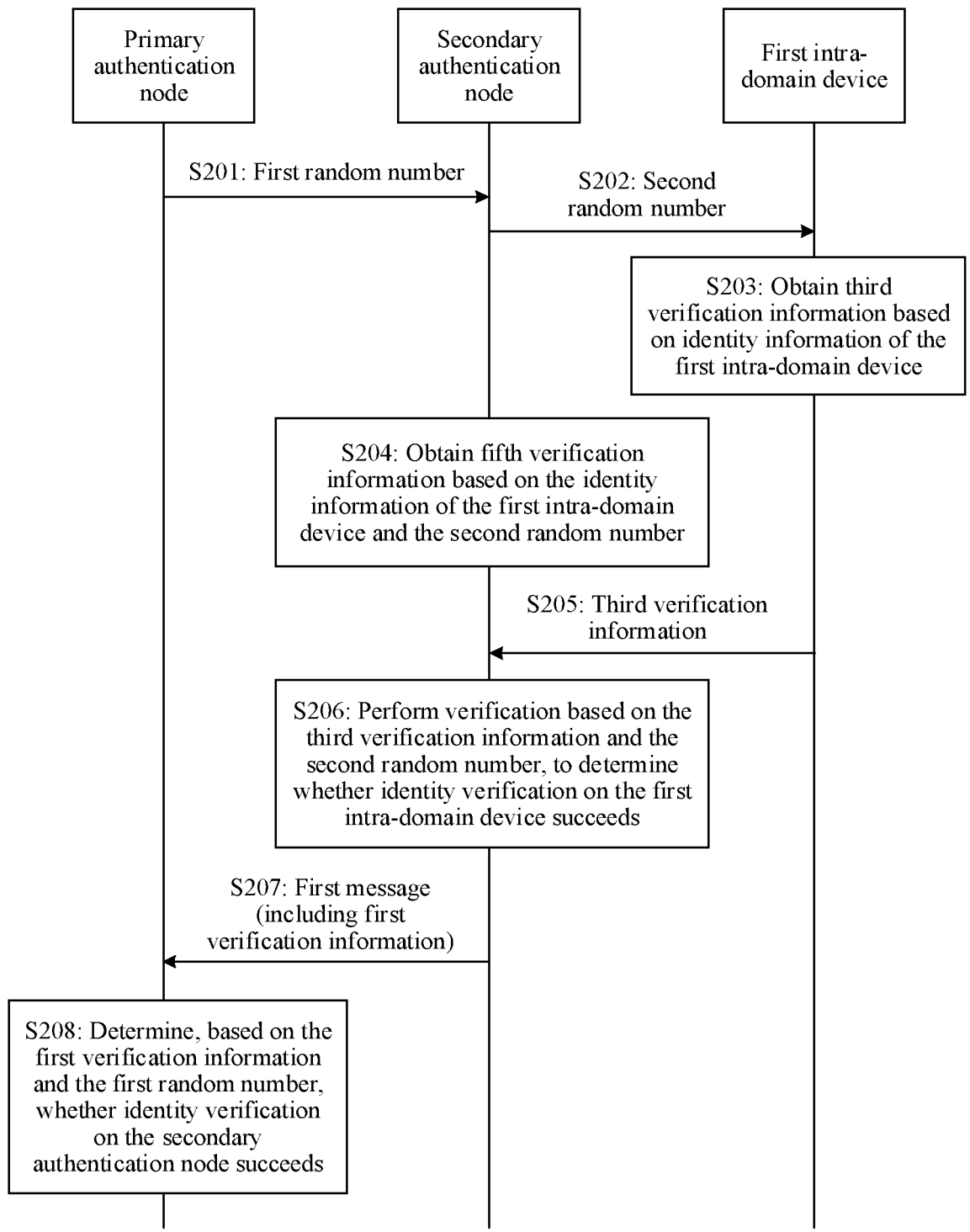
FIG. 2 is a flowchart of a first identity verification method according to an embodiment of this application.

An embodiment of this application provides a first identity verification method. FIG. 2 is a flowchart of the method. In the following description process, an example in which the method is applied to the network architecture shown in FIG. 1 is used. In addition, the method may be performed by three communications apparatuses (or three types of communications apparatuses). The three communications apparatuses are, for example, a first communications apparatus, a second communications apparatus, and a third communications apparatus. The first communications apparatus, the second communications apparatus, or the third communications apparatus may be a vehicle-mounted apparatus or a communications apparatus (for example, a chip system) that can support a vehicle-mounted apparatus in implementing a function required by the method, or certainly may be another communications apparatus. Moreover, implementations of the first communications apparatus, the second communications apparatus, and the third communications apparatus are not limited. For example, the three communications apparatuses may be implemented in a same form, for example, in a form of a device. Alternatively, the three communications apparatuses may be implemented in different forms. For example, the first communications apparatus is implemented in a form of a device, the second communications apparatus is implemented in a manner of a chip system, and the third communications apparatus is implemented in a form of a device.

For ease of description, the following uses an example in which the method is performed by a first apparatus, a second apparatus, and a third apparatus, that is, an example in which the first communications apparatus is the first apparatus, the second communications apparatus is the second apparatus, and the third communications apparatus is the third apparatus. An example in which this embodiment is applied to the network architecture shown in FIG. 1 is used. Therefore, the first apparatus described below may be a primary authentication node (for example, the gateway in FIG. 1) in the network architecture shown in FIG. 1, the second apparatus described below may be a secondary authentication node (for example, a DM or the MDC in FIG. 1) in the network architecture shown in FIG. 1, and the third apparatus described below may be an intra-domain device in the network architecture shown in FIG. 1. For ease of understanding, in the following description process, an example in which the first apparatus is a primary authentication node, the second apparatus is a secondary authentication node, and the third apparatus is an intra-domain device is used.

S201: The primary authentication node sends a first random number to the secondary authentication node, and the secondary authentication node receives the first random number from the primary authentication node.

The first apparatus and the second apparatus are carried in a first vehicle. The first vehicle may carry the first apparatus and at least one set. Each of the at least one set may include one or more apparatuses. Each set may include one apparatus serving as a secondary authentication node. For example, a first set is one of the at least one set, the first set includes the second apparatus and the third apparatus, and the second apparatus is a secondary authentication node in the first set. The first set may include one or more third apparatuses. The first apparatus may communicate, by using the second apparatus, with the third apparatus included in the first set. For example, in FIG. 1, both the primary authentication node and the secondary authentication node are carried in the first vehicle. In addition to the primary authentication node, the first vehicle further carries the at least one set (or at least one domain). The secondary authentication node (that is, the second apparatus) described herein is a secondary authentication node in the first set carried by the first vehicle. In other words, the second apparatus belongs to one of the at least one set, which is referred to as, for example, the first set. In addition to the second apparatus, the first set further includes the third apparatus (that is, the intra-domain device). In this case, the third apparatus included in the first set communicates with the first apparatus by using the second apparatus.

The primary authentication node may select a random number of a proper length, which is referred to as, for example, the first random number. The first random number may be represented as r. The primary authentication node may send r to the secondary authentication node. Herein, r may be used by the primary authentication node to subsequently perform authentication on the secondary authentication node. A length of r may be determined based on a required authentication strength. For example, if the required authentication strength is 128 bits (bit), the length of r may be 128 bits. Generally, a greater authentication strength indicates a longer length of r. However, a longer length of r indicates a more complex authentication process. Therefore, the length of r may be properly selected, or the length of r may be specified through a protocol, or the like. This is not limited.

If the first vehicle includes a plurality of sets, and each set includes one secondary authentication node, the first vehicle includes a plurality of secondary authentication nodes. In this case, the primary authentication node may send the first random number to all or some of the secondary authentication nodes included in the first vehicle. After different secondary authentication nodes receive the first random number, operation manners may be similar. Therefore, in the embodiment shown in FIG. 2, only the secondary authentication node included in the first set is used as an example.

S202: The secondary authentication node sends a second random number to the intra-domain device in the first set, and the intra-domain device in the first set receives the second random number from the secondary authentication node.

The secondary authentication node may select a random number of a proper length, which is referred to as, for example, the second random number. The second random number may be represented as r'. The secondary authentication node may send r' to the intra-domain device in the first set. For example, the secondary authentication node may send r' in a broadcast or multicast manner. In this case, all intra-domain devices in the first set may receive r' from the secondary authentication node. Alternatively, the secondary authentication node may send r' in a unicast manner. For example, the secondary authentication node may separately send r' to all intra-domain devices in the first set. Alternatively, the secondary authentication node may send r' to only some intra-domain devices in the first set, and some intra-domain devices are, for example, intra-domain devices on which identity verification needs to be performed. Herein, r' may be used by the secondary authentication node to perform authentication on the intra-domain device.

For example, r' may be determined based on r. In a manner of determining r' based on r, determining r' based on r may mean that a length of r' is determined based on r. For example, the length of r' may be the same as that of r. In this case, content of r' may be the same as that of r, in other words, r and r' are a same random number, or content of r' may be different from that of r, in other words, r' and r are two random numbers having a same length but different content.

In another manner of determining r' based on r, some or all of content of r' may be determined based on r. For example, the secondary authentication node selects a random number r''. For example, r'' is referred to as a third random number. In this case, the second random number r' may be a random number obtained by concatenating (or splicing) r and r'', and the length of r' is a sum of the length of r and a length of r''. After r and r'' are concatenated, for example, after r'' is placed after the end of r or after r is placed after the end of r'', r' is obtained. For example, if r is 101010 and r'' is 11110011, r' may be 10101011110011 or 11110011101010.

Alternatively, the secondary authentication node may determine r' in another manner. For example, the determined r' may be unrelated to r. This is not limited.

S203: A first intra-domain device obtains third verification information based on identity information of the first intra-domain device.

The first intra-domain device is, for example, one intra-domain device in the first set, that is, one third apparatus. The first set may include one or more intra-domain devices. If the first set includes one intra-domain device, the intra-domain device is the first intra-domain device. Alternatively, if the first set includes a plurality of intra-domain devices, intra-domain devices in the first set that have received the second random number have similar processing manners. Therefore, only the first intra-domain device is used as an example for description herein. Identity information of an intra-domain device includes, for example, a sequence number of the intra-domain device, or includes an identity number of the intra-domain device, or may include other information that can uniquely identify an identity of the intra-domain device.

For example, the first intra-domain device may obtain the third verification information based on the second random number, or may obtain the third verification information based on the identity information $D_{id_{ij}}$ of the first intra-domain device, or may obtain the third verification information based on the second random number and the identity information $D_{id_{ij}}$ of the first intra-domain device.

In an implementation of the third verification information, the third verification information may be a message authentication code (MAC) value. For example, the first intra-domain device may obtain the third verification information based on r' and $D_{id_{ij}}$. For example, the third verification information is represented as $s_{ij}$, and $s_{ij}$=MAC(r', $D_{id_{ij}}$).

Alternatively, in another implementation of the third verification information, the third verification information may be a digital signature. For example, if the intra-domain device in the first set stores a private key for asymmetric encryption, the first intra-domain device may encrypt the second random number based on the stored private key to obtain the third verification information, or may encrypt the identity information $D_{id_{ij}}$ of the first intra-domain device based on the stored private key to obtain the third verification information, or may encrypt the second random number and the identity information $D_{id_{ij}}$ of the first intra-domain device based on the stored private key to obtain the third verification information. Herein, a private key stored by each intra-domain device in the first set may be referred to as a first private key. If the first set includes a plurality of intra-domain devices, first private keys stored by different intra-domain devices may be the same or may be different.

S204: The secondary authentication node generates fifth verification information based on the second random number and the identity information of the first intra-domain device.

The first set includes the one or more intra-domain devices. In S202, the secondary authentication node may send r' to all the intra-domain devices in the first set. In this case, in S204, the secondary authentication node may generate fifth verification information for each intra-domain device in the first set based on the second random number and identity information of each intra-domain device in the first set. Alternatively, in S202, the secondary authentication node may send r' to only some intra-domain devices in the first set, and some intra-domain devices are, for example, intra-domain devices on which identity verification needs to be performed. In this case, in S204, the secondary authentication node may generate fifth verification information for each of some intra-domain devices based on the second random number and identity information of some intra-domain devices in the first set. In conclusion, the secondary authentication node may obtain at least one piece of fifth verification information based on the second random number and identity information of at least one intra-domain device. In the embodiment shown in FIG. 2, only the first intra-domain device is used as an example.

For example, the secondary authentication node may obtain the fifth verification information based on the second random number, or may obtain the fifth verification information based on the identity information $D_{id_{ij}}$ of the first intra-domain device, or may obtain the fifth verification information based on the second random number and the identity information $D_{id_{ij}}$ of the first intra-domain device.

In an implementation of the fifth verification information, the fifth verification information may be a MAC value. For example, the secondary authentication node may obtain the fifth verification information based on r' and $D_{id_{ij}}$. For example, the fifth verification information is represented as $s'_{ij}$, and $s'_{ij}$=MAC(r', $D_{id_{ij}}$).

Alternatively, in another implementation of the fifth verification information, the fifth verification information may be a digital signature. For example, if the secondary authentication node stores a public key for asymmetric encryption, the secondary authentication node may encrypt the second random number based on the stored public key to obtain the fifth verification information, or may encrypt the identity information $D_{id_{ij}}$ of the first intra-domain device based on the stored public key to obtain the fifth verification information, or may encrypt the second random number and the identity information $D_{id_{ij}}$ of the first intra-domain device based on the stored public key to obtain the fifth verification information. Herein, the public key stored by the secondary authentication node may be referred to as a first public key. The first public key and the first private key may be a pair of asymmetric keys.

The secondary authentication node may obtain the at least one piece of fifth verification information based on the second random number and the identity information of the at least one intra-domain device. Therefore, after the at least one piece of fifth verification information is obtained, if a quantity of the at least one piece of fifth verification information is greater than 1, in an optional manner, the secondary authentication node may further aggregate the at least one piece of fifth verification information to obtain sixth verification information. For example, if the at least one piece of fifth verification information obtained by the secondary authentication node is represented as $s'_{i1}$, $s'_{i2}$, $s'_{i3}$, and so on, the secondary authentication node aggregates the at least one piece of fifth verification information. One aggregation manner may be: $s''_{ij} = s'_{i1} \oplus s'_{i2} \oplus s'_{i3} \oplus \ldots$, where $s''_{ij}$ indicates the sixth verification information, and $\oplus$ indicates an exclusive OR operation. Alternatively, the secondary authentication node may aggregate the at least one piece of fifth verification information in another manner.

S203 may be performed before S204, or S203 is performed after S204, or S203 and S204 are simultaneously performed.

S205: The first intra-domain device sends the third verification information to the secondary authentication node, and the secondary authentication node receives the third verification information from the first intra-domain device.

All the intra-domain devices that receive r' may obtain the third verification information. In S202, the secondary authentication node may send r' to all the intra-domain devices in the first set. In this case, in S205, all the intra-domain devices in the first set may send the third verification information to the secondary authentication node. Alternatively, in S202, the secondary authentication node may send r' to only some intra-domain devices in the first set. In this case, in S205, some intra-domain devices in the first set may send third verification information to the secondary authentication node. In conclusion, the secondary authentication node may receive at least one piece of third verification information from at least one intra-domain device in the first set. In FIG. 2, only the first intra-domain device is used as an example.

The secondary authentication node may receive the at least one piece of third verification information from the at least one intra-domain device in the first set. Therefore, after the at least one piece of third verification information is obtained, if a quantity of the at least one piece of third verification information is greater than 1, in an optional manner, the secondary authentication node may further aggregate the at least one piece of third verification information to obtain seventh verification information. For example, if the at least one piece of third verification information obtained by the secondary authentication node is represented as $s_{i1}$, $s_{i2}$, $s_{i3}$, and so on, the secondary authentication node aggregates the at least one piece of third verification information. One aggregation manner may be: $s'''_{ij} = s_{i1} \oplus s_{i2} \oplus s_{i3} \oplus \ldots$, where $s'''_{ij}$ indicates the seventh verification information, and $\oplus$ indicates an exclusive OR operation. Alternatively, the secondary authentication node may aggregate the at least one piece of third verification information in another manner. It should be noted that a manner in which the secondary authentication node aggregates the at least one piece of third verification information needs to be consistent with a manner in which the secondary authentication node aggregates the at least one piece of fifth verification information. For example, if the secondary authentication node aggregates the at least one piece of third verification information by using the foregoing described exclusive OR operation, the secondary authentication node needs to aggregate the at least one piece of fifth verification information by using the foregoing described exclusive OR operation.

S206: The secondary authentication node determines, based on the second random number and the third verification information, whether identity verification on the first intra-domain device succeeds.

The secondary authentication node may receive the at least one piece of third verification information from the at least one intra-domain device in S205. In this case, in S206, the secondary authentication node may perform verification based on the second random number and the at least one piece of third verification information, to determine whether the identity verification on the at least one intra-domain device succeeds. For all the intra-domain devices, verification processes performed by the secondary authentication node are similar. Therefore, in FIG. 2, only the first intra-domain device is used as an example.

In S204, the secondary authentication node generates the fifth verification information based on the second random number and the identity information of the first intra-domain device. Therefore, in S206, the secondary authentication node may perform verification based on the fifth verification information and the third verification information, to determine whether the identity verification on the first intra-domain device succeeds. In the embodiments of this application, for example, if identity verification performed by a device 1 on a device 2 succeeds, the device 1 may consider that the device 2 is authorized. However, if the identity verification performed by the device 1 on the device 2 fails (or the identity verification fails), the device 1 may consider that the device 2 is unauthorized. For example, if the identity verification performed by the secondary authentication node on the first intra-domain device succeeds, the secondary authentication node may consider that the first intra-domain device is authorized. However, if the identity verification performed by the secondary authentication node on the first intra-domain device fails (or the identity verification fails), the secondary authentication node may consider that the first intra-domain device is unauthorized. For example, the secondary authentication node may compare the fifth verification information with the third verification information to determine whether the fifth verification information is consistent with the third verification information. If the fifth verification information is consistent with the third verification information, the secondary authentication node determines that the identity verification on the first intra-domain device succeeds. However, if the fifth verification information is inconsistent with the third verification information, the secondary authentication node determines that the identity verification on the first intra-domain device fails. For example, if the fifth verification information is $s'_{ij}$ and the third verification information is $s_{ij}$, the secondary authentication node may compare $s'_{ij}$ with $s_{ij}$ to determine whether $s'_{ij}$ is consistent with $s_{ij}$. If $s'_{ij}$ is the same as $s_{ij}$, the secondary authentication node determines that the identity verification on the first intra-domain device succeeds, or if $s'_{ij}$ is different from $s_{ij}$, the secondary authentication node determines that the identity verification on the first intra-domain device fails. In this manner, the secondary authentication node may separately determine whether the identity verification on the at least one intra-domain device in the first set succeeds, and a determining granularity is relatively fine.

Alternatively, as described above, the secondary authentication node may aggregate the at least one piece of third verification information to obtain the seventh verification information, and aggregate the at least one piece of fifth verification information to obtain the sixth verification information. Therefore, that the secondary authentication node performs verification based on the second random number and the third verification information may be that the secondary authentication node compares the sixth verification information with the seventh verification information to determine whether the sixth verification information is consistent with the seventh verification information. If the sixth verification information is consistent with the seventh verification information, the secondary authentication node determines that the identity verification on the at least one intra-domain device succeeds, or if the sixth verification information is inconsistent with the seventh verification information, the secondary authentication node determines that the identity verification on the at least one intra-domain device fails. In this manner, the secondary authentication node only needs to determine whether the sixth verification information is consistent with the seventh verification information, and does not need to determine whether identity verification on each intra-domain device succeeds. This can reduce workload of the secondary authentication node.

S207: The secondary authentication node sends a first message to the primary authentication node, and the primary authentication node receives the first message from the secondary authentication node, where the first message includes first verification information, and the first verification information may be used to perform identity verification on the secondary authentication node.

For example, the secondary authentication node may generate the first verification information based on the first random number and identity information of the secondary authentication node. The identity information of the secondary authentication node includes, for example, a sequence number of the secondary authentication node, or includes an identity number of the secondary authentication node, or may include other information that can uniquely identify an identity of the secondary authentication node. In addition, in an optional manner, the first verification information may further indicate whether identity verification on an intra-domain device included in the first set succeeds. Therefore, in a process of generating the first verification information, a value of a tag may be further added. For example, the value of the tag may indicate "success" or "failure". If a value of the tag used to generate the first verification information indicates "success", the first verification information is used to indicate that identity verification on the intra-domain device included in the first set succeeds. However, if a value of the tag used to generate the first verification information indicates "failure", the first verification information is used to indicate that identity verification on the intra-domain device included in the first set fails.

The first verification information may indicate whether identity verification on an intra-domain device included in the first set succeeds. For example, if the first set includes only one intra-domain device in addition to the secondary authentication node, the first verification information may indicate whether identity verification on the intra-domain device succeeds. Alternatively, if the first set includes a plurality of intra-domain devices in addition to the secondary authentication node, the first verification information may indicate whether identity verification on the plurality of intra-domain devices succeeds.

It is assumed that the secondary authentication node determines, by comparing the fifth verification information and the third verification information that correspond to each of the at least one intra-domain device, whether the identity verification on each of the at least one intra-domain device succeeds. In this case, if the secondary authentication node determines that the identity verification on each of the at least one intra-domain device succeeds, in other words, if the secondary authentication node determines, through comparison, that the fifth verification information and the third verification information that correspond to each of the at least one intra-domain device are consistent, the secondary authentication node may generate the first verification information, and the first verification information herein may indicate that identity verification on an intra-domain device included in the first set succeeds. Alternatively, if the secondary authentication node determines that identity verification on any one of the at least one intra-domain device fails, in other words, if the secondary authentication node determines, through comparing fifth verification information and third verification information that correspond to each of the at least one intra-domain device, that at least one piece of fifth verification information and at least one piece of third verification information are inconsistent, the secondary authentication node may generate the first verification information, and the first verification information may indicate that identity verification on the intra-domain device included in the first set fails (or the identity verification fails).

For example, if the fifth verification information is $s'_{ij}$ and the third verification information is $s_{ij}$, the secondary authentication node compares $s_{ij}$ with $s'_{ij}$. For example, the secondary authentication node determines, through comparison, whether $s_{i1}$ is consistent with $s'_{i1}$, whether $s_{i2}$ is consistent with $s'_{i2}$, whether $s_{i3}$ is consistent with $s'_{i3}$, and so on. If the secondary authentication node determines that $s_{ij}$ is consistent with $s'_{ij}$, for example, if $s_{i1}$ is consistent with $s'_{i1}$, $s_{i2}$ is consistent with $s'_{i2}$, $s_{i3}$ is consistent with $s'_{i3}$, and so on, the secondary authentication node generates the first verification information, and the first verification information indicates that identity verification on the intra-domain devices included in the first set succeeds. Alternatively, if the secondary authentication node determines, through comparison, that $s_{ij}$ is inconsistent with $s'_{ij}$ at least once, for example, if $s_{i1}$ is consistent with $s'_{i1}$, $s_{i2}$ is consistent with $s'_{i2}$, and $s_{i3}$ is inconsistent with $s'_{i3}$, the secondary authentication node generates the first verification information, and the first verification information indicates that identity verification on the intra-domain devices included in the first set fails.

Alternatively, it is assumed that the secondary authentication node determines, by comparing the sixth verification information with the seventh verification information, whether the identity verification on the at least one intra-domain device succeeds. In this case, if the secondary authentication node determines that the identity verification on each of the at least one intra-domain device succeeds, in other words, if the secondary authentication node determines, through comparison, that the sixth verification information is consistent with the seventh verification information, the secondary authentication node may generate the first verification information, and the first verification information indicates that identity verification on the intra-domain device included in the first set succeeds. Alternatively, if the secondary authentication node determines that the identity verification on the at least one intra-domain device fails, in other words, if the secondary authentication node determines, through comparison, that the sixth verification information is inconsistent with the seventh verification information, the secondary authentication node may generate the first verification information, and the first verification information indicates that identity verification on the intra-domain device included in the first set fails (or the identity verification fails).

For example, if $s'''_{ij}$ represents the seventh verification information and $s''_{ij}$ represents the sixth verification information, the secondary authentication node compares $s'''_{ij}$ with $s''_{ij}$ to determine whether $s'''_{ij}$ is consistent with $s''_{ij}$. If $s'''_{ij}$ is consistent with $s''_{ij}$, the secondary authentication node may generate the first verification information, and the first verification information is used to indicate that identity verification on the intra-domain device included in the first set succeeds. Alternatively, if $s'''_{ij}$ is inconsistent with $s''_{ij}$, the secondary authentication node may generate the first verification information, and the first verification information is used to indicate that identity verification on the intra-domain device included in the first set fails.

In an implementation of the first verification information, the first verification information may be a MAC value. For example, the secondary authentication node may generate the first verification information based on r, $D_{id_i}$, and the tag. For example, $s_i$=MAC(r, $D_{id_i}$, tag), where the tag indicates "success" or "failure", and $s_i$ represents the first verification information. For example, the tag occupies one bit. If a value of the one bit is "1", it indicates "success", or if a value of the one bit is "0", it indicates "failure". Alternatively, the tag may indicate "success" or "failure" in another manner.

Alternatively, in another implementation of the first verification information, the first verification information may be a digital signature. For example, if the secondary authentication node stores a private key for asymmetric encryption, the secondary authentication node may encrypt r, $D_{id_i}$, and the tag based on the stored private key to obtain the first verification information. Herein, the private key stored by the secondary authentication node may be referred to as a first private key.

S208: The primary authentication node determines, based on the first verification information and the first random number, whether the identity verification on the secondary authentication node succeeds.

After receiving the first verification information, the primary authentication node may determine, based on the first verification information and the first random number, whether the identity verification on the secondary authentication node succeeds. It is equivalent to that the secondary authentication node may perform verification on the intra-domain device, and the primary authentication node may perform verification on the secondary authentication node. Therefore, a hierarchical verification mechanism is formed. For example, if the identity verification performed by the primary authentication node on the secondary authentication node succeeds, the primary authentication node may consider that the secondary authentication node is authorized. However, if the identity verification performed by the primary authentication node on the secondary authentication node fails (or the identity verification fails), the primary authentication node may consider that the secondary authentication node is unauthorized.

For example, if the identity information of the secondary authentication node is known for the primary authentication node, the primary authentication node may generate verification information in the same manner in which the secondary authentication node generates the first verification information. For example, the verification information is referred to as second verification information. Alternatively, if the identity information of the secondary authentication node is carried in the first message, the primary authentication node may generate second verification information in the same manner in which the secondary authentication node generates the first verification information. For example, the primary authentication node may generate the second verification information based on the identity information of the secondary authentication node and the first random number. The primary authentication node may compare whether the second verification information is consistent with the first verification information. If the second verification information is consistent with the first verification information, the identity verification performed by the primary authentication node on the secondary authentication node succeeds, or the primary authentication node determines that the identity verification on the secondary authentication node succeeds. Alternatively, if the second verification information is inconsistent with the first verification information, the identity verification performed by the primary authentication node on the secondary authentication node fails, or the primary authentication node determines that the identity verification on the secondary authentication node fails.

In an optional manner, the first message may further carry fourth verification information. For example, the fourth verification information is a tag, and the tag indicates "success" or "failure". In other words, if identity verification performed by the secondary authentication node on an intra-domain device included in the first set succeeds, the secondary authentication node may further send the fourth verification information to the primary authentication node in addition to the first verification information, and the fourth verification information indicates "success". Alternatively, if identity verification performed by the secondary authentication node on an intra-domain device included in the first set fails, the secondary authentication node may further send the fourth verification information to the primary authentication node in addition to the first verification information, and the fourth verification information indicates "failure".

Therefore, when the primary authentication node generates the second verification information, the tag may be further added. Certainly, a premise is that the tag is also added when the secondary authentication node generates the first verification information. For example, if the fourth verification information indicates "success", the primary authentication node may generate the second verification information based on the identity information of the secondary authentication node, r, and the tag that indicates "success", or if the fourth verification information indicates "failure", the primary authentication node may generate the second verification information based on the identity information of the secondary authentication node, r, and the tag that indicates "failure". The manner in which the primary authentication node generates the second verification information needs to be consistent with the manner in which the secondary authentication node generates the first verification information. For example, if the first verification information is a MAC value, the second verification information is also a MAC value, or if the first verification information is generated by the secondary authentication node based on a private key, the second verification information needs to be generated by the primary authentication node based on a public key. Herein, the public key of the primary authentication node may be referred to as a second public key. The second public key and the second private key may be a pair of asymmetric keys.

The primary authentication node may obtain several verification results, which are separately described below.

1. The primary authentication node determines that the identity verification on the secondary authentication node succeeds, and the secondary authentication node determines that the identity verification on the at least one intra-domain device succeeds.

In other words, the primary authentication node determines that the first verification information is consistent with the second verification information, and the fourth verification information is used to indicate that identity verification on another intra-domain device included in the first set in addition to the secondary authentication node succeeds.

In this case, an authentication process may end when the primary authentication node determines that the first verification information is consistent with the second verification information. In this case, it is considered that both the identity verification on the secondary authentication node and the identity verification on the at least one intra-domain device in the first set succeed.

2. The primary authentication node determines that the identity verification on the secondary authentication node succeeds, and the secondary authentication node determines that the identity verification on the at least one intra-domain device fails.

In other words, the primary authentication node determines that the first verification information is consistent with the second verification information, and the fourth verification information is used to indicate that identity verification on another intra-domain device other than the secondary authentication node in the first set fails. In this case, the primary authentication node may directly determine that the identity verification on the secondary authentication node succeeds, and determine that the identity verification on the at least one intra-domain device fails. However, the primary authentication node cannot determine a specific intra-domain device that fails in the identity verification in the at least one intra-domain device.

Alternatively, in addition to determining that the identity verification on the secondary authentication node succeeds, the primary authentication node may further perform identity verification on the at least one intra-domain device in the first set.

For example, in addition to the first verification information, the first message further includes third verification information of N intra-domain devices. The N intra-domain devices may be one or more of the at least one intra-domain device, and N is a positive integer. For example, in addition to sending the first verification information to the primary authentication node, the secondary authentication node may further send the third verification information of the at least one intra-domain device to the primary authentication node. In this case, the N intra-domain devices include all of the at least one intra-domain device. For example, if the first intra-domain device is one of the N intra-domain devices, the first intra-domain device may be an intra-domain device that succeeds in identity verification performed by the secondary authentication node, or may be an intra-domain device that fails in identity verification performed by the secondary authentication node. This manner is relatively applicable to a case in which the secondary authentication node successively performs identity verification on the at least one intra-domain device and the identity verification performed by the secondary authentication node on all of the at least one intra-domain device fails. Alternatively, this manner is applicable to the following case. The secondary authentication node performs identity verification on the at least one intra-domain device based on the sixth verification information and the seventh verification information, and if the verification fails, the secondary authentication node may not locate a specific intra-domain device that fails in the identity verification, the secondary authentication node may send the third verification information of the at least one intra-domain device to the primary authentication node, and the primary authentication node further performs verification.

Alternatively, if the fourth verification information is used to indicate that identity verification performed by the secondary authentication node on another intra-domain device included in the first set other than the secondary authentication node fails, it indicates that identity verification performed by the secondary authentication node on one or more of the at least one intra-domain device fails. Therefore, the secondary authentication node may send only third verification information corresponding to an intra-domain device that fails in the identity verification to the primary authentication node. In this case, the N intra-domain devices include an intra-domain device that fails in the verification performed by the secondary authentication node in the at least one intra-domain device. For example, if the first intra-domain device is one of the N intra-domain devices, the first intra-domain device may be an intra-domain device that fails in the identity verification performed by the secondary authentication node. This manner is relatively applicable to a case in which the secondary authentication node successively performs identity verification on the at least one intra-domain device and the identity verification performed by the secondary authentication node on some of the at least one intra-domain device fails.

Therefore, if the primary authentication node determines that the identity verification on the secondary authentication node succeeds, the first verification information is used to indicate that identity verification on the intra-domain device included in the first set fails, and the first message includes N pieces of third verification information, the primary authentication node may successively perform verification on the N pieces of third verification information, to determine a specific intra-domain device that fails in the identity verification.

Alternatively, the first message may not include N pieces of third verification information. If the primary authentication node determines that the first verification information is consistent with the second verification information, and the fourth verification information is used to indicate that identity verification on the intra-domain device included in the first set fails, the primary authentication node may send a second message to the secondary authentication node, and the second message is used to request to obtain verification information corresponding to the at least one intra-domain device. After receiving the second message from the primary authentication node, the secondary authentication node may send the N pieces of third verification information to the primary authentication node. For example, the secondary authentication node may send a third message to the primary authentication node, and the third message includes the N pieces of third verification information. If the secondary authentication node successively performs identity verification on the at least one intra-domain device, the N pieces of third verification information may include third verification information of all of the at least one intra-domain device, or the N pieces of third verification information may include third verification information of an intra-domain device that fails in the verification performed by the secondary authentication node in the at least one intra-domain device. Alternatively, if the secondary authentication node performs overall verification on the at least one intra-domain device based on the sixth verification information and the seventh verification information, the N pieces of third verification information may include third verification information of all of the at least one intra-domain device. Alternatively, if the second message is used to request to obtain the verification information corresponding to the at least one intra-domain device, the N pieces of third verification information may include the third verification information of all of the at least one intra-domain device.

For example, the primary authentication node may generate N pieces of eighth verification information, and perform verification on the N pieces of third verification information by using the N pieces of eighth verification information. For example, if eighth verification information and third verification information that correspond to one intra-domain device are consistent, the primary authentication node considers that identity verification on the intra-domain device succeeds, or if eighth verification information and third verification information that correspond to one intra-domain device are inconsistent, the primary authentication node considers that identity verification on the intra-domain device fails. For example, if identity verification performed by the primary authentication node on one intra-domain device succeeds, the primary authentication node may consider that the intra-domain device is authorized. However, if identity verification performed by the primary authentication node on one intra-domain device fails (or the identity verification fails), the primary authentication node may consider that the intra-domain device is unauthorized. For example, the primary authentication node may obtain the N pieces of eighth verification information based on the second random number, or may obtain the N pieces of eighth verification information based on identity information of the N intra-domain devices, or may obtain the N pieces of eighth verification information based on the second random number and the identity information of the N intra-domain devices.

In an implementation of the eighth verification information, the eighth verification information may be a MAC value. For example, the primary authentication node may obtain the eighth verification information based on r' and the identity information of the N intra-domain devices.

Alternatively, in another implementation of the eighth verification information, the eighth verification information may be a digital signature. For example, if the primary authentication node stores a public key for asymmetric encryption, the primary authentication node may encrypt the second random number based on the stored public key to obtain the N pieces of eighth verification information, or may encrypt the identity information of the N intra-domain devices based on the stored public key to obtain the N pieces of eighth verification information, or may encrypt the second random number and the identity information of the N intra-domain devices based on the stored public key to obtain the N pieces of eighth verification information. Herein, the public key stored by the primary authentication node may be a first public key.

A manner in which the primary authentication node generates the eighth verification information needs to be consistent with a manner in which the intra-domain device generates the third verification information. For example, if the third verification information is a MAC value, the eighth verification information is also a MAC value, or if the third verification information is generated by the intra-domain device based on a private key, the eighth verification information needs to be generated by the primary authentication node based on a public key.

The primary authentication node may determine, by separately performing identity verification on the N intra-domain devices, a specific intra-domain device that fails in the identity verification, so as to perform corresponding processing on the intra-domain device that fails in the identity verification, and an intra-domain device that succeeds in the identity verification may continue to work normally. In this manner, an intra-domain device that fails in identity verification can be effectively located, and an intra-domain device that succeeds in identity verification can be less affected.

3. The primary authentication node determines that the identity verification on the secondary authentication node fails, and the secondary authentication node determines that the identity verification on the at least one intra-domain device succeeds.

In other words, the primary authentication node determines that the first verification information is inconsistent with the second verification information, and the fourth verification information is used to indicate that the identity verification on another intra-domain device included in the first set other than the secondary authentication node succeeds. In this case, the primary authentication node may directly determine that the identity verification on the secondary authentication node fails, and the primary authentication node may consider that the first verification information is unreliable.

In this case, the primary authentication node may directly determine that the identity verification on the secondary authentication node fails. However, because the first verification information is unreliable, the primary authentication node cannot determine whether the identity verification on the at least one intra-domain device succeeds. Alternatively, in this case, if the primary authentication node determines that the identity verification on the secondary authentication node fails, the primary authentication node may further perform identity verification on the at least one intra-domain device in the first set.

For example, in addition to the first verification information, the first message further includes third verification information of N intra-domain devices. The N intra-domain devices may be the at least one intra-domain device, and N is a positive integer. For example, in addition to sending the first verification information to the primary authentication node, the secondary authentication node may further send the at least one piece of third verification information of the at least one intra-domain device to the primary authentication node. Because the identity verification performed by the secondary authentication node on the at least one intra-domain device succeeds, the secondary authentication node may send the at least one piece of third verification information of the at least one intra-domain device to the primary authentication node. In other words, the N intra-domain devices include all of the at least one intra-domain device.

Therefore, if the primary authentication node determines that the identity verification on the secondary authentication node fails, and the first message includes the N pieces of third verification information, the primary authentication node may successively perform verification on the N pieces of third verification information, to determine whether the identity verification on the N intra-domain devices succeeds.

Alternatively, the first message may not include N pieces of third verification information. If the primary authentication node determines that the first verification information is inconsistent with the second verification information, the identity verification performed by the first apparatus on the second apparatus fails. In this case, the primary authentication node may send a second message to the secondary authentication node, and the second message is used to request to obtain verification information corresponding to the at least one intra-domain device. After receiving the second message from the primary authentication node, the secondary authentication node may send the N pieces of third verification information to the primary authentication node. For example, the secondary authentication node may send a third message to the primary authentication node, and the third message includes the N pieces of third verification information. Herein, the N pieces of third verification information may include third verification information of all of the at least one intra-domain device.

For example, the primary authentication node may generate N pieces of eighth verification information, and perform verification on the N pieces of third verification information by using the N pieces of eighth verification information. For example, if eighth verification information and third verification information that correspond to one intra-domain device are consistent, the primary authentication node considers that identity verification on the intra-domain device succeeds, or if eighth verification information and third verification information that correspond to one intra-domain device are inconsistent, the primary authentication node considers that identity verification on the intra-domain device fails. For example, the primary authentication node may obtain the N pieces of eighth verification information based on the second random number, or may obtain the N pieces of eighth verification information based on identity information of the N intra-domain devices, or may obtain the N pieces of eighth verification information based on the second random number and the identity information of the N intra-domain devices. For a manner in which the primary authentication node performs verification on the third verification information based on the eighth verification information, refer to the descriptions of the foregoing second point.

The primary authentication node may determine, by separately performing identity verification on the N intra-domain devices, a specific intra-domain device that fails in the identity verification, so as to perform corresponding processing on the intra-domain device that fails in the identity verification, and an intra-domain device that succeeds in the identity verification may continue to work normally. In this manner, even if the secondary authentication node is unreliable, the primary authentication node may effectively locate an intra-domain device that fails in identity verification, and an intra-domain device that succeeds in identity verification can be less affected.

4. The primary authentication node determines that the identity verification on the secondary authentication node fails, and the secondary authentication node determines that the identity verification on the at least one intra-domain device fails.

In other words, the primary authentication node determines that the first verification information is inconsistent with the second verification information, and the fourth verification information is used to indicate that identity verification on the intra-domain device included in the first set fails. In this case, the primary authentication node may directly determine that the identity verification on the secondary authentication node fails, and the primary authentication node may consider that the first verification information is unreliable.

In this case, the primary authentication node may directly determine that the identity verification on the secondary authentication node fails. However, because the first verification information is unreliable, the primary authentication node cannot determine whether the identity verification on the at least one intra-domain device succeeds. Alternatively, in this case, if the primary authentication node determines that the identity verification on the secondary authentication node fails, the primary authentication node may further perform identity verification on the at least one intra-domain device in the first set.

For example, in addition to the first verification information, the first message further includes third verification information of N intra-domain devices. The N intra-domain devices may be one or more of the at least one intra-domain device, and N is a positive integer. For example, in addition to sending the first verification information to the primary authentication node, the secondary authentication node may further send the third verification information of the at least one intra-domain device to the primary authentication node. In this case, the N intra-domain devices include all of the at least one intra-domain device. This manner is relatively applicable to a case in which the secondary authentication node successively performs identity verification on the at least one intra-domain device and the identity verification performed by the secondary authentication node on all of the at least one intra-domain device fails. Alternatively, this manner is applicable to the following case. The secondary authentication node performs identity verification on the at least one intra-domain device based on the sixth verification information and the seventh verification information, and if the verification fails, the secondary authentication node may not locate a specific intra-domain device that fails in the identity verification, the secondary authentication node may send the third verification information of the at least one intra-domain device to the primary authentication node, and the primary authentication node further performs verification.

Alternatively, if the fourth verification information is used to indicate that identity verification on the intra-domain device included in the first set fails, it indicates that the identity verification performed by the secondary authentication node on one or more intra-domain devices in the at least one intra-domain device fails. Therefore, the secondary authentication node may send only third verification information corresponding to an intra-domain device that fails in the identity verification to the primary authentication node. In this case, the N intra-domain devices include an intra-domain device that fails in the verification performed by the secondary authentication node in the at least one intra-domain device. This manner is relatively applicable to a case in which the secondary authentication node successively performs identity verification on the at least one intra-domain device and the identity verification performed by the secondary authentication node on some of the at least one intra-domain device fails.

Therefore, if the primary authentication node determines that the identity verification on the secondary authentication node succeeds, the first verification information is used to indicate that identity verification on the intra-domain device included in the first set fails, and the first message includes N pieces of third verification information, the primary authentication node may successively perform verification on the N pieces of third verification information, to determine a specific intra-domain device that fails in the identity verification.

Alternatively, the first message may not include N pieces of third verification information. If the primary authentication node determines that the first verification information is inconsistent with the second verification information, the primary authentication node may send a second message to the secondary authentication node, and the second message is used to request to obtain verification information corresponding to the at least one intra-domain device. After receiving the second message from the primary authentication node, the secondary authentication node may send the N pieces of third verification information to the primary authentication node. For example, the secondary authentication node may send a third message to the primary authentication node, and the third message includes the N pieces of third verification information. If the secondary authentication node successively performs identity verification on the at least one intra-domain device, the N pieces of third verification information may include third verification information of all of the at least one intra-domain device, or the N pieces of third verification information may include third verification information of an intra-domain device that fails in the verification performed by the secondary authentication node in the at least one intra-domain device. Alternatively, if the secondary authentication node performs overall verification on the at least one intra-domain device based on the sixth verification information and the seventh verification information, the N pieces of third verification information may include third verification information of all of the at least one intra-domain device. Alternatively, if the second message is used to request to obtain the verification information corresponding to the at least one intra-domain device, the N pieces of third verification information may include the third verification information of all of the at least one intra-domain device.

For example, the primary authentication node may generate N pieces of eighth verification information, and perform verification on the N pieces of third verification information by using the N pieces of eighth verification information. For example, if eighth verification information and third verification information that correspond to one intra-domain device are consistent, the primary authentication node considers that identity verification on the intra-domain device succeeds, or if eighth verification information and third verification information that correspond to one intra-domain device are inconsistent, the primary authentication node considers that identity verification on the intra-domain device fails. For example, the primary authentication node may obtain the N pieces of eighth verification information based on the second random number, or may obtain the N pieces of eighth verification information based on identity information of the N intra-domain devices, or may obtain the N pieces of eighth verification information based on the second random number and the identity information of the N intra-domain devices. For a manner in which the primary authentication node performs verification on the third verification information based on the eighth verification information, refer to the descriptions of the foregoing second point.

In this embodiment of this application, it is equivalent to that a hierarchical verification manner is used. The first apparatus may perform verification on the second apparatus, and for the third apparatus, for example, the second apparatus may perform verification on the third apparatus. In this way, identity verification can be performed on all levels of vehicle-mounted devices, and the hierarchical verification manner also greatly improves reliability. In addition, compared with a solution in which one device performs verification on all other devices, in the technical solution in this embodiment of this application, for each level of vehicle-mounted devices, verification needs to be performed on a relatively small quantity of devices. For example, the first apparatus only needs to perform verification on the second apparatus, and does not need to perform verification on the third apparatuses one by one, thereby helping reduce device load. For example, if the verification performed by the first apparatus on the second apparatus fails, the first apparatus may consider that the verification performed by the second apparatus on each third apparatus fails, or the first apparatus may further perform verification on each third apparatus. It is equivalent to that multi-verification may be performed. This manner can improve security of a vehicle-mounted device, and can prevent a regular vehicle-mounted device from being replaced with a fake and shoddy vehicle-mounted device.

To better understand the technical solution described in the embodiment shown in FIG. 2, the following describes some sub-solutions in the embodiment shown in FIG. 2 by using examples.

Figure 3:
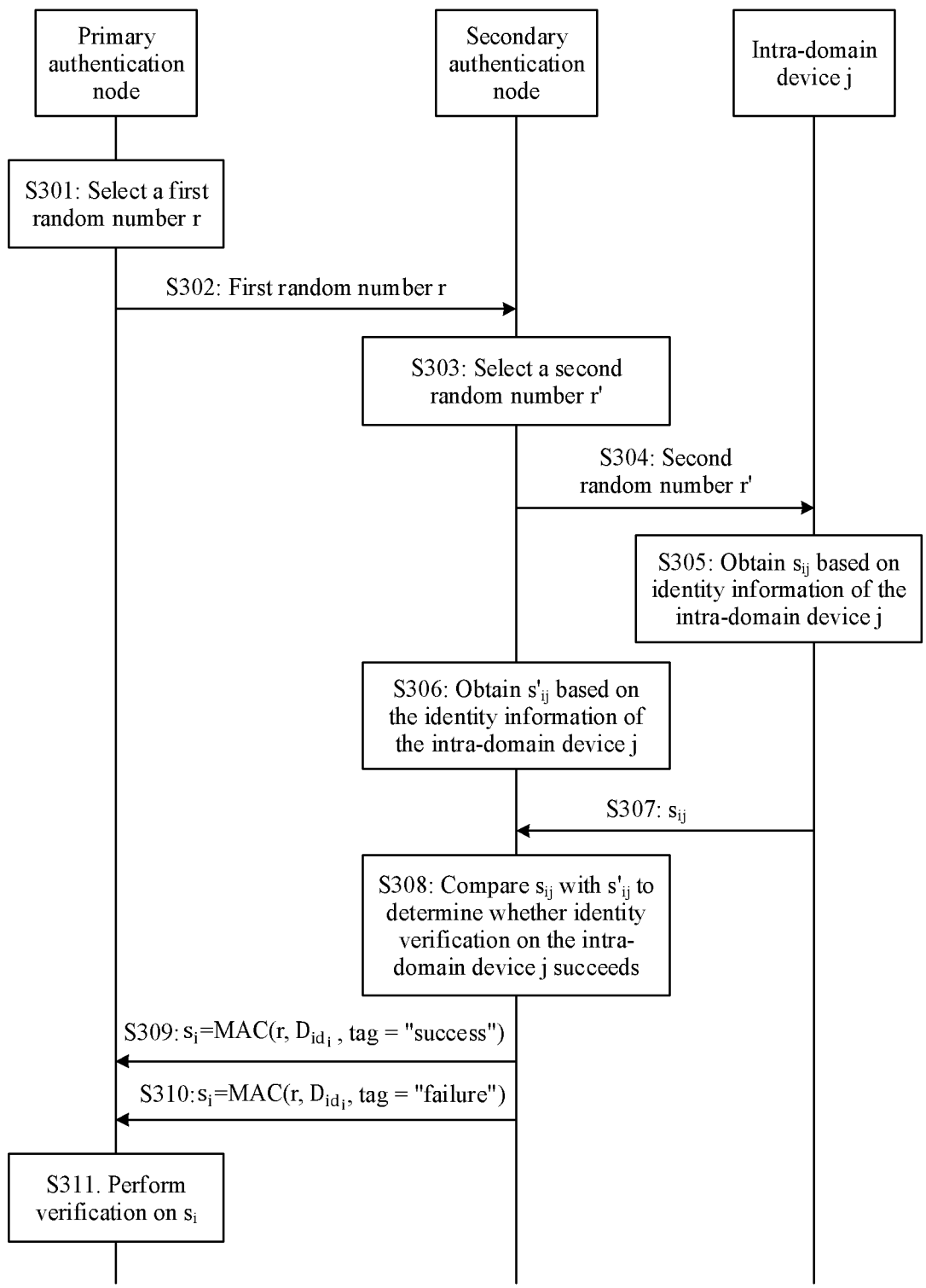
FIG. 3 is a flowchart of an example of a first identity verification method according to an embodiment of this application.

FIG. 3 is a flowchart of a first implementation of a first identity verification method according to an embodiment of this application. In a procedure shown in FIG. 3, for example, a secondary authentication node does not aggregate at least one piece of third verification information and does not aggregate at least one piece of fifth verification information, and a first message does not include third verification information of N intra-domain devices.

S301: A primary authentication node selects a first random number r.

For a manner of selecting the first random number r, refer to the description of S201 in the embodiment shown in FIG. 2.

S302: The primary authentication node sends the first random number r to a secondary authentication node, and the secondary authentication node receives the first random number r from the primary authentication node.

S303: The secondary authentication node selects a second random number r'.

For a manner of selecting the second random number r', refer to the description of S202 in the embodiment shown in FIG. 2. For example, in the procedure shown in FIG. 3, r' and r have different content but a same length.

S304: The secondary authentication node sends the second random number r' to an intra-domain device in a first set, and the intra-domain device in the first set receives the second random number r' from the secondary authentication node.

In FIG. 3, only an intra-domain device j in the first set is used as an example.

S305: The intra-domain device j obtains third verification information $s_{ij}$ based on identity information of the intra-domain device j. For example, $s_{ij}=MAC(r', D_{id_{ij}})$.

S306: The secondary authentication node obtains fifth verification information $s'_{ij}$ based on the identity information of the intra-domain device j. For example, $s'_{ij}=MAC(r', D_{id_{ij}})$.

S305 may be performed before S306, or S305 is performed after S306, or S305 and S306 are simultaneously performed.

S307: The intra-domain device j sends $s_{ij}$ to the secondary authentication node, and the secondary authentication node receives $s_{ij}$ from the intra-domain device j.

All intra-domain devices that receive r' may obtain third verification information. In S304, the secondary authentication node may send r' to all the intra-domain devices in the first set. In this case, in S307, all the intra-domain devices in the first set may send the third verification information to the secondary authentication node. Alternatively, in S304, the secondary authentication node may send r' to only some intra-domain devices in the first set. In this case, in S307, some intra-domain devices in the first set may send third verification information to the secondary authentication node. In conclusion, the secondary authentication node may receive at least one piece of third verification information from at least one intra-domain device in the first set. In FIG. 3, only the intra-domain device j is used as an example.

S308: The secondary authentication node compares $s_{ij}$ with $s'_{ij}$ to determine whether identity verification on the intra-domain device j succeeds.

If $s_{ij}$ is consistent with $s'_{ij}$, the secondary authentication node considers that the identity verification on the intra-domain device j succeeds, or if $s_{ij}$ is inconsistent with $s'_{ij}$, the secondary authentication node considers that the identity verification on the intra-domain device j fails.

The secondary authentication node may receive the at least one piece of third verification information from the at least one intra-domain device in S307. Therefore, in S308, the secondary authentication node may perform verification based on the second random number and the at least one piece of third verification information, to determine whether the identity verification on the at least one intra-domain device succeeds. If the identity verification on each of the at least one intra-domain device succeeds, S309 is performed. Alternatively, if the identity verification on one or more of the at least one intra-domain device fails, S310 is performed.

S309 The secondary authentication node sends a first message to the primary authentication node, where the first message includes first verification information $s_i$, and $s_i$=MAC(r, $D_{id_i}$, tag="success"). For example, if the tag occupies one bit, value "1" indicates "success", and value "0" indicates "failure".

If the secondary authentication node determines that the identity verification on each of the at least one intra-domain device succeeds, in other words, if the secondary authentication node determines, through comparison, that fifth verification information and third verification information that correspond to each of the at least one intra-domain device are consistent, the secondary authentication node may generate $s_i$=MAC(r, $D_{id_i}$, tag="success").

S310: The secondary authentication node sends a first message to the primary authentication node, where the first message includes first verification information $s_i$, and $s_i$=MAC(r, $D_{id_i}$, tag="failure"). For example, if the tag occupies one bit, value "1" indicates "success", and value "0" indicates "failure".

S311: The primary authentication node performs verification on $s_i$. If the verification on $s_i$ fails, it is considered that the identity verification on the secondary authentication node fails. Alternatively, if the verification on $s_i$ succeeds, but $s_i$=MAC(r, $D_{id_i}$, tag="failure"), it is considered that the identity verification on the intra-domain device fails. Alternatively, if the verification on $s_i$ succeeds, and $s_i$=MAC(r, $D_{id_i}$, tag="success"), it is considered that both the identity verification on the secondary authentication node and the identity verification on the intra-domain device succeed.

For some specific implementation details of the steps in the procedure shown in FIG. 3, refer to related descriptions of the embodiment shown in FIG. 2.

Figure 4:
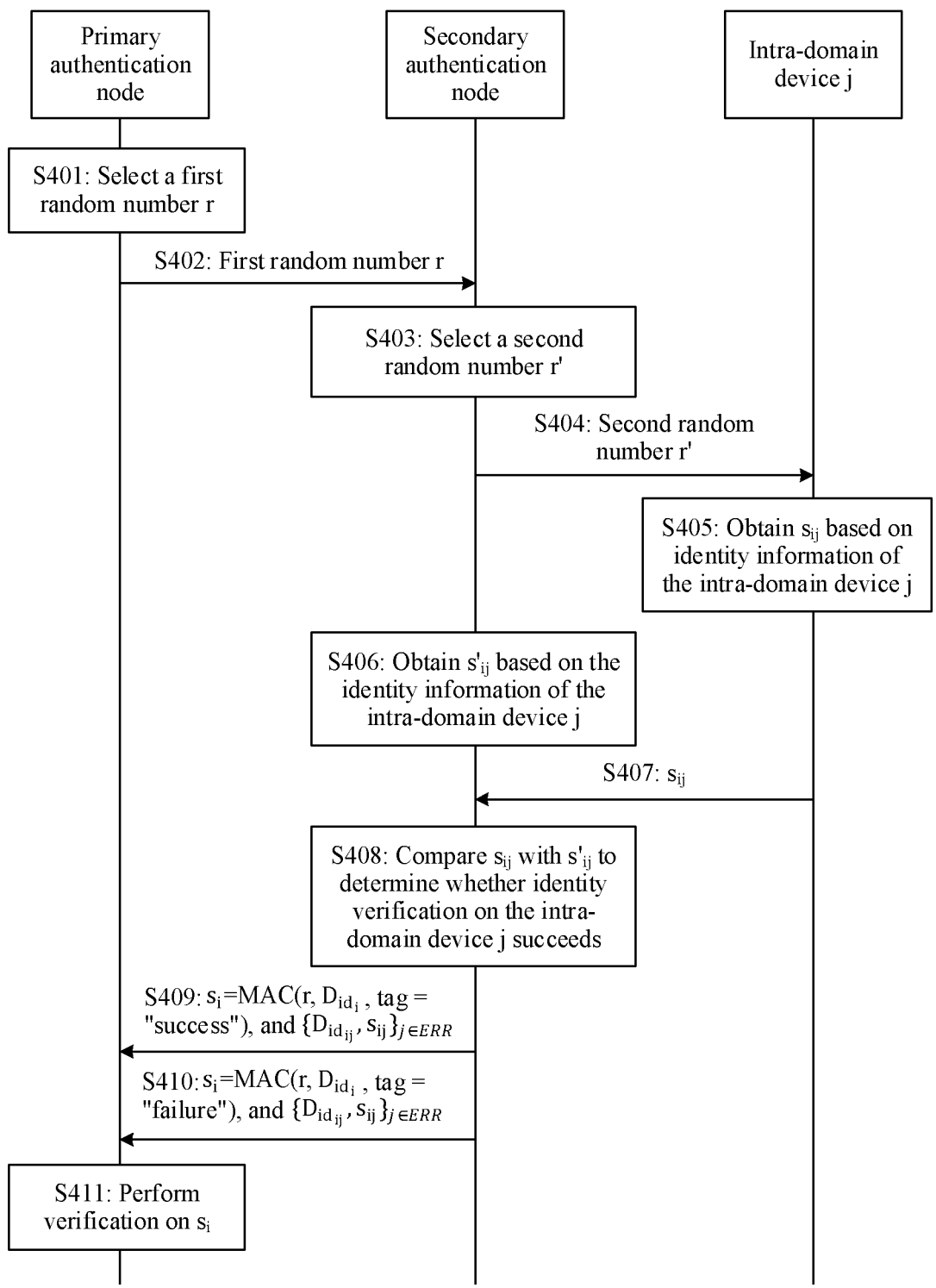
FIG. 4 is a flowchart of an example of a first identity verification method according to an embodiment of this application.

FIG. 4 is a flowchart of a second implementation of a first identity verification method according to an embodiment of this application. In a procedure shown in FIG. 4, for example, a secondary authentication node does not aggregate at least one piece of third verification information and does not aggregate at least one piece of fifth verification information, and a first message includes third verification information of N intra-domain devices.

S401: A primary authentication node selects a first random number r.

For a manner of selecting the first random number r, refer to the description of S201 in the embodiment shown in FIG. 2.

S402: The primary authentication node sends the first random number r to a secondary authentication node, and the secondary authentication node receives the first random number r from the primary authentication node.

S403: The secondary authentication node selects a second random number r'.

For a manner of selecting the second random number r', refer to the description of S202 in the embodiment shown in FIG. 2. For example, in the procedure shown in FIG. 4, r' is obtained by concatenating r and a third random number.

S404: The secondary authentication node sends the second random number r' to an intra-domain device in a first set, and the intra-domain device in the first set receives the second random number r' from the secondary authentication node.

In FIG. 4, only an intra-domain device j in the first set is used as an example.

S405: The intra-domain device j obtains third verification information $s_{ij}$ based on identity information of the intra-domain device j. For example, $s_{ij}$=MAC(r', $D_{id_{ij}}$).

S406: The secondary authentication node obtains fifth verification information $s'_{ij}$ based on the identity information of the intra-domain device j. For example, $s'_{ij}$=MAC(r', $D_{id_{ij}}$).

S405 may be performed before S406, or S405 may be performed after S406, or S405 and S406 are simultaneously performed.

S407: The intra-domain device j sends $s_{ij}$ to the secondary authentication node, and the secondary authentication node receives $s_{ij}$ from the intra-domain device j.

All intra-domain devices that receive r' may obtain third verification information. In S404, the secondary authentication node may send r' to all the intra-domain devices in the first set. In this case, in 407, all the intra-domain devices in the first set may send the third verification information to the secondary authentication node. Alternatively, in S404, the secondary authentication node may send r' to only some intra-domain devices in the first set. In this case, in S407, some intra-domain devices in the first set may send third verification information to the secondary authentication node. In conclusion, the secondary authentication node may receive at least one piece of third verification information from at least one intra-domain device in the first set. In FIG. 4, only the intra-domain device j is used as an example.

S408: The secondary authentication node compares $s_{ij}$ with $s'_{ij}$ to determine whether identity verification on the intra-domain device j succeeds.

If $s_{ij}$ is consistent with $s'_{ij}$, the secondary authentication node considers that the identity verification on the intra-domain device j succeeds, or if $s_{ij}$ is inconsistent with $s'_{ij}$, the secondary authentication node considers that the identity verification on the intra-domain device j fails.

The secondary authentication node may receive the at least one piece of third verification information from the at least one intra-domain device in S407. Therefore, in S408, the secondary authentication node may perform verification based on the second random number and the at least one piece of third verification information, to determine whether the identity verification on the at least one intra-domain device succeeds. If the identity verification on each of the at least one intra-domain device succeeds, S409 is performed. Alternatively, if the identity verification on one or more of the at least one intra-domain device fails, S410 is performed.

S409: The secondary authentication node sends a first message to the primary authentication node, where the first message includes first verification information $s_i$, and $s_i$=MAC(r, $D_{id_i}$, tag="success"). For example, if the tag occupies one bit, value "1" indicates "success", and value "0" indicates "failure".

If the secondary authentication node determines that the identity verification on each of the at least one intra-domain device succeeds, in other words, if the secondary authentication node determines, through comparison, that fifth verification information and third verification information that correspond to each of the at least one intra-domain device are consistent, the secondary authentication node may generate $s_i$=MAC(r, $D_{id_i}$, tag="success").

S410: The secondary authentication node sends a first message to the primary authentication node, where the first message includes first verification information $s_i$, and $s_i$=MAC(r, $D_{id_i}$, tag="failure"). The first message further includes $\{D_{id_{ij}}, s_{ij}\}_{j \in ERR}$.

For example, if the tag occupies one bit, value "1" indicates "success", and value "0" indicates "failure". $\{s_{ij}\}_{j \in ERR}$ represents the third verification information of the N intra-domain devices. In this case, the N intra-domain devices may include an intra-domain device that fails in the verification by the secondary authentication node in the at least one intra-domain device. $\{D_{id_{ij}}\}_{j \in ERR}$ represents identity information of the N intra-domain devices. Therefore, the first message may include the identity information and the third verification information of the N intra-domain devices.

S411: The primary authentication node performs verification on $s_i$. If the verification on $s_i$ fails, it is considered that the identity verification on the secondary authentication node fails. Alternatively, if the verification on $s_i$ succeeds, but $s_i$=MAC(r, $D_{id_i}$, tag="failure"), verification is performed on $s_{ij}$ one by one. Alternatively, if verification on specific $s_{ij}$ fails, it is determined that identity verification on an intra-domain device corresponding to $s_{ij}$ fails, or if verification on specific $s_{ij}$ succeeds, it is determined that identity verification on an intra-domain device corresponding to $s_{ij}$ succeeds. Alternatively, if the verification on $s_i$ succeeds, and $s_i$=MAC(r, $D_{id_i}$, tag="success"), it is considered that both the identity verification on the secondary authentication node and the identity verification on the intra-domain device succeed.

For some specific implementation details of the steps in the procedure shown in FIG. 4, refer to related descriptions of the embodiment shown in FIG. 2.

Figure 5:
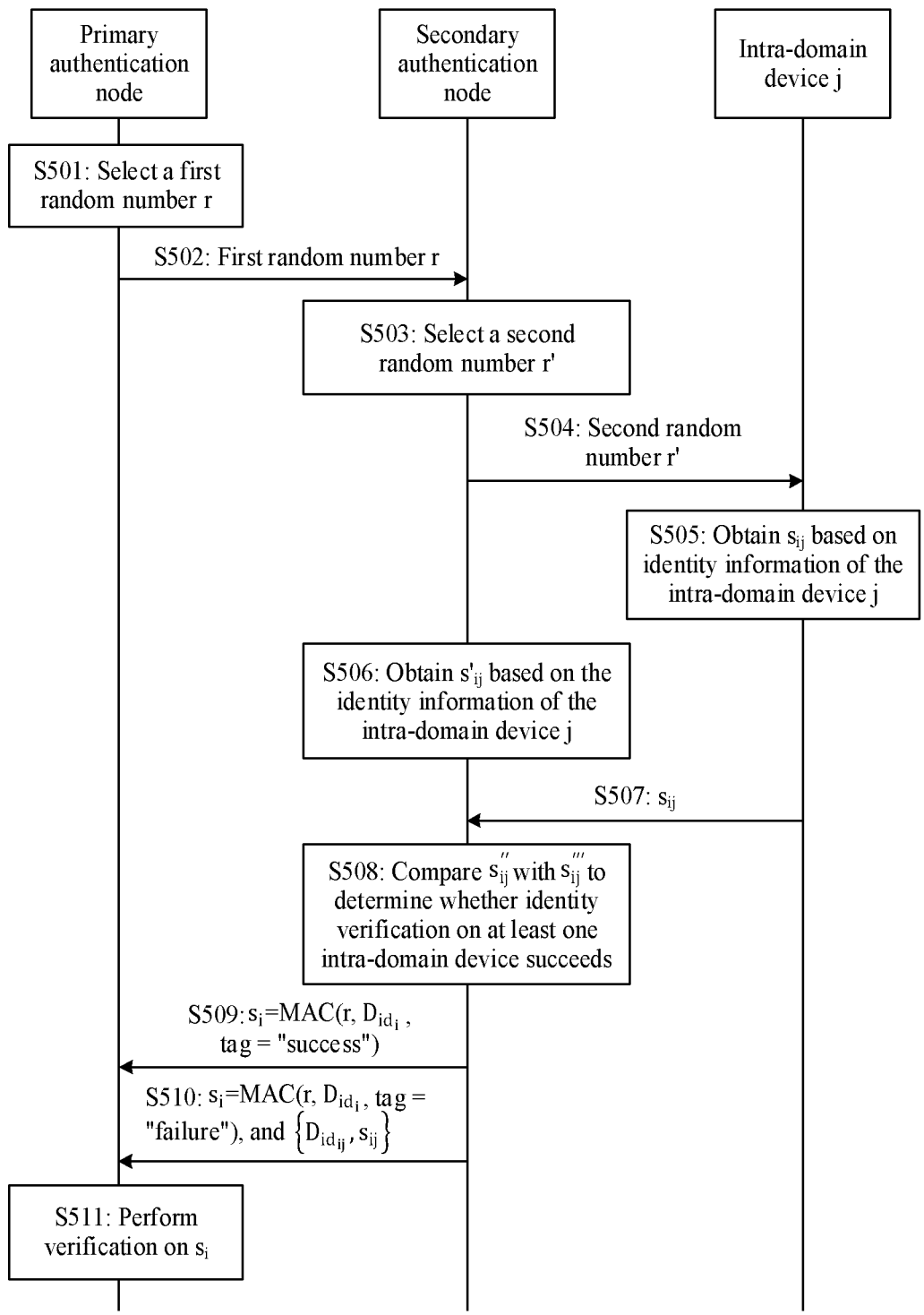
FIG. 5 is a flowchart of an example of a first identity verification method according to an embodiment of this application.

FIG. 5 is a flowchart of a third implementation of a first identity verification method according to an embodiment of this application. In a procedure shown in FIG. 5, for example, a secondary authentication node aggregates at least one piece of third verification information and aggregates at least one piece of fifth verification information, and a first message includes third verification information of N intra-domain devices.

S501: A primary authentication node selects a first random number r.

For a manner of selecting the first random number r, refer to the description of S201 in the embodiment shown in FIG. 2.

S502: The primary authentication node sends the first random number r to a secondary authentication node, and the secondary authentication node receives the first random number r from the primary authentication node.

S503: The secondary authentication node selects a second random number r'.

For a manner of selecting the second random number r', refer to the description of S202 in the embodiment shown in FIG. 2. For example, in the procedure shown in FIG. 5, r' is obtained by concatenating r and a third random number.

S504: The secondary authentication node sends the second random number r' to an intra-domain device in a first set, and the intra-domain device in the first set receives the second random number r' from the secondary authentication node.

In FIG. 5, only an intra-domain device j in the first set is used as an example.

S505: The intra-domain device j obtains third verification information $s_{ij}$ based on identity information of the intra-domain device j. For example, $s_{ij}$=MAC(r', $D_{id_{ij}}$).

S506: The secondary authentication node obtains fifth verification information $s'_{ij}$ based on the identity information of the intra-domain device j. For example, $s'_{ij}$=MAC(r', $D_{id_{ij}}$).

The secondary authentication node may obtain at least one piece of fifth verification information based on the second random number and identity information of at least one intra-domain device. Therefore, after obtaining the at least one piece of fifth verification information, the secondary authentication node may aggregate the at least one piece of fifth verification information to obtain sixth verification information. For example, if the at least one piece of fifth verification information obtained by the secondary authentication node is represented as $s'_{i1}$, $s'_{i2}$, $s'_{i3}$, and so on, the secondary authentication node aggregates the at least one piece of fifth verification information. One aggregation manner may be $s''_{ij}$=$s'_{i1} \oplus s'_{i2} \oplus s'_{i3} \oplus \ldots$, where $s''_{ij}$ indicates the sixth verification information, and $\oplus$ indicates an exclusive OR operation.

S505 may be performed before S506, or S505 is performed after S506, or S505 and S506 are simultaneously performed.

S507: The intra-domain device j sends $s_{ij}$ to the secondary authentication node, and the secondary authentication node receives $s_{ij}$ from the intra-domain device j.

All intra-domain devices that receive r' may obtain third verification information. In S504, the secondary authentication node may send r' to all the intra-domain devices in the first set. In this case, in 507, all the intra-domain devices in the first set may send the third verification information to the secondary authentication node. Alternatively, in S504, the secondary authentication node may send r' to only some intra-domain devices in the first set. In this case, in S507, some intra-domain devices in the first set may send third verification information to the secondary authentication node. In conclusion, the secondary authentication node may receive at least one piece of third verification information from at least one intra-domain device in the first set. In FIG. 5, only the intra-domain device j is used as an example.

The secondary authentication node may receive the at least one piece of third verification information from the at least one intra-domain device in the first set. After obtaining the at least one piece of third verification information, the secondary authentication node may aggregate the at least one piece of third verification information to obtain seventh verification information. For example, if the at least one piece of third verification information obtained by the secondary authentication node is represented as $s_{i1}$, $s_{i2}$, $s_{i3}$, and so on, the secondary authentication node aggregates the at least one piece of third verification information. One aggregation manner may be: $s'''_{ij}=s_{i1} \oplus s_{i2} \oplus s_{i3} \oplus \ldots$ , where $s'''_{ij}$ indicates the seventh verification information, and $\oplus$ indicates an exclusive OR operation.

S508: The secondary authentication node compares $s''_{ij}$ with $s'''_{ij}$ to determine whether identity verification on the at least one intra-domain device succeeds.

If $s''_{ij}$ is consistent with $s'''_{ij}$, the secondary authentication node considers that the identity verification on the at least one intra-domain device succeeds, or if $s''_{ij}$ is inconsistent with $s'''_{ij}$, the secondary authentication node considers that the identity verification on the at least one intra-domain device fails.

If the secondary authentication node determines that the identity verification on the at least one intra-domain device succeeds, S509 is performed, or if the secondary authentication node determines that the identity verification on one or more of the at least one intra-domain device fails, S510 is performed.

S509: The secondary authentication node sends a first message to the primary authentication node, where the first message includes first verification information $s_i$, and $s_i$=MAC(r, $D_{id_i}$, tag="success"). For example, if the tag occupies one bit, value "1" indicates "success", and value "0" indicates "failure".

S510: The secondary authentication node sends a first message to the primary authentication node, where the first message includes first verification information $s_i$, and $s_i$=MAC(r, $D_{id_i}$, tag="failure"). The first message further includes {$D_{id_{ij}}$, $s_{ij}$}.

For example, if the tag occupies one bit, value "1" indicates "success", and value "0" indicates "failure". {$s_{ij}$} represents the third verification information of the N intra-domain devices. In this case, the N intra-domain devices may include all of the at least one intra-domain device. {$D_{id_{ij}}$} represents identity information of the N intra-domain devices. Therefore, the first message may include the identity information and the third verification information of the N intra-domain devices.

S511: The primary authentication node performs verification on $s_i$. If the verification on $s_i$ fails, it is considered that the identity verification on the secondary authentication node fails. Alternatively, if the verification on $s_i$ succeeds, but $s_i$=MAC(r, $D_{id_i}$, tag="failure"), verification is performed on $s_{ij}$ one by one. Alternatively, if verification on specific $s_{ij}$ fails, it is determined that identity verification on an intra-domain device corresponding to $s_{ij}$ fails, or if verification on specific $s_{ij}$ succeeds, it is determined that identity verification on an intra-domain device corresponding to $s_{ij}$ succeeds. Alternatively, if the verification on $s_i$ succeeds, and $s_i$=MAC (r, $D_{id_i}$, tag="success"), it is considered that both the identity verification on the secondary authentication node and the identity verification on the intra-domain device succeed.

For some specific implementation details of the steps in the procedure shown in FIG. 5, refer to related descriptions of the embodiment shown in FIG. 2.

In this embodiment of this application, the primary authentication node may determine, by separately performing identity verification on the N intra-domain devices, a specific intra-domain device that fails in the identity verification, so as to perform corresponding processing on the intra-domain device that fails in the identity verification, and an intra-domain device that succeeds in the identity verification may continue to work normally. In this manner, even if the secondary authentication node is unreliable, the primary authentication node may effectively locate an intra-domain device that fails in identity verification, and an intra-domain device that succeeds in identity verification can be less affected.

In addition, it should be noted that, in the description process of the embodiment shown in FIG. 2, it is considered that the primary authentication node is trusted, and verification does not need to be performed on authenticity or regularity of the primary authentication node. Actually, authentication may be further performed on the primary authentication node to further improve security. There are many methods for performing authentication on the primary authentication node. For example, authentication may be performed on the primary authentication node by using a cloud server, or authentication may be performed on the primary authentication node by using a device such as a mobile phone of a vehicle owner. Generally, resources, capabilities, and the like of the primary authentication node are relatively good. Therefore, an asymmetric key mechanism (for example, a digital signature) may be used to perform authentication on the primary authentication node. For example, referring to FIG. 6, in an embodiment shown in FIG. 6, an off-vehicle authentication node (for example, a device such as a cloud server or a mobile phone of a vehicle owner) may complete authentication on the primary authentication node.

S601: The off-vehicle authentication node sends a third random number to the primary authentication node, and the primary authentication node receives the third random number from the off-vehicle authentication node.

The off-vehicle authentication node may select a random number of a proper length, which is referred to as, for example, the third random number. The third random number may be represented as c. The off-vehicle authentication node may send c to the primary authentication node. Herein, c may be used by the off-vehicle authentication node to perform authentication on the primary authentication node. A length of c may be determined based on a required authentication strength. For example, if the required authentication strength is 128 bits, the length of c may be 128 bits. Generally, a greater authentication strength indicates a longer length of c. However, a longer length of c indicates a more complex authentication process. Therefore, the length of c may be properly selected, or the length of c may be specified through a protocol, or the like. This is not limited.

S602: The primary authentication node encrypts c by using a private key of the primary authentication node, to obtain a digital signature.

After receiving c, the primary authentication node may encrypt c by using the private key, to obtain an encrypted c, in other words, the digital signature. In the embodiment shown in FIG. 6, an example in which the off-vehicle authentication node performs verification on the primary authentication node in an asymmetric encryption manner is used. Actually, this is not limited. The off-vehicle authentication node may alternatively perform verification on the primary authentication node in another manner.

S603: The primary authentication node sends the digital signature to the off-vehicle authentication node, and the off-vehicle authentication node receives the digital signature from the primary authentication node.

S604: The off-vehicle authentication node performs identity verification on the primary authentication node based on the digital signature.

For example, the off-vehicle authentication node stores a public key of the primary authentication node, and the off-vehicle authentication node may perform verification on the digital signature by using the public key of the primary authentication node. If the verification succeeds, the off-vehicle authentication node considers that the identity verification on the primary authentication node succeeds, or if the verification fails, the off-vehicle authentication node considers that the identity verification on the primary authentication node fails.

Figure 6:
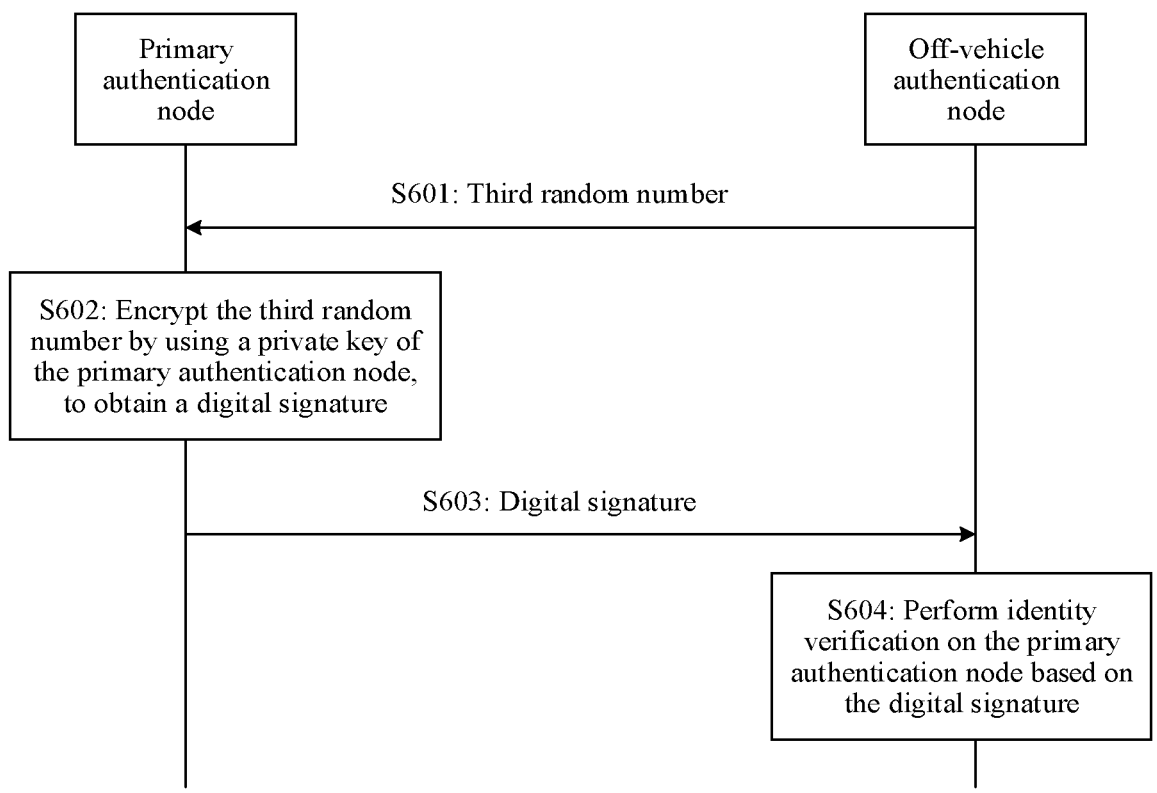
FIG. 6 is a flowchart of a method for performing identity authentication on a primary authentication node according to an embodiment of this application.

FIG. 6 describes a manner of performing verification on the primary authentication node. This embodiment of this application imposes no limitation, and verification may be performed on the primary authentication node in another manner.

In this embodiment of this application, it is equivalent to that a hierarchical verification manner is used. The first apparatus may perform verification on the second apparatus, and for the third apparatus, for example, the second apparatus may perform verification on the third apparatus. In this way, identity verification can be performed on all levels of vehicle-mounted devices, and the hierarchical verification manner also greatly improves reliability. In addition, compared with a solution in which one device performs verification on all other devices, in the technical solution in this embodiment of this application, for each level of vehicle-mounted devices, verification needs to be performed on a relatively small quantity of devices. For example, the first apparatus only needs to perform verification on the second apparatus, and does not need to perform verification on the third apparatuses one by one, thereby helping reduce device load. For example, if the verification performed by the first apparatus on the second apparatus fails, the first apparatus may consider that the verification performed by the second apparatus on each third apparatus fails, or the first apparatus may further perform verification on each third apparatus. It is equivalent to that multi-verification may be performed. This manner can improve security of a vehicle-mounted device, and can prevent a regular vehicle-mounted device from being replaced with a fake and shoddy vehicle-mounted device.

Figure 7:
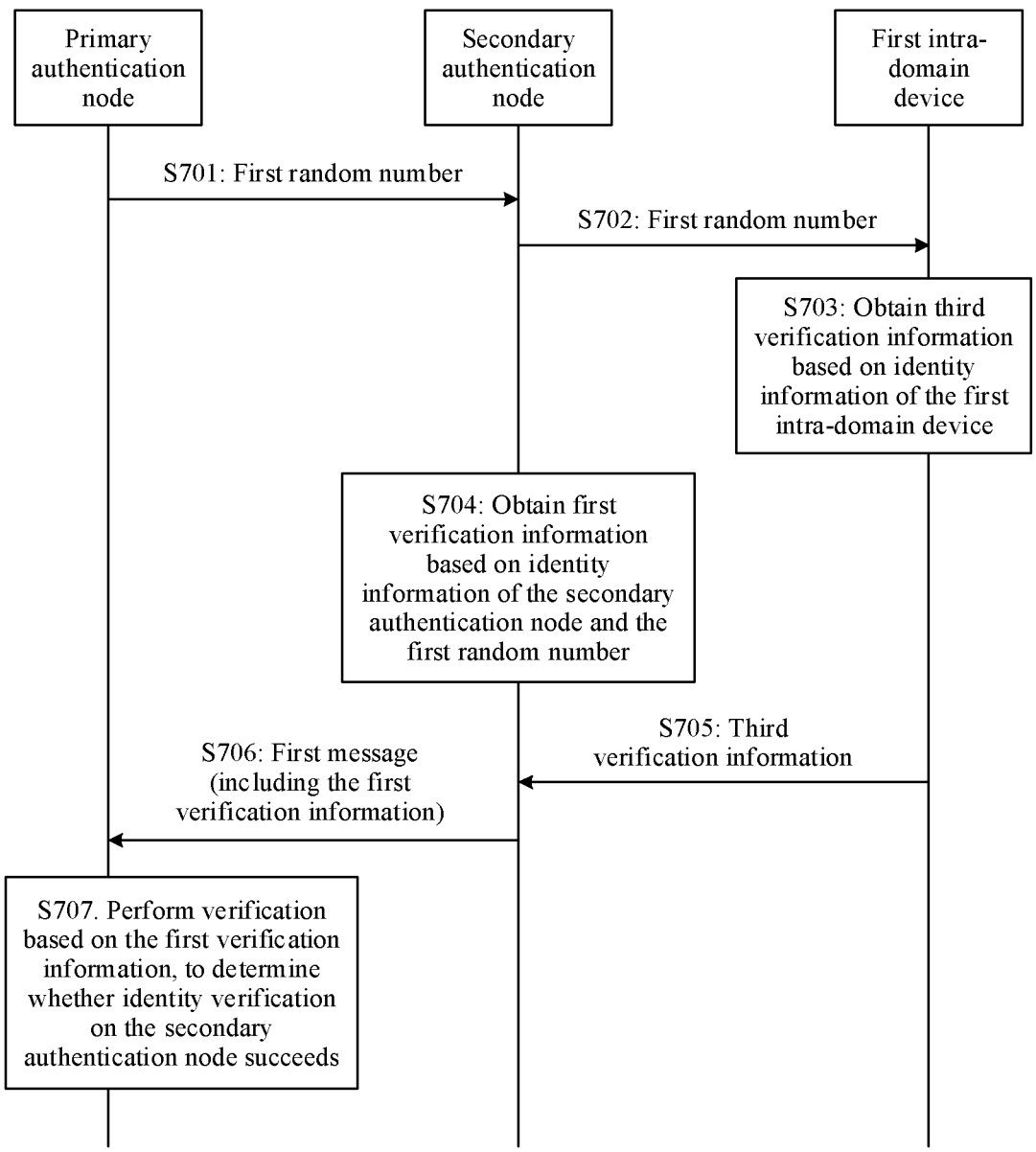
FIG. 7 is a flowchart of a second identity verification method according to an embodiment of this application.

To resolve a same technical problem, an embodiment of this application provides a second identity verification method. FIG. 7 is a flowchart of the method. In the following description process, an example in which the method is applied to the network architecture shown in FIG. 1 is used. In addition, the method may be performed by three communications apparatuses (or three types of communications apparatuses). The three communications apparatuses are, for example, a first communications apparatus, a second communications apparatus, and a third communications apparatus. The first communications apparatus, the second communications apparatus, or the third communications apparatus may be a vehicle-mounted apparatus or a communications apparatus (for example, a chip system) that can support a vehicle-mounted apparatus in implementing a function required by the method, or certainly may be another communications apparatus. Moreover, implementations of the first communications apparatus, the second communications apparatus, and the third communications are not limited. For example, the three communications apparatuses may be implemented in a same form, for example, in a form of a device. Alternatively, the three communications apparatuses may be implemented in different forms. For example, the first communications apparatus is implemented in a form of a device, the second communications apparatus is implemented in a manner of a chip system, and the third communications apparatus is implemented in a form of a device.

For ease of description, the following uses an example in which the method is performed by a first apparatus, a second apparatus, and a third apparatus, in other words, an example in which the first communications apparatus is the first apparatus, the second communications apparatus is the second apparatus, and the third communications apparatus is the third apparatus. An example in which this embodiment is applied to the network architecture shown in FIG. 1 is used. Therefore, the first apparatus described below may be a primary authentication node (for example, the gateway in FIG. 1) in the network architecture shown in FIG. 1, the second apparatus described below may be a secondary authentication node (for example, a DM or the MDC in FIG. 1) in the network architecture shown in FIG. 1, and the third apparatus described below may be an intra-domain device in the network architecture shown in FIG. 1. For ease of understanding, in the following description process, an example in which the first apparatus is a primary authentication node, the second apparatus is a secondary authentication node, and the third apparatus is an intra-domain device is used.

S701: The primary authentication node sends a first random number to the secondary authentication node, and the secondary authentication node receives the first random number from the primary authentication node.

The first apparatus and the second apparatus are carried in a first vehicle. The first vehicle may carry the first apparatus and at least one set. Each of the at least one set may include one or more apparatuses. Each set may include one apparatus serving as a secondary authentication node. For example, a first set is one of the at least one set, the first set includes the second apparatus and the third apparatus, and the second apparatus is a secondary authentication node in the first set. The first set may include one or more third apparatuses. The first apparatus may communicate, by using the second apparatus, with the third apparatus included in the first set. For example, in FIG. 1, both the primary authentication node and the secondary authentication node are carried in the first vehicle. In addition to the primary authentication node, the first vehicle further carries the at least one set (or at least one intra-domain device). The secondary authentication node (that is, the second apparatus) described herein is a secondary authentication node in the first set carried by the first vehicle. In other words, the second apparatus belongs to one of the at least one set, which is referred to as, for example, the first set. In addition to the second apparatus, the first set further includes the third apparatus (that is, the intra-domain device). In this case, the third apparatus included in the first set communicates with the first apparatus by using the second apparatus.

The primary authentication node may select a random number of a proper length, which is referred to as, for example, the first random number. The first random number may be represented as r. The primary authentication node may send r to the secondary authentication node. Herein, r may be used by the primary authentication node to subsequently perform authentication on the secondary authentication node, or may be used by the primary authentication node to perform authentication on the intra-domain device in the first set. For a manner of determining the length of r, refer to S201 in the embodiment shown in FIG. 2.

If the first vehicle includes a plurality of sets, and each set includes one secondary authentication node, the first vehicle includes a plurality of secondary authentication nodes. In this case, the primary authentication node may send the first random number to all or some of the secondary authentication nodes included in the first vehicle. After different secondary authentication nodes receive the first random number, operation manners may be similar. Therefore, in the embodiment shown in FIG. 7, only a secondary authentication node included in the first set is used as an example.

S702: The secondary authentication node sends the first random number to the intra-domain device in the first set, and the intra-domain device in the first set receives the first random number from the secondary authentication node.

After receiving the first random number, the secondary authentication node may directly forward the first random number to the intra-domain device in the first set. For example, the secondary authentication node may send r in a broadcast or multicast manner. In this case, all intra-domain devices in the first set may receive r from the secondary authentication node. Alternatively, the secondary authentication node may send r in a unicast manner. For example, the secondary authentication node may separately send r' to all intra-domain devices in the first set, or the secondary authentication node may send r to only some intra-domain devices in the first set, and some intra-domain devices are, for example, intra-domain devices on which identity verification needs to be performed. Herein, r may be used by the secondary authentication node to perform authentication on the intra-domain device.

S703: A first intra-domain device obtains third verification information based on identity information of the first intra-domain device.

The first intra-domain device is, for example, one intra-domain device in the first set. The first set may include one or more intra-domain devices. If the first set includes one intra-domain device, the intra-domain device is the first intra-domain device. Alternatively, if the first set includes a plurality of intra-domain devices, intra-domain devices in the first set that have received the first random number have similar processing manners. Therefore, only the first intra-domain device is used as an example for description herein. Identity information of an intra-domain device includes, for example, a sequence number of the intra-domain device, or includes an identity number of the intra-domain device, or may include other information that can uniquely identify an identity of the intra-domain device.

For example, the first intra-domain device may obtain the third verification information based on the first random number, or may obtain the third verification information based on the identity information $D_{id_{ij}}$ of the first intra-domain device, or may obtain the third verification information based on the first random number and the identity information $D_{id_{ij}}$ of the first intra-domain device.

In an implementation of the third verification information, the third verification information may be a MAC value. For example, the first intra-domain device may obtain the third verification information based on r and $D_{id_{ij}}$. For example, the third verification information is represented as $s_{ij}$, and $s_{ij}$=MAC(r, $D_{id_{ij}}$).

Alternatively, in another implementation of the third verification information, the third verification information may be a digital signature. For example, if the intra-domain device in the first set stores a private key for asymmetric encryption, the first intra-domain device may encrypt the first random number based on the stored private key to obtain the third verification information, or may encrypt the identity information $D_{id_{ij}}$ of the first intra-domain device based on the stored private key to obtain the third verification information, or may encrypt the first random number and the identity information $D_{id_{ij}}$ of the first intra-domain device based on the stored private key to obtain the third verification information. Herein, a private key stored by each intra-domain device in the first set may be referred to as a first private key.

S704: The secondary authentication node generates first verification information based on the first random number and identity information of the secondary authentication node.

For example, the secondary authentication node may obtain the first verification information based on the first random number, or may obtain the first verification information based on the identity information $D_{id_{ij}}$ of the secondary authentication node, or may obtain the first verification information based on the first random number and the identity information $D_{id_{ij}}$ of the secondary authentication node.

In an implementation of the first verification information, the first verification information may be a MAC value. For example, the secondary authentication node may obtain the first verification information based on r and $D_{id_i}$. For example, the first verification information is represented as $s_i$, and $s_i$=MAC(r, $D_{id_i}$).

Alternatively, in another implementation of the first verification information, the first verification information may be a digital signature. For example, if the secondary authentication node stores a private key for asymmetric encryption, the secondary authentication node may encrypt the first random number based on the stored private key to obtain the first verification information, or may encrypt the identity information $D_{id_{ij}}$ of the secondary authentication node based on the stored private key to obtain the first verification information, or may encrypt the first random number and the identity information $D_{id_{ij}}$ of the secondary authentication node based on the stored private key to obtain the first verification information. Herein, the private key stored by the secondary authentication node may be referred to as a second private key. The second private key and a second public key may be a pair of asymmetric keys, and the second public key is stored by the primary authentication node.

S703 may be performed before S704, or S703 may be performed after S704, or S703 and S704 are simultaneously performed.

S705: The first intra-domain device sends the third verification information to the secondary authentication node, and the secondary authentication node receives the third verification information from the first intra-domain device.

All the intra-domain devices that receive r may obtain the third verification information. In S702, the secondary authentication node may send r to all the intra-domain devices in the first set. In this case, in S705, all the intra-domain devices in the first set may send the third verification information to the secondary authentication node. Alternatively, in S702, the secondary authentication node may send r to only some intra-domain devices in the first set. In this case, in S705, some intra-domain devices in the first set may send third verification information to the secondary authentication node. In conclusion, the secondary authentication node may receive at least one piece of third verification information from the at least one intra-domain device in the first set. In FIG. 7, only the first intra-domain device is used as an example.

The secondary authentication node may receive the at least one piece of third verification information from the at least one intra-domain device in the first set. Therefore, if a quantity of pieces of third verification information is greater than 1, after the at least one piece of third verification information is obtained, the secondary authentication node may aggregate the at least one piece of third verification information to obtain fourth verification information. For example, if the at least one piece of third verification information obtained by the secondary authentication node is represented as $s_{i1}$, $s_{i2}$, $s_{i3}$, and so on, the secondary authentication node aggregates the at least one piece of third verification information. One aggregation manner may be: $s'_{ij} = s_{i1} \oplus s_{i2} \oplus s_{i3} \oplus \ldots$, where $s'_{ij}$ indicates the fourth verification information, and $\oplus$ indicates an exclusive OR operation. Alternatively, the secondary authentication node may aggregate the at least one piece of third verification information in another manner.

S706: The secondary authentication node sends a first message to the primary authentication node, and the primary authentication node receives the first message from the secondary authentication node, where the first message includes the first verification information, and the first verification information is used to verify whether identity verification on the secondary authentication node succeeds.

For example, because there may be a plurality of secondary authentication nodes in one vehicle, the first message may further include the identity information of the secondary authentication node, so that the primary authentication node can determine a specific secondary authentication node from which the first message is received.

In an optional manner, in addition to sending the first verification information to the primary authentication node, the secondary authentication node may further send the fourth verification information to the primary authentication node. In other words, the first message may further include the fourth verification information, and the fourth verification information may be used to verify whether identity verification on the at least one intra-domain device in the first set succeeds.

S707: The primary authentication node determines, based on the first verification information, whether the identity verification on the secondary authentication node succeeds.

For example, the primary authentication node may generate second verification information, and compare the second verification information with the first verification information. If the second verification information is consistent with the first verification information, the primary authentication node determines that the identity verification on the secondary authentication node succeeds, or if the second verification information is inconsistent with the first verification information, the primary authentication node determines that the identity verification on the secondary authentication node fails. For example, if the identity verification performed by the primary authentication node on the secondary authentication node succeeds, the primary authentication node may consider that the secondary authentication node is authorized. However, if the identity verification performed by the primary authentication node on the secondary authentication node fails (or the identity verification fails), the primary authentication node may consider that the secondary authentication node is unauthorized.

For example, the primary authentication node may obtain the second verification information based on the first random number, or may obtain the second verification information based on the identity information of the secondary authentication node, or may obtain the second verification information based on the first random number and the identity information of the secondary authentication node.

In an implementation of the second verification information, the second verification information may be a MAC value. For example, the primary authentication node may obtain the second verification information based on r and $D_{id_i}$. For example, the second verification information is represented as $s'_i$, and $s'_i = \text{MAC}(r, D_{id_i})$.

Alternatively, in another implementation of the second verification information, the second verification information may be a digital signature. For example, if the primary authentication node stores a public key for asymmetric encryption, the primary authentication node may encrypt the first random number based on the stored public key to obtain the second verification information, or may encrypt the identity information of the secondary authentication node based on the stored public key to obtain the second verification information, or may encrypt the first random number and the identity information of the secondary authentication node based on the stored public key to obtain the second verification information. Herein, the public key stored by the primary authentication node may be referred to as the second public key. The second public key and the second private key may be a pair of asymmetric keys.

In addition, if the first message further includes the fourth verification information, the primary authentication node may further perform verification based on the fourth verification information, to determine whether the identity verification on the at least one intra-domain device succeeds. For example, the primary authentication node may generate fifth verification information, and compare the fifth verification information with the fourth verification information. If the fifth verification information is consistent with the fourth verification information, the primary authentication node determines that identity verification on the at least one intra-domain device succeeds, or if the fifth verification information is inconsistent with the fourth verification information, the primary authentication node determines that the identity verification on the at least one intra-domain device fails. For example, the primary authentication node may first generate at least one piece of sub verification information, and may obtain the fifth verification information by aggregating the at least one piece of sub verification information. The following describes this process.

For example, the primary authentication node may obtain the sub verification information based on the first random number, or may obtain the sub verification information based on the identity information $D_{id_{ij}}$ of the intra-domain device, or may obtain the sub verification information based on the first random number and the identity information $D_{id_{ij}}$ of the intra-domain device.

In an implementation of the sub verification information, the sub verification information may be a MAC value. For example, the primary authentication node may obtain the sub verification information based on r and $D_{id_{ij}}$. For example, the sub verification information is represented as $s''_{ij}$, and $s''_{ij} = \text{MAC}(r, D_{id_{ij}})$.

Alternatively, in another implementation of the sub verification information, the sub verification information may be a digital signature. For example, if the primary authentication node stores a public key for asymmetric encryption, the primary authentication node may encrypt the first random number based on the stored public key to obtain the sub verification information, or may encrypt the identity information $D_{id_{ij}}$ of the intra-domain device based on the stored public key to obtain the sub verification information, or may encrypt the first random number and the identity information $D_{id_{ij}}$ of the intra-domain device based on the stored public key to obtain the sub verification information. Herein, the public key stored by the primary authentication node may be referred to as a first public key. The first public key and the first private key may be a pair of asymmetric keys.

After the primary authentication node obtains the at least one piece of sub verification information, if a quantity of the at least one piece of sub verification information is greater than 1, the primary authentication node may aggregate the at least one piece of sub verification information to obtain the fifth verification information. For example, if the at least one piece of sub verification information obtained by the secondary authentication node is represented as $s''_{i1}$, $s''_{i2}$, $s''_{i3}$, and so on, the primary authentication node aggregates the at least one piece of sub verification information. One aggregation manner may be: $s'''_{ij}=s''_{i1} \oplus s''_{i2} \oplus s''_{i3} \oplus \ldots$, where $s'''_{ij}$ represents the fifth verification information, and $\oplus$ represents an exclusive OR operation. Alternatively, the primary authentication node may aggregate the at least one piece of sub verification information in another manner. It should be noted that a manner in which the primary authentication node aggregates the at least one piece of sub verification information needs to be consistent with a manner in which the secondary authentication node aggregates the at least one piece of third verification information. For example, if the secondary authentication node aggregates the at least one piece of third verification information by using the foregoing described exclusive OR operation, the primary authentication node needs to aggregate the at least one piece of sub verification information by using the foregoing described exclusive OR operation.

If the primary authentication node performs identity verification on the secondary authentication node based on the first verification information, and performs identity verification on the at least one intra-domain device based on the fourth verification information, there may also be several verification results, which are separately described below.

1. The primary authentication node determines that the identity verification on the secondary authentication node succeeds, and determines that the identity verification on the at least one intra-domain device succeeds.

In other words, the primary authentication node determines that the second verification information is consistent with the first verification information, and determines that the fifth verification information is consistent with the fourth verification information.

In this case, the verification process may end. In this case, it is considered that both the identity verification on the secondary authentication node and the identity verification on the at least one intra-domain device in the first set succeed.

2. The primary authentication node determines that the identity verification on the secondary authentication node succeeds, and determines that the identity verification on the at least one intra-domain device fails.

In other words, the primary authentication node determines that the second verification information is consistent with the first verification information, and determines that the fifth verification information is inconsistent with the fourth verification information. In this case, the primary authentication node may directly determine that the identity verification on the secondary authentication node succeeds, and determine that the identity verification on the at least one intra-domain device fails. However, the primary authentication node cannot determine a specific intra-domain device that fails in the identity verification in the at least one intra-domain device.

Alternatively, in addition to determining that the identity verification on the secondary authentication node succeeds, the primary authentication node may further perform identity verification on the at least one intra-domain device in the first set.

For example, the first message may further include the third verification information of the at least one intra-domain device. In other words, in addition to sending the fourth verification information to the primary authentication node, the secondary authentication node may further send the third verification information of the at least one intra-domain device to the primary authentication node.

In this case, if the primary authentication node determines that the fifth verification information is inconsistent with the fourth verification information, the primary authentication node may successively perform verification on the at least one piece of third verification information, to determine a specific intra-domain device that fails in the identity verification.

Alternatively, the first message may not include the at least one piece of third verification information. If the primary authentication node determines that the fifth verification information is inconsistent with the fourth verification information, the primary authentication node may send a second message to the secondary authentication node, and the second message is used to request to obtain verification information corresponding to the at least one intra-domain device. After receiving the second message from the primary authentication node, the secondary authentication node may send the at least one piece of third verification information to the primary authentication node. For example, the secondary authentication node may send a third message to the primary authentication node, and the third message includes the at least one piece of third verification information.

For example, the primary authentication node may generate at least one piece of sixth verification information, and perform verification on the at least one piece of third verification information by using the at least one piece of sixth verification information. For example, if sixth verification information and third verification information that correspond to one intra-domain device are consistent, the primary authentication node considers that identity verification on the intra-domain device succeeds, or if sixth verification information and third verification information that correspond to one intra-domain device are inconsistent, the primary authentication node considers that identity verification on the intra-domain device fails. For example, if identity verification performed by the primary authentication node on one intra-domain device succeeds, the primary authentication node may consider that the intra-domain device is authorized. However, if identity verification performed by the primary authentication node on one intra-domain device fails (or the identity verification fails), the primary authentication node may consider that the intra-domain device is unauthorized. For example, the primary authentication node may obtain the at least one piece of sixth verification information based on the first random number, or may obtain the at least one piece of sixth verification information based on the identity information of the at least one intra-domain device, or may obtain the at least one piece of sixth verification information based on the first random number and the identity information of the at least one intra-domain device.

In an implementation of the sixth verification information, the sixth verification information may be a MAC value. For example, the primary authentication node may obtain the at least one piece of sixth verification information based on r and the identity information of the at least one intra-domain device. Alternatively, in another implementation of the sixth verification information, the sixth verification information may be a digital signature.

A manner in which the primary authentication node generates the sixth verification information needs to be consistent with a manner in which the intra-domain device generates the third verification information. For example, if the third verification information is a MAC value, the sixth verification information is also a MAC value, or if the third verification information is generated by the intra-domain device based on a private key, the sixth verification information needs to be generated by the primary authentication node based on a public key.

The primary authentication node may determine, by separately performing identity verification on the at least one intra-domain device, a specific intra-domain device that fails in the identity verification, so as to perform corresponding processing on the intra-domain device that fails in the identity verification, and an intra-domain device that succeeds in the identity verification may continue to work normally. In this manner, an intra-domain device that fails in identity verification can be effectively located, and an intra-domain device that succeeds in identity verification can be less affected.

3. The primary authentication node determines that the identity verification on the secondary authentication node fails, and determines that the identity verification on the at least one intra-domain device succeeds.

In other words, the primary authentication node determines that the second verification information is consistent with the first verification information, and determines that the fifth verification information is inconsistent with the fourth verification information. In this case, the primary authentication node may directly determine that the identity verification on the secondary authentication node fails. The primary authentication node performs identity verification on the at least one intra-domain device, which is reliable. In this case, the verification process may end.

4. The primary authentication node determines that the identity verification on the secondary authentication node fails, and determines that the identity verification on the at least one intra-domain device fails.

In other words, the primary authentication node determines that the second verification information is consistent with the first verification information, and determines that the fifth verification information is inconsistent with the fourth verification information. In this case, the primary authentication node may directly determine that the identity verification on the secondary authentication node succeeds, and determine that the identity verification on the at least one intra-domain device fails. However, the primary authentication node cannot determine a specific intra-domain device that fails in the identity verification in the at least one intra-domain device.

Alternatively, in addition to determining that the identity verification on the secondary authentication node succeeds, the primary authentication node may further perform identity verification on the at least one intra-domain device in the first set. For details about the verification manner, refer to the descriptions of the foregoing second point.

The primary authentication node may determine, by separately performing identity verification on the at least one intra-domain device, a specific intra-domain device that fails in the identity verification, so as to perform corresponding processing on the intra-domain device that fails in the identity verification, and an intra-domain device that succeeds in the identity verification may continue to work normally. In this manner, even if the secondary authentication node is unreliable, the primary authentication node may effectively locate an intra-domain device that fails in identity verification, and an intra-domain device that succeeds in identity verification can be less affected.

To better understand the technical solution described in the embodiment shown in FIG. 7, the following describes the embodiment shown in FIG. 7 by using an example.

Figure 8:
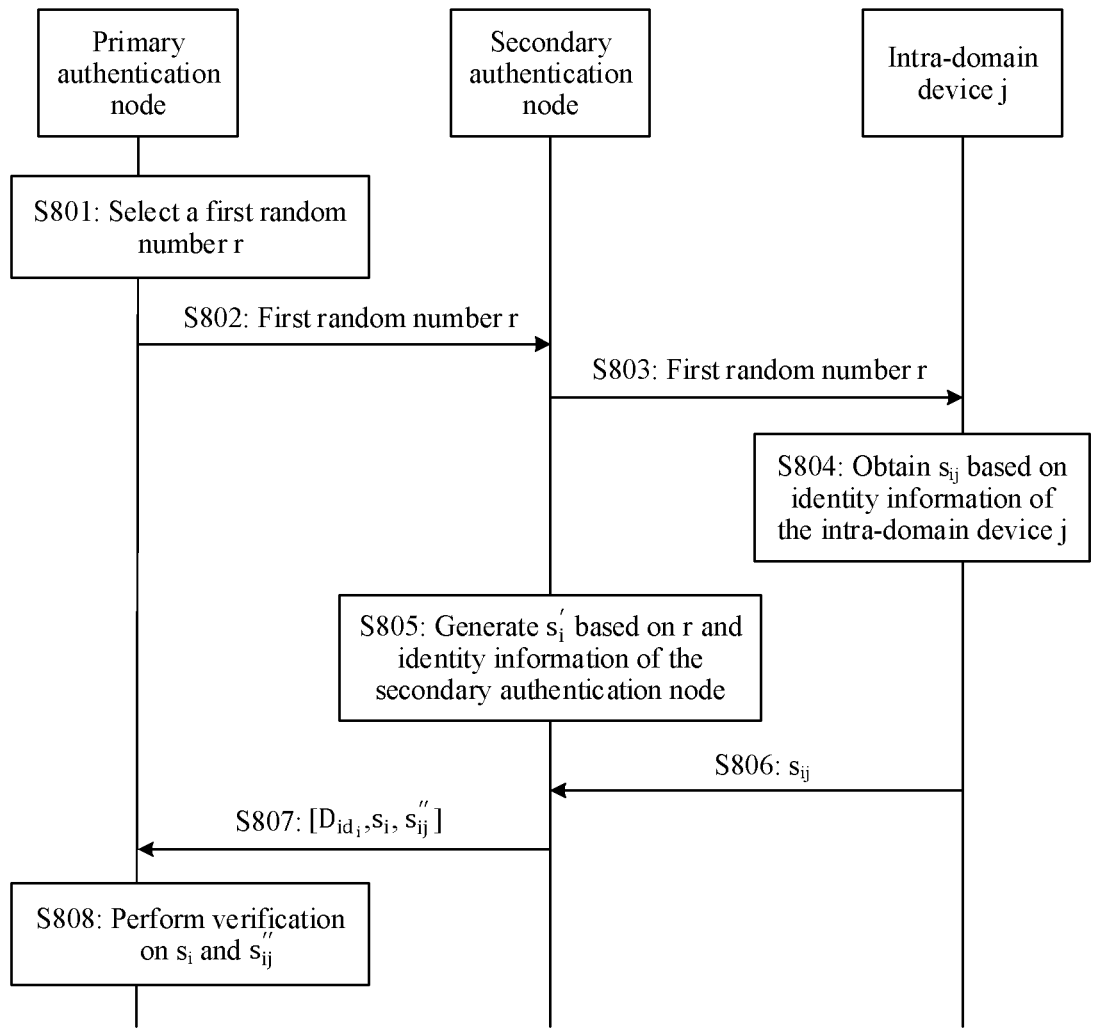
FIG. 8 is a flowchart of an example of a second identity verification method according to an embodiment of this application.

FIG. 8 is a flowchart of an implementation of a second identity verification method according to an embodiment of this application. In a procedure shown in FIG. 8, for example, a secondary authentication node does not aggregate at least one piece of third verification information and does not aggregate at least one piece of fifth verification information, and a first message does not include third verification information of N intra-domain devices.

S801: A primary authentication node selects a first random number r.

For a manner of selecting the first random number r, refer to the description of S701 in the embodiment shown in FIG. 7.

S802: The primary authentication node sends the first random number r to a secondary authentication node, and the secondary authentication node receives the first random number r from the primary authentication node.

S803: The secondary authentication node sends the first random number r to an intra-domain device in the first set, and the intra-domain device in the first set receives the first random number r from the secondary authentication node.

In FIG. 8, only an intra-domain device j in the first set is used as an example.

S804: The intra-domain device j obtains third verification information $s_{ij}$ based on identity information of the intra-domain device j. For example, $s_{ij}=MAC(r', D_{id_{ij}})$.

S805: The secondary authentication node generates first verification information s; based on r and identity information of the secondary authentication node.

S806: The intra-domain device j sends $s_{ij}$ to the secondary authentication node, and the secondary authentication node receives $s_{ij}$ from the intra-domain device j.

All intra-domain devices that receive r may obtain the third verification information. In S803, the secondary authentication node may send r to all the intra-domain devices in the first set. In this case, in S806, all the intra-domain devices in the first set may send the third verification information to the secondary authentication node. Alternatively, in S803, the secondary authentication node may send r to only some intra-domain devices in the first set. In this case, in S806, some intra-domain devices in the first set may send third verification information to the secondary authentication node. In conclusion, the secondary authentication node may receive at least one piece of third verification information from at least one intra-domain device in the first set. In FIG. 8, only the intra-domain device j is used as an example.

The secondary authentication node may receive the at least one piece of third verification information from the at least one intra-domain device in the first set. Therefore, after obtaining the at least one piece of third verification information, the secondary authentication node may aggregate the at least one piece of third verification information to obtain fourth verification information. For example, if the at least one piece of third verification information obtained by the secondary authentication node is represented as $s_{i1}$, $s_{i2}$, $s_{i3}$, and so on, the secondary authentication node aggregates the at least one piece of third verification information. One aggregation manner may be: $s'''_{ij} = s_{i1} \oplus s_{i2} \oplus s_{i3} \oplus \ldots$, where $s''_{ij}$ represents the fourth verification information, and $\oplus$ represents an exclusive OR operation. Alternatively, the secondary authentication node may aggregate the at least one piece of third verification information in another manner.

S807: The secondary authentication node sends $[D_{id_i}, s_i, s''_{ij}]$ to the primary authentication node, and the primary authentication node receives $[D_{id_i}, s_i, s''_{ij}]$ from the secondary authentication node.

S808: The primary authentication node performs verification on $s_i$ and $s''_{ij}$. If the verification on $s_i$ fails, it is considered that the identity verification on the secondary authentication node fails, or if the verification on $s_i$ succeeds, it is considered that the identity verification on the secondary authentication node succeeds. If the verification on $s''_{ij}$ succeeds, it is considered that the identity verification on the at least one intra-domain device succeeds, or if the verification on $s''_{ij}$ succeeds, it is considered that the identity verification on the at least one intra-domain device fails.

If the primary authentication node considers that the identity verification on the at least one intra-domain device fails, the primary authentication node may send a second message to the secondary authentication node, and the second message is used to request to obtain verification information corresponding to the at least one intra-domain device. After receiving the second message from the primary authentication node, the secondary authentication node may send the at least one piece of third verification information to the primary authentication node. For example, the secondary authentication node may send a third message to the primary authentication node, and the third message includes the at least one piece of third verification information. In this case, the primary authentication node may perform verification on $s_{ij}$, to further determine whether the identity verification on the at least one intra-domain device succeeds.

For some specific implementation details of the steps in the procedure shown in FIG. 8, refer to related descriptions of the embodiment shown in FIG. 7.

In this embodiment of this application, the primary authentication node may perform overall verification, and the secondary authentication node does not need to perform verification, thereby reducing load of the secondary authentication node. If the primary authentication node determines, through verification, that the identity verification on the at least one intra-domain device fails, the primary authentication node may further request to obtain information about the at least one intra-domain device from the secondary authentication node, so as to perform further verification. However, if the primary authentication node determines, through verification, that the identity verification on the at least one intra-domain device succeeds, the primary authentication node may not need to request information about the at least one intra-domain device from the secondary authentication node, thereby reducing information exchange as much as possible, and saving transmission overheads.

With reference to the accompanying drawings, the following describes apparatuses configured to implement the foregoing methods in the embodiments of this application. Therefore, all the foregoing content may be used in subsequent embodiments, and repeated content is not described again.

Figure 9:
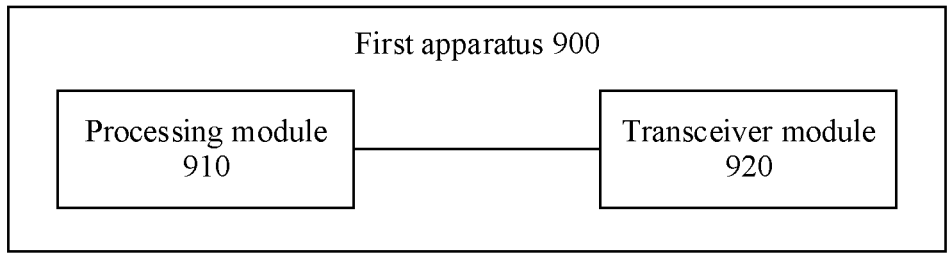
FIG. 9 is a schematic block diagram of a first type of first apparatus according to an embodiment of this application.

FIG. 9 is a schematic block diagram of a communications device 900 according to an embodiment of this application. For example, the communications device 900 is a first apparatus 900. The first apparatus 900 includes a processing module 910 and a transceiver module 920. The processing module 910 and the transceiver module 920 may be logical function modules. The processing module 910 may be configured to perform all operations performed by the first apparatus in the embodiment shown in FIG. 2 other than sending and receiving operations, for example, S208, and/or configured to support another process in the technology described in this specification. The transceiver module 920 may be configured to perform all the sending and receiving operations performed by the first apparatus in the embodiment shown in FIG. 2, for example, S201 and S207 in the embodiment shown in FIG. 2, and/or configured to support another process in the technology described in this specification.

For example, the transceiver module 920 is configured to send a first random number to a second apparatus. A first vehicle carries the first apparatus 900 and a first set. The second apparatus belongs to the first set. The first set further includes a third apparatus. The first apparatus 900 communicates with the third apparatus by using the second apparatus.

The transceiver module 920 is further configured to receive a first message from the second apparatus. The first message includes first verification information. The first verification information is used to perform identity verification on the second apparatus. The first verification information is generated based on identity information of the second apparatus and the first random number.

The processing module 910 is configured to determine, based on the first verification information and the first random number, that the identity verification on the second apparatus succeeds.

For example, if the identity verification performed by the first apparatus on the second apparatus succeeds, the first apparatus may consider that the second apparatus is authorized. However, if the identity verification performed by the first apparatus on the second apparatus fails (or the identity verification fails), the first apparatus may consider that the second apparatus is unauthorized.

In an optional implementation, the processing module 910 is configured to determine, in the following manner based on the first verification information and the first random number, that the identity verification on the second apparatus succeeds, which includes generating second verification information based on the identity information of the second apparatus and the first random number, determining whether the first verification information is consistent with the second verification information, and when the first verification information is consistent with the second verification information, determining that the identity verification on the second apparatus succeeds.

In an optional implementation, the first message further includes fourth verification information, and the fourth verification information is used to indicate whether identity verification on the third apparatus succeeds. The processing module 910 is configured to generate the second verification information based on the identity information of the second apparatus and the first random number in the following manner, which includes generating the second verification information based on the identity information of the second apparatus, the fourth verification information, and the first random number.

In an optional implementation, the first message further includes third verification information generated by the third apparatus, and the third verification information is obtained by the third apparatus based on identity information of the third apparatus.

In an optional implementation, the first message further includes the fourth verification information, and the fourth verification information is used to indicate whether the identity verification on the third apparatus succeeds. The processing module 910 is further configured to, after determining that the identity verification on the second apparatus succeeds, when the fourth verification information indicates that the identity verification on the third apparatus fails, perform verification based on the third verification information, to determine whether the identity verification on the third apparatus succeeds.

For example, if the identity verification performed by the first apparatus on the third apparatus succeeds, the first apparatus may consider that the third apparatus is authorized. However, if the identity verification performed by the first apparatus on the third apparatus fails (or the identity verification fails), the first apparatus may consider that the third apparatus is unauthorized.

In an optional implementation, the processing module 910 is further configured to determine, based on the first verification information and the first random number, that the identity verification on the second apparatus fails.

In an optional implementation, the first message further includes the fourth verification information.

The transceiver module 920 is further configured to, after the fourth verification information is used to indicate that the identity verification on the third apparatus fails, send a second message to the second apparatus. The second message is used to request to obtain verification information corresponding to the third apparatus.

The transceiver module 920 is further configured to receive a third message from the second apparatus. The third message includes third verification information corresponding to the third apparatus.

The processing module 910 is further configured to perform verification based on the third verification information, to determine whether the identity verification on the third apparatus succeeds.

In an optional implementation, the transceiver module 920 is further configured to, after the processing module 910 determines that the identity verification on the second apparatus fails, send a second message to the second apparatus, where the second message is used to request to obtain verification information corresponding to the third apparatus.

The transceiver module 920 is further configured to receive a third message from the second apparatus. The third message includes third verification information corresponding to the third apparatus.

The processing module 910 is further configured to perform verification based on the third verification information, to determine whether the identity verification on the third apparatus succeeds.

In an optional implementation, there are a plurality of third apparatuses, the first message further includes fourth verification information, and the fourth verification information is obtained by aggregating a plurality of pieces of third verification information from the plurality of third apparatuses. The processing module 910 is further configured to perform verification based on the fourth verification information, to determine whether identity verification on the plurality of third apparatuses succeeds.

In an optional implementation, the transceiver module 920 is further configured to, when the processing module 910 determines, based on the fourth verification information, that the identity verification on the plurality of third apparatuses fails, send a second message to the second apparatus, where the second message is used to request to obtain verification information corresponding to the plurality of third apparatuses.

The transceiver module 920 is further configured to receive a third message from the second apparatus. The third message includes the plurality of pieces of third verification information.

The processing module 910 is further configured to perform verification based on the plurality of pieces of third verification information, to determine whether identity verification on each of the plurality of third apparatuses succeeds.

It should be understood that the processing module 910 in this embodiment of this application may be implemented by a processor or a processor-related circuit component, and the transceiver module 920 may be implemented by a transceiver or a transceiver-related circuit component.

Figure 10:
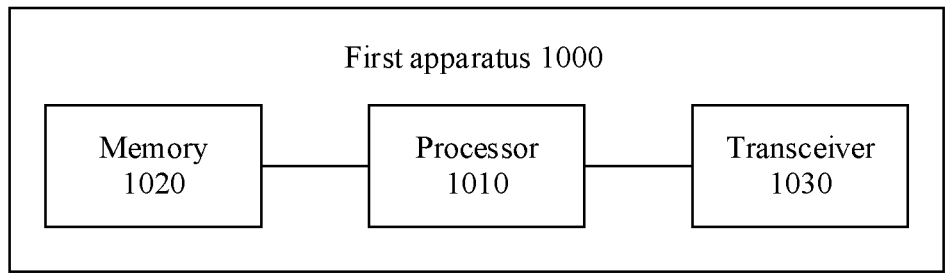
FIG. 10 is another schematic block diagram of a first type of first apparatus according to an embodiment of this application.

As shown in FIG. 10, an embodiment of this application further provides a communications device 1000. For example, the communications device 1000 is a first apparatus 1000. The first apparatus 1000 includes a processor 1010, a memory 1020, and a transceiver 1030. The memory 1020 stores an instruction or a program. The processor 1010 is configured to execute the instruction or the program stored in the memory 1020. When the instruction or the program stored in the memory 1020 is executed, the processor 1010 is configured to perform an operation performed by the processing module 910 in the foregoing embodiment, and the transceiver 1030 is configured to perform an operation performed by the transceiver module 920 in the foregoing embodiment.

It should be understood that the first apparatus 900 or the first apparatus 1000 according to this embodiment of this application may correspond to the first apparatus in the embodiment shown in FIG. 2, and operations and/or functions of the modules in the first apparatus 900 or the first apparatus 1000 are respectively intended to implement corresponding procedures in the embodiment shown in FIG. 2. Alternatively, the first apparatus 900 or the first apparatus 1000 according to this embodiment of this application may correspond to the first apparatus in the embodiment shown in FIG. 7, and operations and/or functions of the modules in the first apparatus 900 or the first apparatus 1000 are respectively intended to implement corresponding procedures in the embodiment shown in FIG. 7. For brevity, details are not described herein again.

Figure 11:
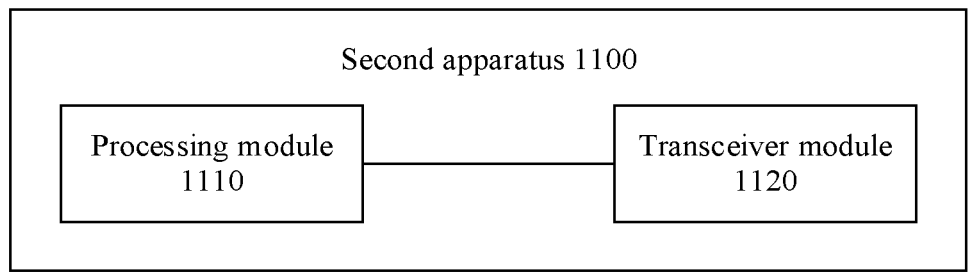
FIG. 11 is a schematic block diagram of a first type of second apparatus according to an embodiment of this application.

FIG. 11 is a schematic block diagram of a communications device 1100 according to an embodiment of this application. For example, the communications device 1100 is a second apparatus 1100. The second apparatus 1100 includes a processing module 1110 and a transceiver module 1120. The processing module 1110 and the transceiver module 1120 may be logical function modules.

The processing module 1110 may be configured to perform all operations performed by the second apparatus in the embodiment shown in FIG. 2 other than sending and receiving operations, for example, S204 and S206, and/or configured to support another process in the technology described in this specification. The transceiver module 1120 may be configured to perform all the sending and receiving operations performed by the second apparatus in the embodiment shown in FIG. 2, for example, S201, S202, S205, and S207 in the embodiment shown in FIG. 2, and/or configured to support another process in the technology described in this specification.

Alternatively, the processing module 1110 may be configured to perform all operations performed by the first apparatus in the embodiment shown in FIG. 7 other than sending and receiving operations, for example, S707, and/or configured to support another process in the technology described in this specification, and the transceiver module 1120 may be configured to perform all the sending and receiving operations performed by the first apparatus in the embodiment shown in FIG. 7, for example, S701 and S706, and/or configured to support another process in the technology described in this specification.

For example, the transceiver module 1120 is configured to send a second random number to a third apparatus. A first vehicle carries a first apparatus and a first set. The second apparatus 1100 and the third apparatus belong to the first set. The first apparatus communicates with the third apparatus by using the second apparatus 1100.

The transceiver module 1120 is further configured to receive third verification information from the third apparatus. The third verification information is generated based on identity information of the third apparatus and the second random number.

The processing module 1110 is configured to determine, based on the second random number and the third verification information, that identity verification on the third apparatus succeeds.

For example, if the identity verification performed by the second apparatus 1100 on the third apparatus succeeds, the second apparatus may consider that the third apparatus is authorized. However, if the identity verification performed by the second apparatus on the third apparatus fails (or the identity verification fails), the second apparatus may consider that the third apparatus is unauthorized.

In an optional implementation, the processing module 1110 is configured to determine, in the following manner based on the second random number and the third verification information, whether the identity verification on the third apparatus succeeds, which includes generating fifth verification information based on the second random number and the identity information of the third apparatus, and determining, based on the fifth verification information and the third verification information, that the identity verification on the third apparatus succeeds.

In an optional implementation, the processing module 1110 is configured to determine, in the following manner based on the fifth verification information and the third verification information, that the identity verification on the third apparatus succeeds, which includes determining whether the fifth verification information is consistent with the third verification information, and when the fifth verification information is consistent with the third verification information, determining that the identity verification on the third apparatus succeeds.

In an optional implementation, if there are a plurality of third apparatuses, there are a plurality of pieces of fifth verification information and a plurality of pieces of third verification information. The processing module 1110 is configured to determine, in the following manner based on the fifth verification information and the third verification information, that the identity verification on the third apparatus succeeds, which includes aggregating the plurality of pieces of fifth verification information to obtain sixth verification information, and aggregating the plurality of pieces of third verification information to obtain seventh verification information, determining whether the sixth verification information is consistent with the seventh verification information, and when the sixth verification information is consistent with the seventh verification information, determining that identity verification on the plurality of third apparatuses succeeds.

In an optional implementation, the processing module 1110 is further configured to generate first verification information based on identity information of the second apparatus 1100 and a first random number from the first apparatus.

The transceiver module 1120 is further configured to send a first message to the first apparatus. The first message includes the first verification information, and the first verification information indicates that the identity verification on the third apparatus succeeds.

In an optional implementation, the first message further includes the third verification information. The third verification information is third verification information indicating that the verification performed by the second apparatus 1100 fails, or the third verification information is third verification information indicating that the verification performed by the second apparatus 1100 succeeds.

In an optional implementation, the second random number and the first random number have a same length but different content, or the second random number is obtained by splicing the first random number and a third random number, or the second random number is the same as the first random number.

It should be understood that the processing module 1110 in this embodiment of this application may be implemented by a processor or a processor-related circuit component, and the transceiver module 1120 may be implemented by a transceiver or a transceiver-related circuit component.

Figure 12:
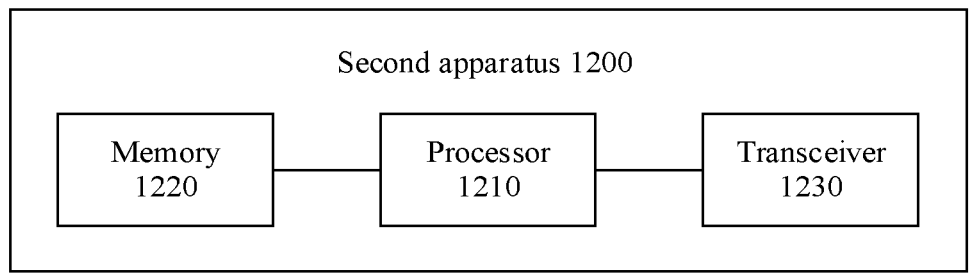
FIG. 12 is another schematic block diagram of a first type of second apparatus according to an embodiment of this application.

As shown in FIG. 12, an embodiment of this application further provides a communications device 1200. For example, the communications device 1200 is a second apparatus 1200. The second apparatus 1200 includes a processor 1210, a memory 1220, and a transceiver 1230. The memory 1220 stores an instruction or a program. The processor 1210 is configured to execute the instruction or the program stored in the memory 1220. When the instruction or the program stored in the memory 1220 is executed, the processor 1210 is configured to perform an operation performed by the processing module 1110 in the foregoing embodiment, and the transceiver 1230 is configured to perform an operation performed by the transceiver module 1120 in the foregoing embodiment.

It should be understood that the second apparatus 1100 or the second apparatus 1200 according to this embodiment of this application may correspond to the second apparatus in the embodiment shown in FIG. 2, and operations and/or functions of the modules in the second apparatus 1100 or the second apparatus 1200 are respectively intended to implement corresponding procedures in the embodiment shown in FIG. 2. For brevity, details are not described herein again.

Figure 13:
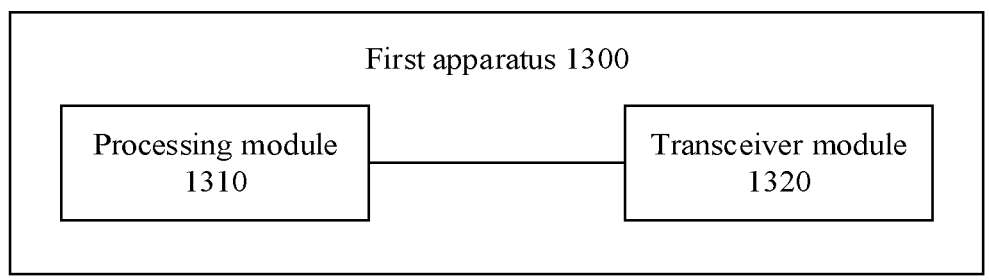
FIG. 13 is a schematic block diagram of a second type of second apparatus according to an embodiment of this application.

FIG. 13 is a schematic block diagram of a communications device 1300 according to an embodiment of this application. For example, the communications device 1300 is a second apparatus 1300. The second apparatus 1300 includes a processing module 1310 and a transceiver module 1320. The processing module 1310 and the transceiver module 1320 may be logical function modules. The processing module 1310 may be configured to perform all operations performed by the second apparatus in the embodiment shown in FIG. 7 other than sending and receiving operations, for example, S704, and/or configured to support another process in the technology described in this specification. The transceiver module 1320 may be configured to perform all the sending and receiving operations performed by the second apparatus in the embodiment shown in FIG. 7, for example, S701, S702, S705, and S706 in the embodiment shown in FIG. 7, and/or configured to support another process in the technology described in this specification.

For example, the transceiver module 1320 is configured to send a first random number to a third apparatus. A first vehicle carries a first set. The first set includes the second apparatus 1300 and the third apparatus. The first vehicle further carries a first apparatus. The first apparatus communicates with the third apparatus by using the second apparatus 1300.

The transceiver module 1320 is further configured to receive third verification information from the third apparatus. The third verification information is generated based on the first random number and identity information of the third apparatus.

The processing module 1310 is configured to obtain fourth verification information based on the third verification information. The fourth verification information is used to verify whether identity verification on the third apparatus succeeds.

The transceiver module 1320 is further configured to send the fourth verification information to the first apparatus.

For example, if identity verification performed by the first apparatus on the second apparatus 1300 succeeds, the first apparatus may consider that the second apparatus is authorized. However, if identity verification performed by the first apparatus on the second apparatus fails (or the identity verification fails), the first apparatus may consider that the second apparatus is unauthorized.

For example, if identity verification performed by the first apparatus on the third apparatus succeeds, the first apparatus may consider that the third apparatus is authorized. However, if identity verification performed by the first apparatus on the third apparatus fails (or the identity verification fails), the first apparatus may consider that the third apparatus is unauthorized.

In an optional implementation, the processing module 1310 is further configured to generate first verification information based on identity information of the second apparatus 1300 and the first random number, where the first verification information is used to verify whether identity verification on the second apparatus 1300 succeeds.

The transceiver module 1320 is further configured to send the first verification information to the first apparatus.

In an optional implementation, there are a plurality of third apparatuses, and correspondingly there are a plurality of pieces of third verification information. The processing module 1310 is configured to obtain the fourth verification information based on the third verification information in the following manner, which includes aggregating the plurality of pieces of third verification information to obtain the fourth verification information.

In an optional implementation, the transceiver module 1320 is further configured to receive a second message from the first apparatus, where the second message is used to request to obtain verification information corresponding to the plurality of third apparatuses, and send a third message to the first apparatus, where the third message includes the plurality of pieces of third verification information.

It should be understood that the processing module 1310 in this embodiment of this application may be implemented by a processor or a processor-related circuit component, and the transceiver module 1320 may be implemented by a transceiver or a transceiver-related circuit component.

Figure 14:
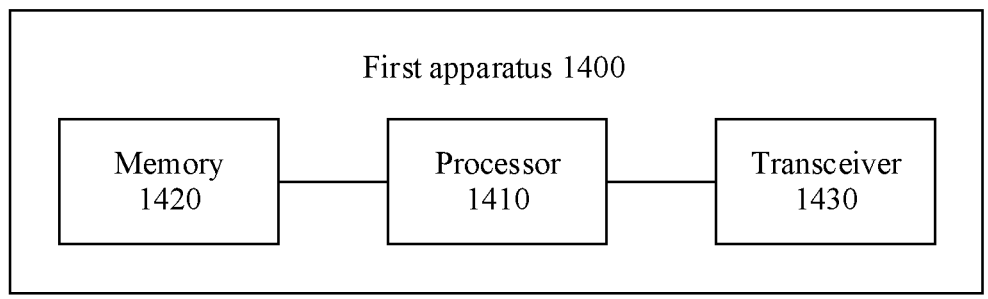
FIG. 14 is another schematic block diagram of a second type of second apparatus according to an embodiment of this application.

As shown in FIG. 14, an embodiment of this application further provides a communications device 1400. For example, the communications device 1400 is a first apparatus 1400. The first apparatus 1400 includes a processor 1410, a memory 1420, and a transceiver 1430. The memory 1420 stores an instruction or a program. The processor 1410 is configured to execute the instruction or the program stored in the memory 1420. When the instruction or the program stored in the memory 1420 is executed, the processor 1410 is configured to perform an operation performed by the processing module 1310 in the foregoing embodiment, and the transceiver 1430 is configured to perform an operation performed by the transceiver module 1320 in the foregoing embodiment.

It should be understood that the second apparatus 1300 or the second apparatus 1400 according to this embodiment of this application may correspond to the second apparatus in the embodiment shown in FIG. 7, and operations and/or functions of the modules in the second apparatus 1300 or the second apparatus 1400 are respectively intended to implement corresponding procedures in the embodiment shown in FIG. 7. For brevity, details are not described herein again.

An embodiment of this application further provides a communications apparatus. The communications apparatus may be a vehicle-mounted apparatus, a road side apparatus, a circuit, or the like. The communications apparatus may be configured to perform an action performed by the first apparatus or the second apparatus in the method embodiment shown in FIG. 2 or the method embodiment shown in FIG. 7.

Figure 15:
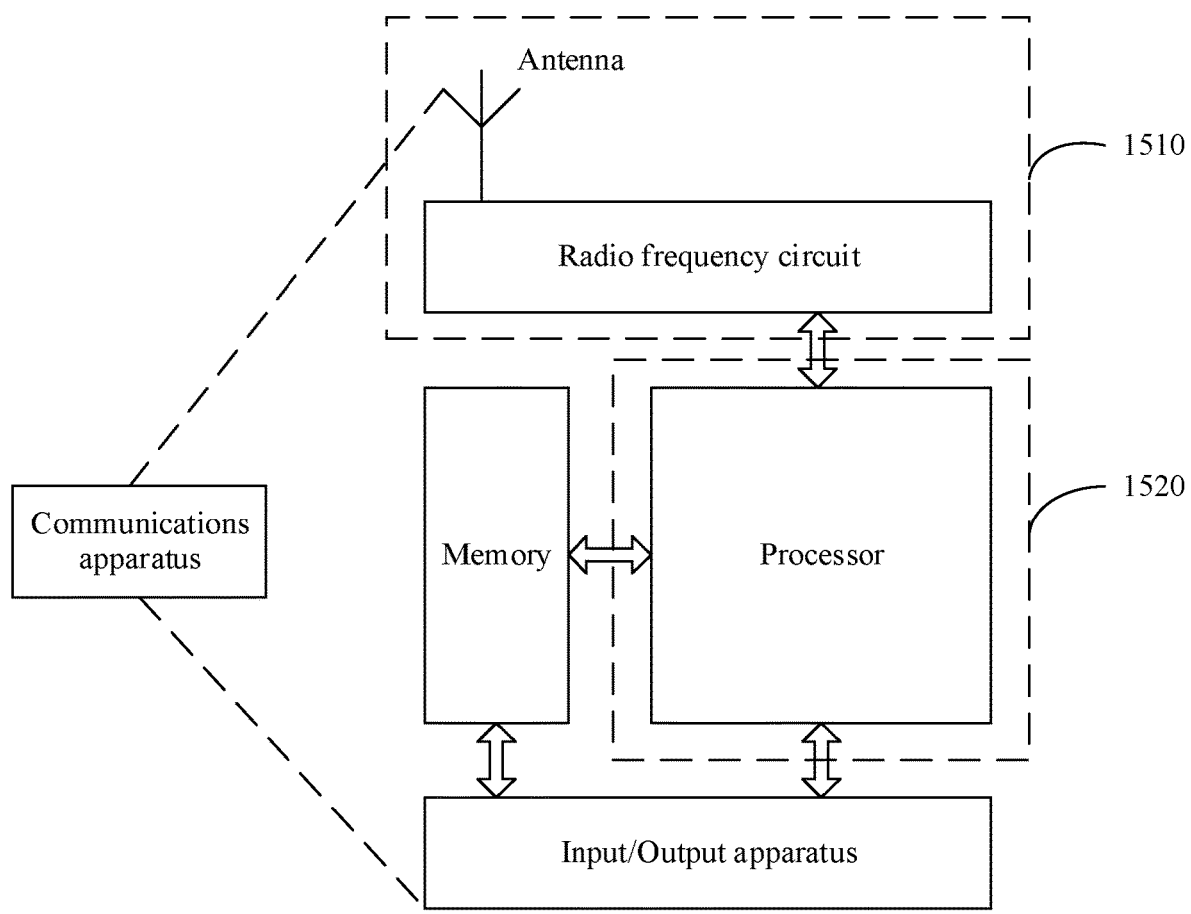
FIG. 15 is a schematic block diagram of a communications apparatus according to an embodiment of this application.

When the communications apparatus is the first apparatus or the second apparatus, FIG. 15 is a simplified schematic structural diagram of the communications apparatus. As shown in FIG. 15, the communications apparatus includes a processor, a memory, a radio frequency circuit, an antenna, and an input/output apparatus. The processor is mainly configured to process a communication protocol and communication data, control the communications apparatus, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of communications apparatuses may have no input/output apparatus.

When data needs to be sent, after performing baseband processing on the to-be-sent data, the processor outputs a baseband signal to the radio frequency circuit. The radio frequency circuit performs radio frequency processing on the baseband signal and then sends a radio frequency signal to the outside in a form of an electromagnetic wave through the antenna. When data is sent to the communications apparatus, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 15 shows only one memory and one processor. In an actual communications apparatus product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the communications apparatus, and the processor that has a processing function may be considered as a processing unit of the communications apparatus. As shown in FIG. 15, the communications apparatus includes a transceiver unit 1510 and a processing unit 1520. The transceiver unit 1510 may also be referred to as a transceiver, a transceiver apparatus, or the like. The processing unit may also be referred to as a processor, a processing board, a processing module, a processing apparatus, or the like. Optionally, a component configured to implement a receiving function in the transceiver unit 1510 may be considered as a receiving unit, and a component configured to implement a sending function in the transceiver unit 1510 may be considered as a sending unit. In other words, the transceiver unit 1510 includes the receiving unit and the sending unit. The transceiver unit sometimes may also be referred to as a transceiver, a transceiver, a transceiver circuit, or the like. The receiving unit sometimes may also be referred to as a receiver, a receiver, a receiver circuit, or the like. The sending unit sometimes may also be referred to as a transmitter, a transmitter, a transmitter circuit, or the like.

It should be understood that the transceiver unit 1510 is configured to perform sending and receiving operations of the first apparatus in the method embodiment shown in FIG. 2, and the processing unit 1520 is configured to perform another operation on the first apparatus side in the method embodiment shown in FIG. 2 other than the sending and receiving operations.

For example, in an implementation, the transceiver unit 1510 is configured to perform sending and receiving steps of the first apparatus in the embodiment shown in FIG. 2, for example, S201 and S207, and/or configured to support another process in the technology described in this specification, and the processing unit 1520 is configured to perform another operation performed by the first apparatus in the embodiment shown in FIG. 2 other than the sending and receiving operations, for example, S208 in the embodiment shown in FIG. 2, and/or configured to support another process in the technology described in this specification.

Alternatively, the transceiver unit 1510 is configured to perform sending and receiving operations of the second apparatus in the method embodiment shown in FIG. 2, and the processing unit 1520 is configured to perform another operation performed by the second apparatus in the method embodiment shown in FIG. 2 other than the sending and receiving operations.

For example, in an implementation, the transceiver unit 1510 is configured to perform sending and receiving steps performed by the second apparatus in the embodiment shown in FIG. 2, for example, S201, S202, S205, and S207, and/or configured to support another process in the technology described in this specification, and the processing unit 1520 is configured to perform other operations performed by the second apparatus in the embodiment shown in FIG. 2 other than the sending and receiving operations, for example, S204 and S206, and/or configured to support another process in the technology described in this specification.

Alternatively, the transceiver unit 1510 is configured to perform sending and receiving operations on the first apparatus side in the method embodiment shown in FIG. 7, and the processing unit 1520 is configured to perform another operation on the first apparatus side in the method embodiment shown in FIG. 7 other than the sending and receiving operations.

For example, in an implementation, the transceiver unit 1510 is configured to perform sending and receiving steps performed by the first apparatus in the embodiment shown in FIG. 7, for example, S701 and S706, and/or configured to support another process in the technology described in this specification, and the processing unit 1520 is configured to perform another operation performed by the first apparatus in the embodiment shown in FIG. 7 other than the sending and receiving operations, for example, S707, and/or configured to support another process in the technology described in this specification.

Alternatively, the transceiver unit 1510 is configured to perform sending and receiving operations on the second apparatus side in the method embodiment shown in FIG. 7, and the processing unit 1520 is configured to perform another operation on the second apparatus side in the method embodiment shown in FIG. 7 other than the sending and receiving operations.

For example, in an implementation, the transceiver unit 1510 is configured to perform sending and receiving steps performed by the second apparatus in the embodiment shown in FIG. 7, for example, S701, S702, S705, and S706, and/or configured to support another process in the technology described in this specification, and the processing unit 1520 is configured to perform another operation performed by the second apparatus in the embodiment shown in FIG. 7 other than the sending and receiving operations, for example, S704, and/or configured to support another process in the technology described in this specification.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 16:
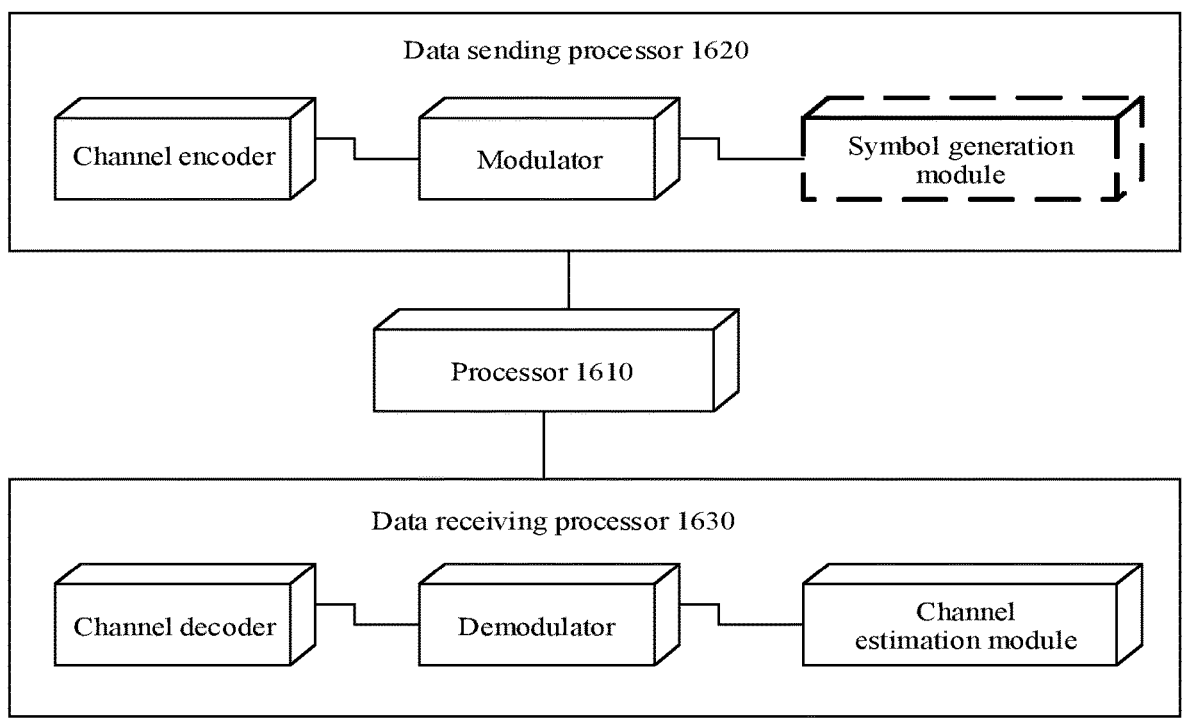
FIG. 16 is another schematic block diagram of a communications apparatus according to an embodiment of this application.

For the communications apparatus in this embodiment of this application, further refer to a device shown in FIG. 16. For example, the device may complete a function similar to that of a processor 1610 in FIG. 16. In FIG. 16, the device includes the processor 1610, a data sending processor 1620, and a data receiving processor 1630. The processing module 910 in the foregoing embodiment may be the processor 1610 in FIG. 16, and completes a corresponding function, and the transceiver module 920 in the foregoing embodiment may be the data sending processor 1620 and/or the data receiving processor 1630 in FIG. 16. Alternatively, the processing module 1110 in the foregoing embodiment may be the processor 1610 in FIG. 16, and completes a corresponding function, and the transceiver module 1120 in the foregoing embodiment may be the data sending processor 1620 and/or the data receiving processor 1630 in FIG. 16. Alternatively, the processing module 1310 in the foregoing embodiment may be the processor 1610 in FIG. 16, and completes a corresponding function, and the transceiver module 1320 in the foregoing embodiment may be the data sending processor 1620 and/or the data receiving processor 1630 in FIG. 16.

Although a channel encoder and a channel decoder are shown in FIG. 16, it may be understood that the modules are merely an example, and do not constitute a limitation on this embodiment.

Figure 17:
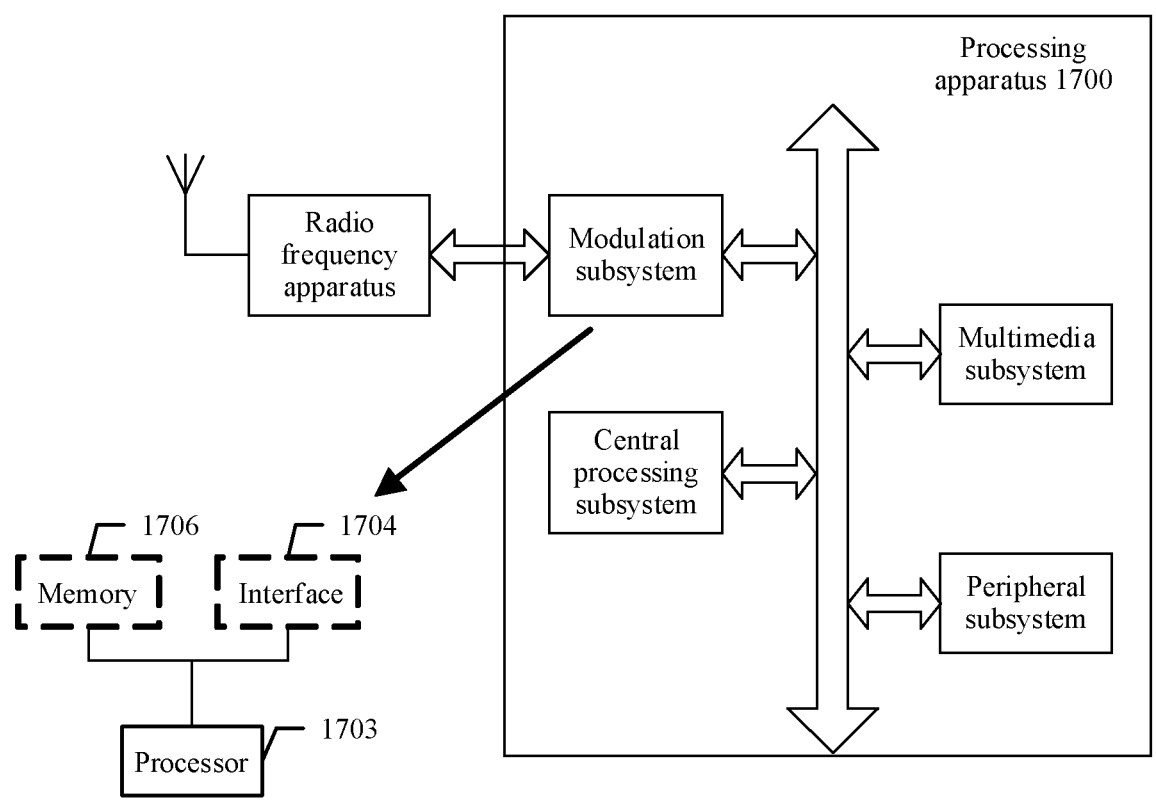
FIG. 17 is still another schematic block diagram of a communications apparatus according to an embodiment of this application.

FIG. 17 shows another form of this embodiment. A processing apparatus 1700 includes modules such as a modulation subsystem, a central processing subsystem, and a peripheral subsystem. The communications apparatus in this embodiment may be used as the modulation subsystem. Further, the modulation subsystem may include a processor 1703 and an interface 1704. The processor 1703 completes a function of the processing module 910, and the interface 1704 completes a function of the transceiver module 920. Alternatively, the processor 1703 completes a function of the processing module 1110, and the interface 1704 completes a function of the transceiver module 1120. Alternatively, the processor 1703 completes a function of the processing module 1310, and the interface 1704 completes a function of the transceiver module 1320. As another variation, the modulation subsystem includes a memory 1706, a processor 1703, and a program that is stored in the memory 1706 and that can run on the processor. When executing the program, the processor 1703 implements the method on the first apparatus side or the second apparatus side in the method embodiment shown in FIG. 2 or the method embodiment shown in FIG. 7. It should be noted that the memory 1706 may be a nonvolatile memory, or may be a volatile memory. The memory 1706 may be located in the modulation subsystem, or may be located in the processing apparatus 1700, provided that the memory 1706 can be connected to the processor 1703.

An embodiment of this application further provides a first communications system. The communications system may include at least one first apparatus in the embodiment shown in FIG. 2, and include the second apparatus in the embodiment shown in FIG. 2. The first apparatus is, for example, the first apparatus 900 in FIG. 9 or the first apparatus 1000 in FIG. 10. The second apparatus is, for example, the second apparatus 1100 in FIG. 11 or the second apparatus 1200 in FIG. 12. For example, the first apparatus may be configured to perform all operations performed by the first apparatus in the embodiment shown in FIG. 2, for example, S201, S207, and S208 in the embodiment shown in FIG. 2, and/or configured to support another process in the technology described in this specification. The second apparatus may be configured to perform all operations performed by the second apparatus in the embodiment shown in FIG. 2, for example, S201, S202, S204, S205, S206, and S207 in the embodiment shown in FIG. 2, and/or configured to support another process in the technology described in this specification.

An embodiment of this application further provides a second communications system. The communications system may include at least one first apparatus in the embodiment shown in FIG. 7, and include the second apparatus in the embodiment shown in FIG. 7. The first apparatus is, for example, the first apparatus 900 in FIG. 9 or the first apparatus 1000 in FIG. 10. The second apparatus is, for example, the second apparatus 1300 in FIG. 13 or the second apparatus 1400 in FIG. 14. For example, the first apparatus is configured to perform all operations performed by the first apparatus in the embodiment shown in FIG. 7, for example, S701, S706, and S707 in the embodiment shown in FIG. 7, and/or configured to support another process in the technology described in this specification. The second apparatus may be configured to perform all operations performed by the second apparatus in the embodiment shown in FIG. 7, for example, S701, S702, S704, S705, and S706 in the embodiment shown in FIG. 7, and/or configured to support another process in the technology described in this specification.

The first communications system and the second communications system may be a same communications system, or may be different communications systems.

An embodiment of this application further provides a computer-readable storage medium. The computer-readable storage medium is configured to store a computer program. When the computer program is executed by a computer, the computer may implement the procedure related to the first apparatus in the embodiment shown in FIG. 2 provided in the foregoing method embodiment.

An embodiment of this application further provides a computer-readable storage medium. The computer-readable storage medium is configured to store a computer program. When the computer program is executed by a computer, the computer may implement the procedure related to the second apparatus in the embodiment shown in FIG. 2 provided in the foregoing method embodiment.

An embodiment of this application further provides a computer-readable storage medium. The computer-readable storage medium is configured to store a computer program. When the computer program is executed by a computer, the computer may implement the procedure related to the first apparatus in the embodiment shown in FIG. 7 provided in the foregoing method embodiment.

An embodiment of this application further provides a computer-readable storage medium. The computer-readable storage medium is configured to store a computer program. When the computer program is executed by a computer, the computer may implement the procedure related to the second apparatus in the embodiment shown in FIG. 7 provided in the foregoing method embodiment.

An embodiment of this application further provides a computer program product. The computer program product is configured to store a computer program. When the computer program is executed by a computer, the computer may perform the method on the first apparatus side in the method embodiment shown in FIG. 2.

An embodiment of this application further provides a computer program product. The computer program product is configured to store a computer program. When the computer program is executed by a computer, the computer may perform the method on the second apparatus side in the method embodiment shown in FIG. 2.

An embodiment of this application further provides a computer program product. The computer program product is configured to store a computer program. When the computer program is executed by a computer, the computer may perform the method on the first apparatus side in the method embodiment shown in FIG. 7.

An embodiment of this application further provides a computer program product. The computer program product is configured to store a computer program. When the computer program is executed by a computer, the computer may perform the method on the second apparatus side in the method embodiment shown in FIG. 7.

It should be understood that the processor mentioned in the embodiments of this application may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), and is used as an external cache. By way of example and not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

It should be noted that, when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described in this specification is intended to include but is not limited to these and any other proper types of memories.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application It can be clearly understood by a person skilled in the art that, for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in another manner. For example, the described apparatus embodiments are merely examples. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by a first apparatus, wherein the method comprises:
   sending a first random number to a second apparatus, wherein a vehicle comprises the first apparatus, the second apparatus, and a first set, wherein the first set comprises the second apparatus and a third apparatus, wherein the first apparatus is a primary authentication node in the vehicle and performs first identity verification on the second apparatus, and wherein the second apparatus is a secondary authentication node in the first set and performs second identity verification on the third apparatus;
   receiving, from the second apparatus, a first message comprising first verification information, wherein the first verification information is for performing the first identity verification on the second apparatus, wherein the first verification information is based on first identity information of the second apparatus and the first random number, and wherein the first message further comprises third verification information of the third apparatus; and
   determining, based on the first verification information and the first random number, whether the first identity verification on the second apparatus has succeeded and whether the second identity verification on the third apparatus succeeds.

2. The method of claim 1, further comprising:
   generating second verification information based on the first identity information and the first random number;
   determining whether the first verification information is consistent with the second verification information; and further determining that the first identity verification on the second apparatus has succeeded when the first verification information is consistent with the second verification information.

3. The method of claim 2, wherein the third verification information is based on second identity information of the third apparatus.

4. The method of claim 3, wherein the first message further comprises fourth verification information indicating whether the second identity verification on the third apparatus has succeeded.

5. The method of claim 4, further comprising further generating the second verification information based on the fourth verification information.

6. The method of claim 4, wherein the fourth verification information indicates that the second identity verification on the third apparatus has failed, and wherein after determining that the first identity verification on the second apparatus has succeeded, the method further comprises performing, based on the third verification information, the second identity verification on the third apparatus to determine whether the second identity verification on the third apparatus has succeeded.

7. The method of claim 1, wherein the first message further comprises second verification information indicating that the second identity verification on the third apparatus in the vehicle has failed, and wherein the method further comprises:
  sending, to the second apparatus, a second message requesting to obtain fifth verification information corresponding to the third apparatus;
  receiving, from the second apparatus, a third message comprising the fifth verification information corresponding to the third apparatus; and
  performing, based on the fifth verification information corresponding to the third apparatus, the second identity verification on the third apparatus to determine whether the second identity verification on the third apparatus has succeeded.

8. The method of claim 1, further comprising:
  determining that the first identity verification on the second apparatus has failed;
  sending, to the second apparatus, a second message requesting to obtain second verification information corresponding to the third apparatus in the vehicle;
  receiving, from the second apparatus, a third message comprising the second verification information corresponding to the third apparatus; and
  performing, based on the second verification information corresponding to the third apparatus, the second identity verification on the third apparatus to determine whether the second identity verification on the third apparatus has succeeded.

9. A method implemented by a second apparatus, wherein the method comprises:
  sending a second random number to a third apparatus, wherein a vehicle comprises a first apparatus, the second apparatus, the third apparatus, and a first set, wherein the first set comprises the second apparatus and the third apparatus, wherein the first apparatus is a primary authentication node in the vehicle and performs first identity verification on the second apparatus, and wherein the second apparatus is a secondary authentication node in the first set and performs second identity verification on the third apparatus;
  receiving first verification information from the third apparatus, wherein the first verification information is based on first identity information of the third apparatus and the second random number;
  determining, based on the second random number and the first verification information, whether the second identity verification on the third apparatus has succeeded;
  generating second verification information based on second identity information of the second apparatus and a first random number from the first apparatus, wherein the second verification information indicates whether the second identity verification on the third apparatus succeeds; and
  sending a first message to the first apparatus,
  wherein the first message comprises the second verification information, and
  wherein the second verification information performs the first identity verification on the second apparatus.

10. The method of claim 9, further comprising:
  generating second verification information based on the second random number and the first identity information; and
  further determining, based on the second verification information, whether the second identity verification on the third apparatus has succeeded.

11. The method of claim 10, further comprising:
  determining that the second verification information is consistent with the first verification information; and
  determining, in response to the second verification information is consistent with the first verification information, that the second identity verification on the third apparatus has succeeded.

12. The method of claim 9, wherein the first message further comprises the first verification information indicating whether the second identity verification on the third apparatus has succeeded.

13. The method of claim 9, further comprising:
  identifying that the second random number and the first random number have a same length but different content;
  obtaining the second random number by splicing the first random number and a third random number; or
  identifying that the second random number is the same as the first random number.

14. A first apparatus in a vehicle, wherein the first apparatus comprises:
  a transceiver configured to:
    send a first random number to a second apparatus in the vehicle, wherein the vehicle further comprises a first set, wherein the first set comprises the second apparatus and a third apparatus, wherein the first apparatus is a primary authentication node in the vehicle and performs first identity verification on the second apparatus, and wherein the second apparatus is a secondary authentication node in the first set and performs second identity verification on the third apparatus; and
    receive, from the second apparatus, a first message comprising first verification information, wherein the first verification information is for performing the first identity verification on the second apparatus, wherein the first verification information is based on first identity information of the second apparatus and the first random number, and wherein the first message further comprises third verification information of the third apparatus; and
  a processor coupled to the transceiver and configured to determine, based on the first verification information and the first random number, that whether the first identity verification on the second apparatus has succeeded and whether the second identity verification on the third apparatus has succeeded.

15. The first apparatus of claim 14, wherein the processor is further configured to:
generate second verification information based on the first identity information and the first random number;
determine whether the first verification information is consistent with the second verification information; and
further determine that the first identity verification on the second apparatus has succeeded when the first verification information is consistent with the second verification information.

16. The first apparatus of claim 15, wherein the third verification information is based on second identity information of the third apparatus.

17. The first apparatus of claim 16, wherein the first message further comprises fourth verification information indicating whether the second identity verification on the third apparatus has succeeded.

18. The first apparatus of claim 17, wherein the processor is configured to further generate the second verification information based on the fourth verification information.

19. The first apparatus of claim 17, wherein the fourth verification information indicates that the second identity verification on the third apparatus has failed, and wherein after determining that the first identity verification on the second apparatus has succeeded, the processor is further configured to perform, based on the third verification information, the second identity verification on the third apparatus to determine whether the second identity verification on the third apparatus has succeeded.

20. The first apparatus of claim 14, wherein the first message further comprises second verification information indicating that the second identity verification on the third apparatus in the vehicle has failed, and wherein the transceiver is further configured to:
send, to the second apparatus, a second message requesting to obtain fifth verification information corresponding to the third apparatus; and
receive, from the second apparatus, a third message comprising the fifth verification information corresponding to the third apparatus, and
wherein the processor is further configured to perform, based on the fifth verification information corresponding to the third apparatus, the second identity verification on the third apparatus to determine whether the second identity verification on the third apparatus has succeeded.

21. The first apparatus of claim 14, wherein the processor is further configured to determine that the first identity verification on the second apparatus has failed, and wherein the transceiver is further configured to:
send, to the second apparatus, a second message requesting to obtain second verification information corresponding to the third apparatus in the vehicle; and
receive, from the second apparatus, a third message comprising the second verification information corresponding to the third apparatus, and
wherein the processor is further configured to perform, based on the second verification information corresponding to the third apparatus, the second identity verification on the third apparatus to determine whether the second identity verification on the third apparatus has succeeded.

22. A second apparatus in a vehicle, wherein the second apparatus comprises:

a transceiver configured to:
send a second random number to a third apparatus in the vehicle, wherein the vehicle further comprises a first apparatus and a first set, wherein the first set comprises the second apparatus and a third apparatus, wherein the first apparatus is a primary authentication node in the vehicle and performs first identity verification on the second apparatus, and wherein the second apparatus is a secondary authentication node in the first set and performs second identity verification on the third apparatus; and
receive first verification information from the third apparatus, wherein the first verification information is based on first identity information of the third apparatus and the second random number; and
a processor coupled to the transceiver and configured to:
determine, based on the second random number and the first verification information, whether the second identity verification on the third apparatus has succeeded; and
generate second verification information based on the first identity information of the second apparatus and a first random number from the first apparatus, wherein the second verification information indicates whether the second identity verification on the third apparatus succeeds,
wherein the transceiver is further configured to send a first message to the first apparatus,
wherein the first message comprises the second verification information, and
wherein the second verification information performs identity verification on the second apparatus.

23. The second apparatus of claim 22, wherein the processor is further configured to:
generate second verification information based on the second random number and the first identity information; and
further determine, based on the second verification information, whether the second identity verification on the third apparatus has succeeded.

24. The second apparatus of claim 23, wherein the processor is further configured to:
determine that the second verification information is consistent with the first verification information; and
determine, in response to the second verification information is consistent with the first verification information, that the second identity verification on the third apparatus has succeeded.

25. The second apparatus of claim 22, wherein the first message further comprises the first verification information indicating whether the second identity verification on the third apparatus has succeeded.

26. The second apparatus of claim 22, wherein the processor is further configured to:
identify that the second random number and the first random number have a same length but different content;
obtain the second random number by splicing the first random number and a third random number; or
identify that the second random number is the same as the first random number.

* * * * *

UNITED STATES PATENT AND TRADEMARK OFFICE
CERTIFICATE OF CORRECTION

| | |
|---|---|
| PATENT NO. | : 11,979,413 B2 |
| APPLICATION NO. | : 17/360360 |
| DATED | : May 7, 2024 |
| INVENTOR(S) | : Yanjiang Yang, Zhuo Wei and Shuang Wu |

It is certified that error appears in the above-identified patent and that said Letters Patent is hereby corrected as shown below:

In the Claims

Claim 14, Column 76, Line 67: "and the first random number, that whether the first" should read "and the first random number, whether the first"

Signed and Sealed this
Eighteenth Day of June, 2024

Katherine Kelly Vidal
*Director of the United States Patent and Trademark Office*